(12) United States Patent
Mitteer et al.

(10) Patent No.: US 12,395,022 B2
(45) Date of Patent: Aug. 19, 2025

(54) MODULAR FLUID PUMP FOR USE IN DIVERSE APPLICATIONS

(71) Applicant: GHSP, INC., Holland, MI (US)

(72) Inventors: David Michael Mitteer, Grand Haven, MI (US); Bradley John Vecellio, Grand Haven, MI (US); Nate McMackin, New Era, MI (US); Ben He, Grand Haven, MI (US); Larry Duane Ridge, Wayland, MI (US); Cathy Ann Stewart, Allendale, MI (US); Ryan David Rosinski, Whitehall, MI (US); Rodrigo Salazar, Grand Haven, MI (US); Tim Calkins, Zeeland, MI (US)

(73) Assignee: GHSP, Inc., Holland, MI (US)

( * ) Notice: Subject to any disclaimer, the term of this patent is extended or adjusted under 35 U.S.C. 154(b) by 678 days.

(21) Appl. No.: 18/031,992

(22) PCT Filed: Nov. 12, 2019

(86) PCT No.: PCT/IB2019/059719
§ 371 (c)(1),
(2) Date: Apr. 14, 2023

(87) PCT Pub. No.: WO2020/100042
PCT Pub. Date: May 22, 2020

(65) Prior Publication Data
US 2023/0299634 A1   Sep. 21, 2023

Related U.S. Application Data

(60) Provisional application No. 62/788,255, filed on Jan. 4, 2019, provisional application No. 62/760,585, filed on Nov. 13, 2018.

(51) Int. Cl.
*H02K 1/278* (2022.01)
*F04C 2/10* (2006.01)
(Continued)

(52) U.S. Cl.
CPC ............... *H02K 1/278* (2013.01); *F04C 2/10* (2013.01); *F04C 15/0096* (2013.01);
(Continued)

(58) Field of Classification Search
CPC .... F04C 2240/60; H02K 1/278; H02K 5/1732
See application file for complete search history.

(56) References Cited

U.S. PATENT DOCUMENTS 5,344,443 A   9/1994 Palma et al.
6,093,001 A *  7/2000 Burgreen ............ F04D 29/0413
                                                  415/176
(Continued)

FOREIGN PATENT DOCUMENTS

CN    101446286 A    6/2009
CN    102055087 A    5/2011
(Continued)

*Primary Examiner* — Kenneth J Hansen
(74) *Attorney, Agent, or Firm* — Price Heneveld LLP

(57) ABSTRACT

A modular fluid pump includes a stator having a plurality of stator teeth and windings that are positioned on the stator teeth. A rotor has a central shaft and substantially hemispheric ends and a plurality of magnets that define an electromagnetic communication with the windings A housing surrounds the stator and includes a fixed end cap that receives one of the hemispheric ends of the central shaft and defines a rotational axis of the rotor. A securing end cap that receives the other hemispheric end of the central shaft. The central shaft and the fixed and securing end caps define the rotational axis of the rotor. Engagement of the hemispheric end with the central shaft and the fixed and securing end caps maintains the rotor and the central shaft aligned with the rotational axis and balanced within the stator.

20 Claims, 42 Drawing Sheets

(51) Int. Cl.
  *F04C 15/00*   (2006.01)
  *F04D 29/046*  (2006.01)
  *H02K 1/02*    (2006.01)
  *H02K 5/08*    (2006.01)
  *H02K 5/15*    (2006.01)
  *H02K 5/173*   (2006.01)
  *H02K 11/25*   (2016.01)
  *H02K 21/16*   (2006.01)

(52) U.S. Cl.
  CPC .......... *F04D 29/0467* (2013.01); *H02K 1/02* (2013.01); *H02K 5/08* (2013.01); *H02K 5/15* (2013.01); *H02K 5/1732* (2013.01); *H02K 11/25* (2016.01); *H02K 21/16* (2013.01); *F04C 2240/30* (2013.01); *F04C 2240/40* (2013.01); *H02K 2211/03* (2013.01); *H02K 2213/12* (2013.01)

(56) References Cited

U.S. PATENT DOCUMENTS

| | | | |
|---|---|---|---|
| 6,679,692 | B1 | 1/2004 | Feuling |
| 7,318,422 | B2 | 1/2008 | Douyama et al. |
| 7,381,036 | B2 | 6/2008 | Hundt et al. |
| 8,156,757 | B2 | 4/2012 | Doty et al. |
| 8,287,254 | B2 | 10/2012 | Rhein et al. |
| 8,716,911 | B2 | 5/2014 | Oda et al. |
| 9,077,101 | B2 | 7/2015 | Wu et al. |
| 11,015,585 | B2 | 5/2021 | Rosinski |
| 2004/0219035 | A1 | 11/2004 | Hundt et al. |
| 2007/0025866 | A1 | 2/2007 | Douyama et al. |
| 2007/0210673 | A1* | 9/2007 | Kusagaya ............... H01R 39/06 310/239 |
| 2008/0115527 | A1 | 5/2008 | Doty et al. |
| 2008/0278018 | A1* | 11/2008 | Achor .................... F02M 37/08 29/598 |
| 2009/0142208 | A1 | 6/2009 | Rhein et al. |
| 2011/0111628 | A1 | 5/2011 | Su et al. |
| 2012/0038231 | A1 | 2/2012 | Oda et al. |
| 2013/0106257 | A1* | 5/2013 | Song ..................... H02K 5/225 310/68 R |
| 2014/0300255 | A1 | 10/2014 | Sugiyama et al. |
| 2018/0209406 | A1 | 7/2018 | Rosinski |
| 2018/0375400 | A1 | 12/2018 | Ahrens et al. |
| 2019/0234405 | A1 | 8/2019 | Homma et al. |

FOREIGN PATENT DOCUMENTS

| | | |
|---|---|---|
| CN | 102089959 A | 6/2011 |
| CN | 102562583 A | 7/2012 |
| CN | 102654125 A | 9/2012 |
| CN | 103326141 A | 9/2013 |
| CN | 20513599 U | 4/2016 |
| CN | 107905998 A | 4/2018 |
| JP | 10271738 A | 10/1998 |
| JP | 2012026294 A | 2/2012 |
| JP | 2017221072 A | 12/2017 |
| JP | 2018166365 A | 10/2018 |
| WO | 2017133737 A1 | 8/2017 |
| WO | 2018062107 A1 | 10/2019 |
| WO | 2020100042 A1 | 5/2020 |

\* cited by examiner

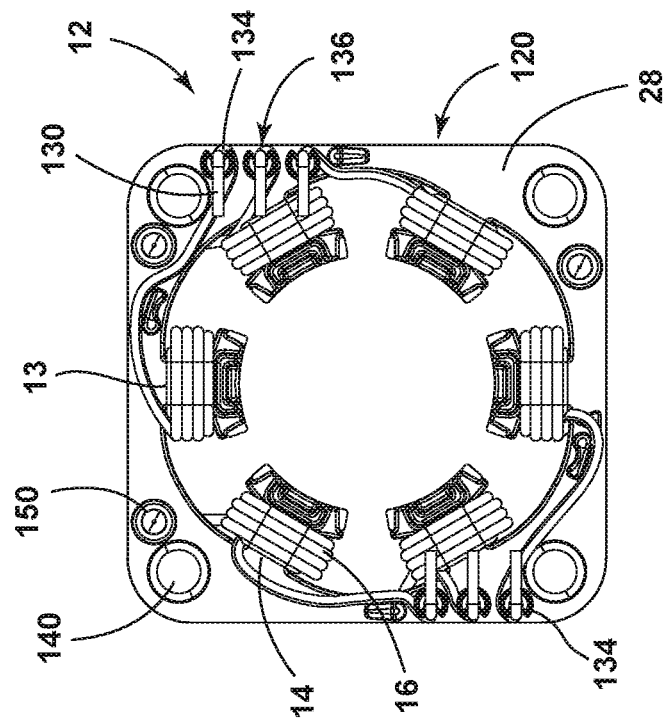
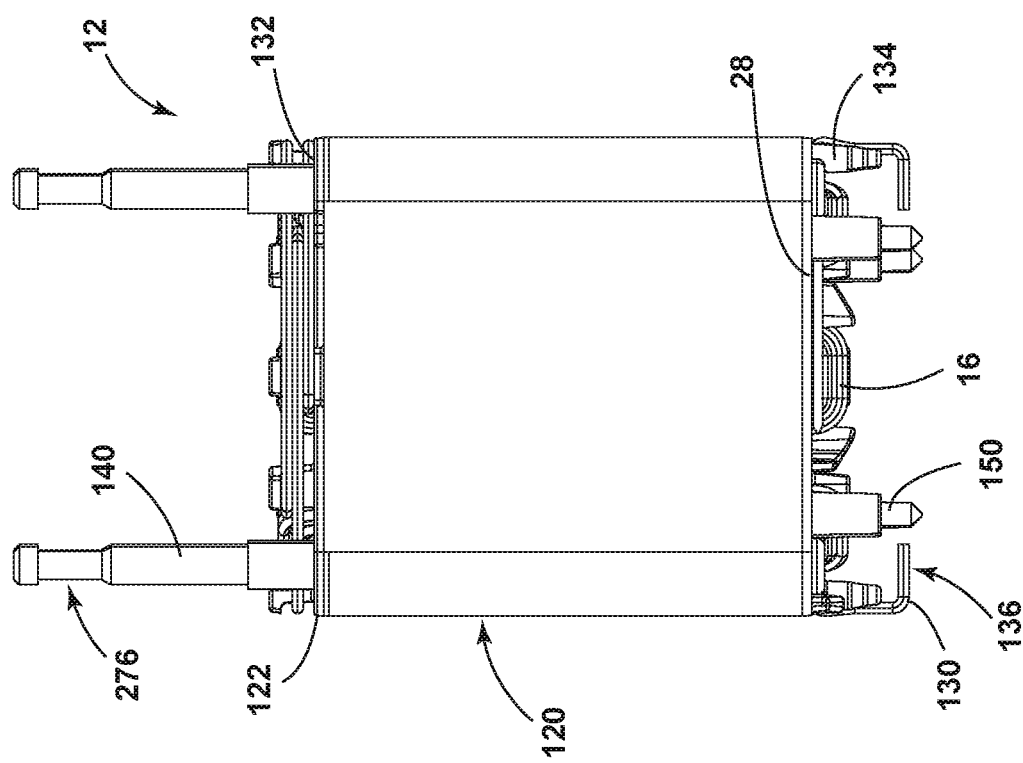
FIG. 5A
FIG. 5

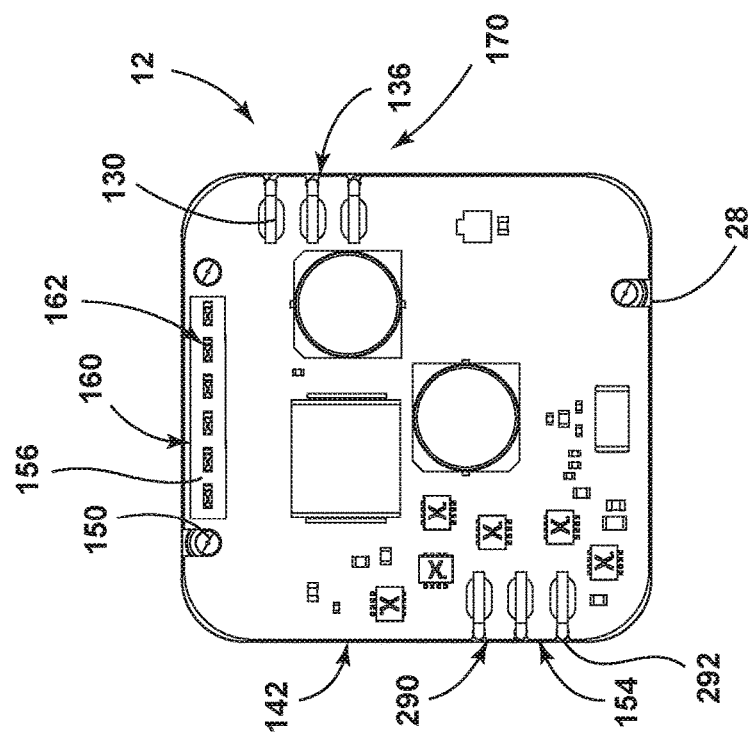
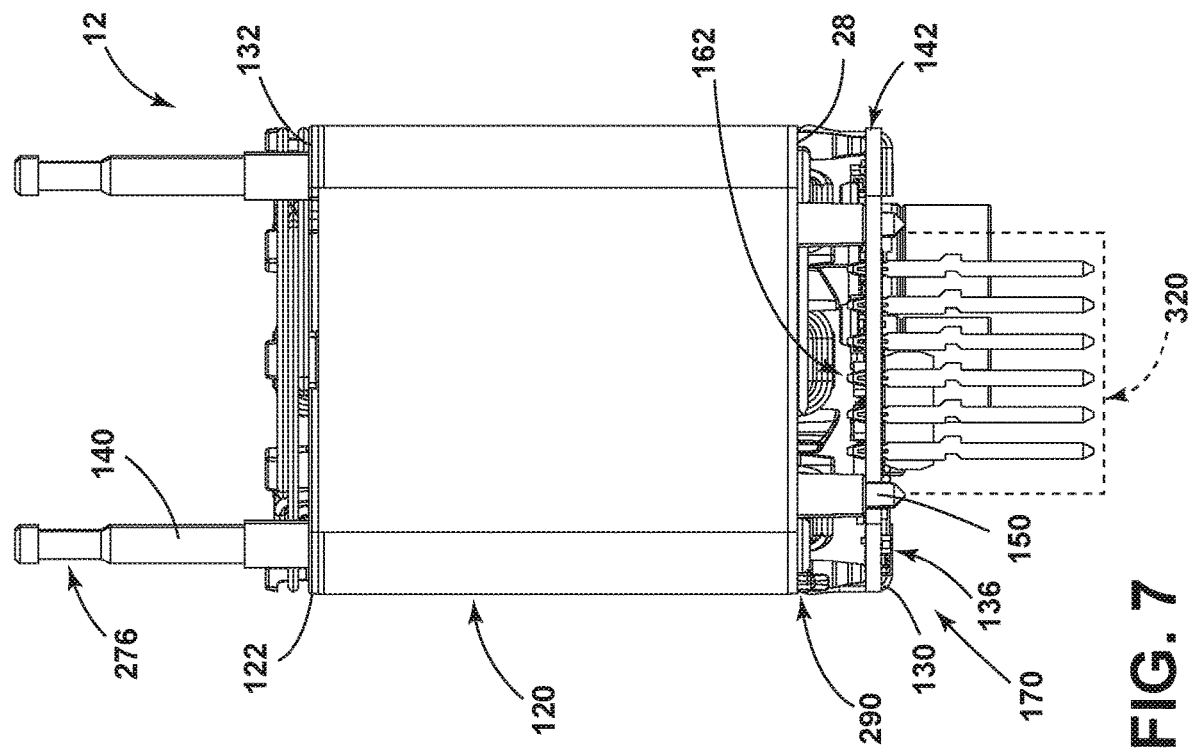
FIG. 7A
FIG. 7

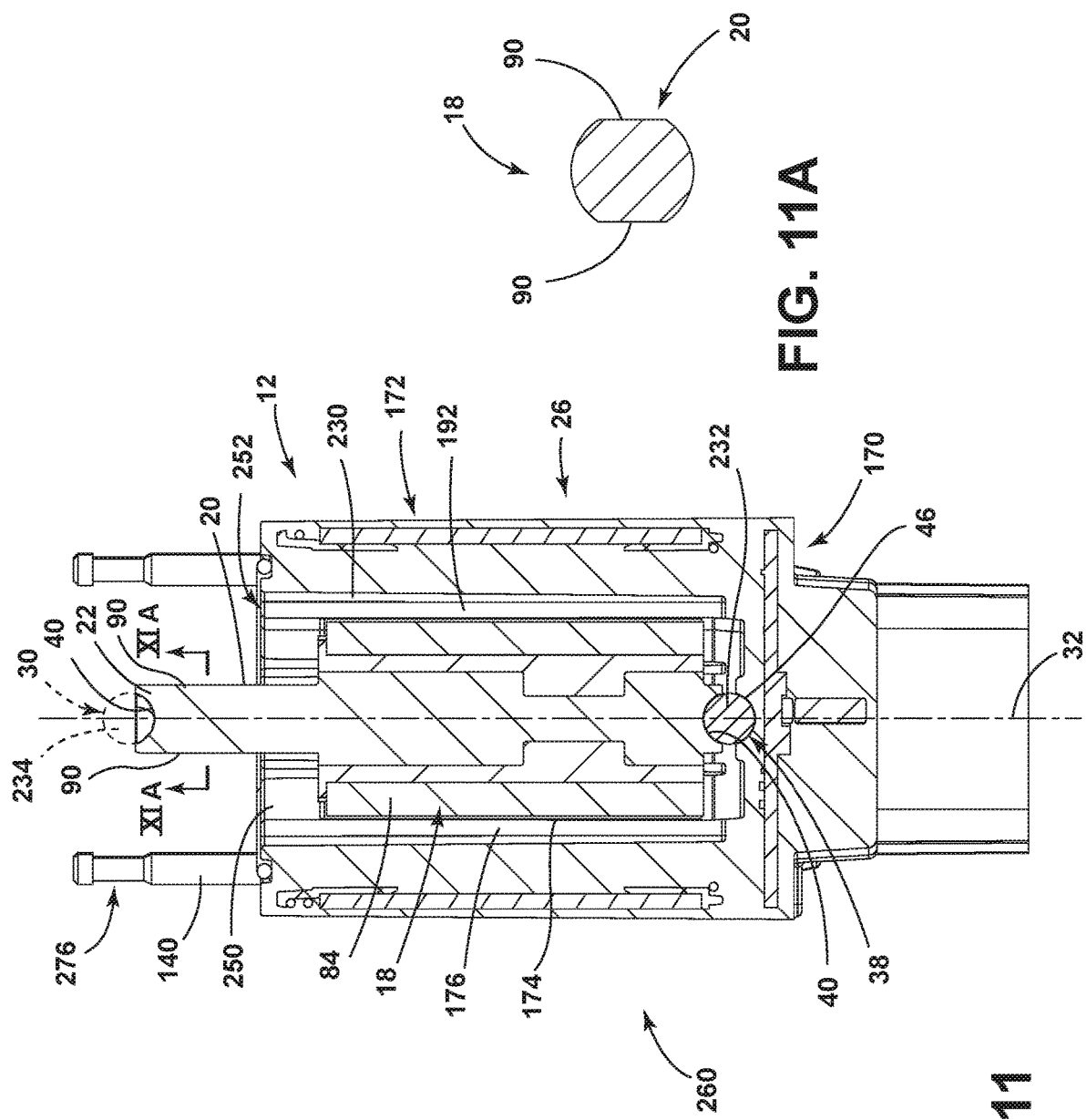

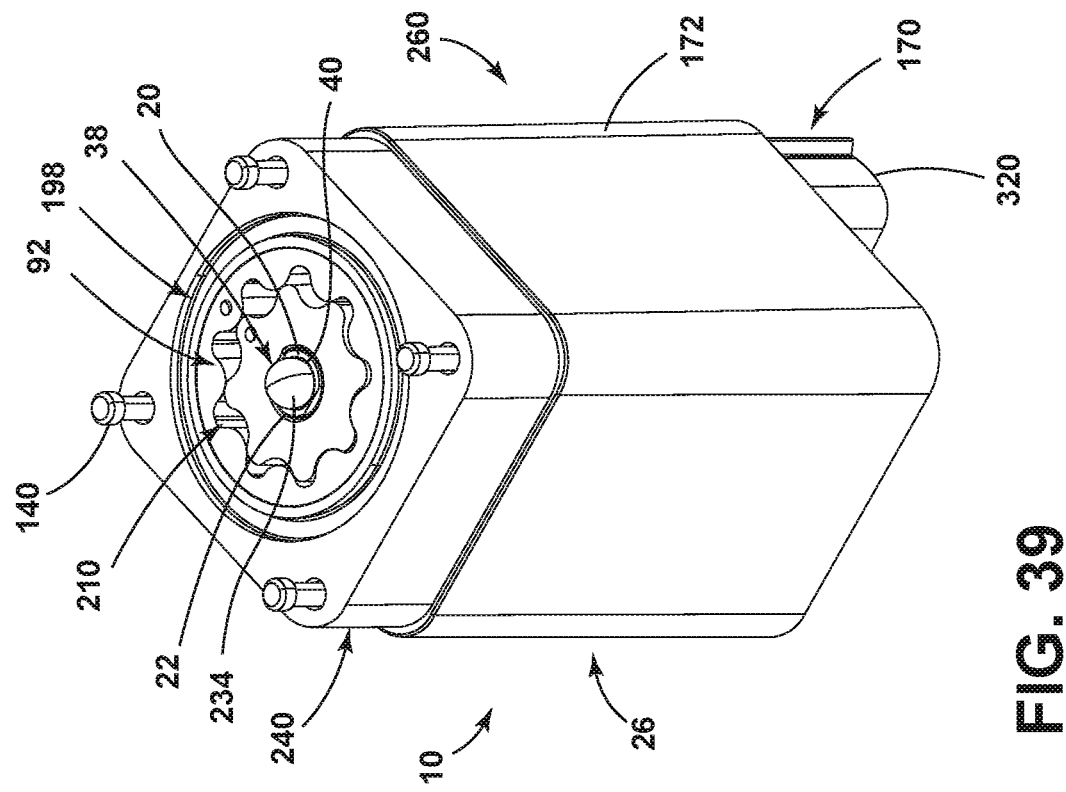
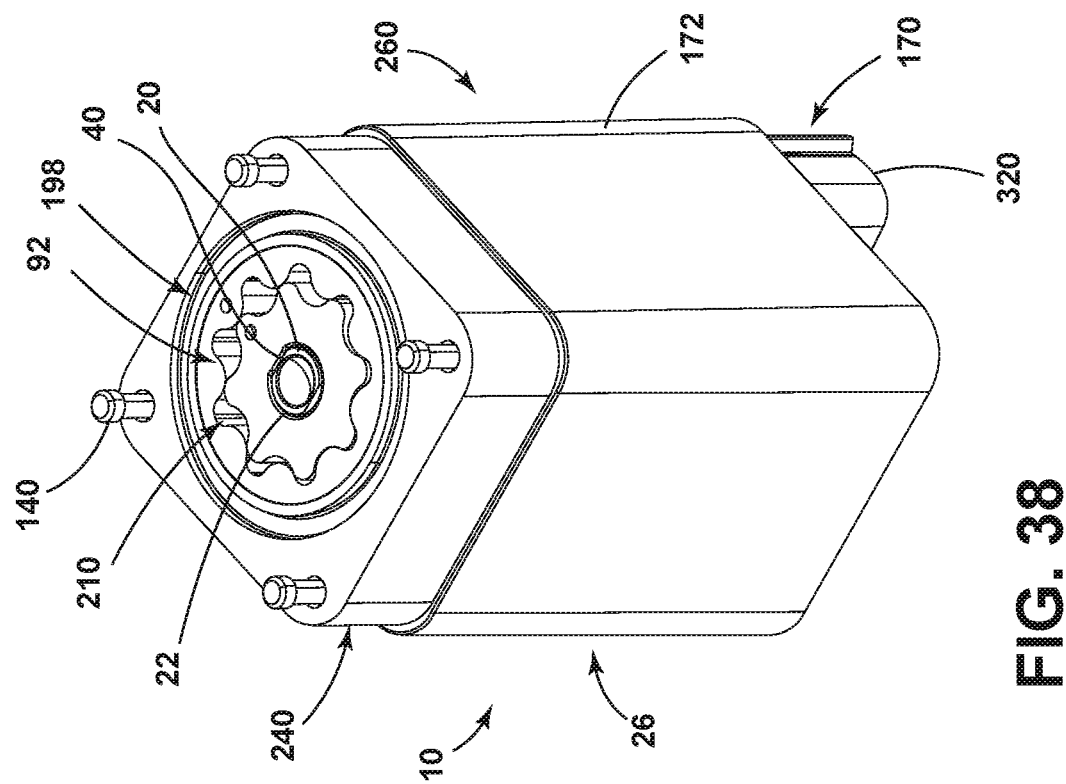
FIG. 39
FIG. 38

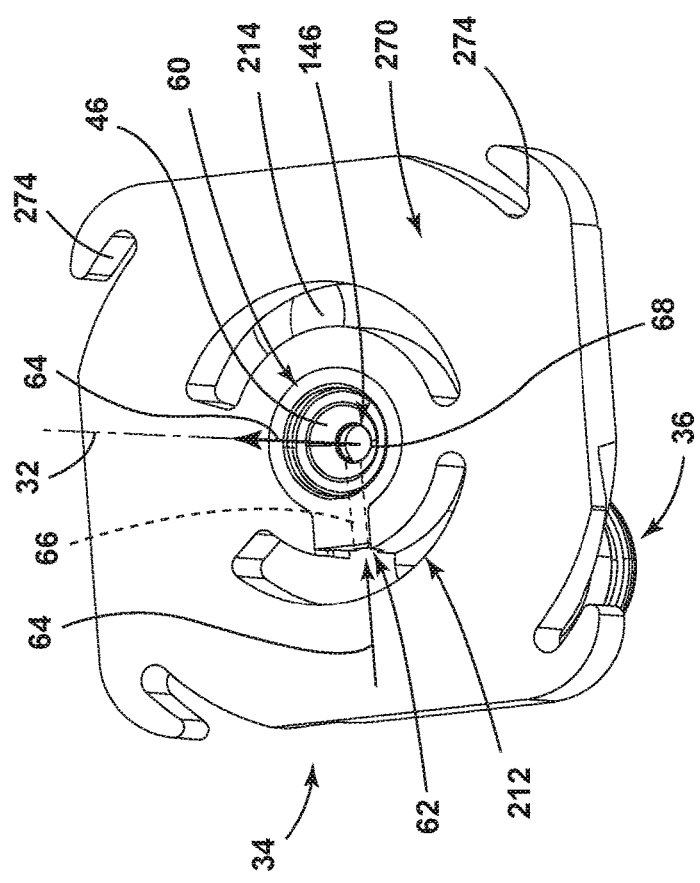
FIG. 40
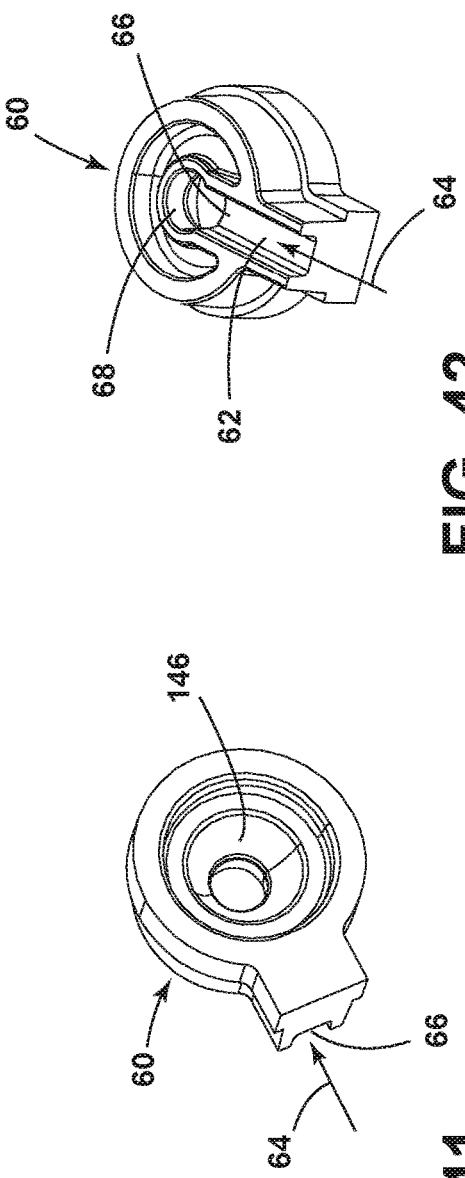
FIG. 42
FIG. 41

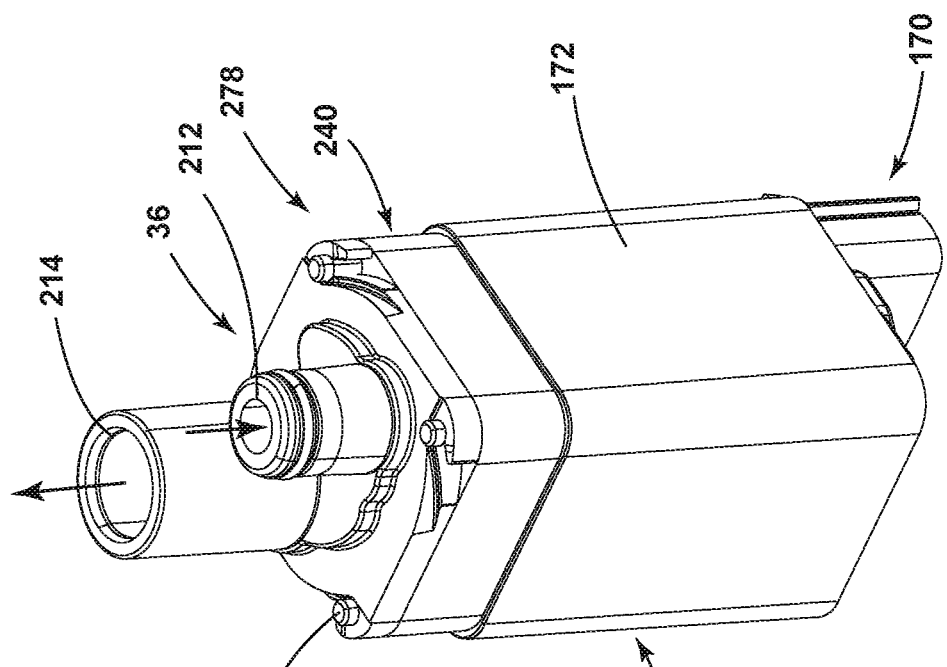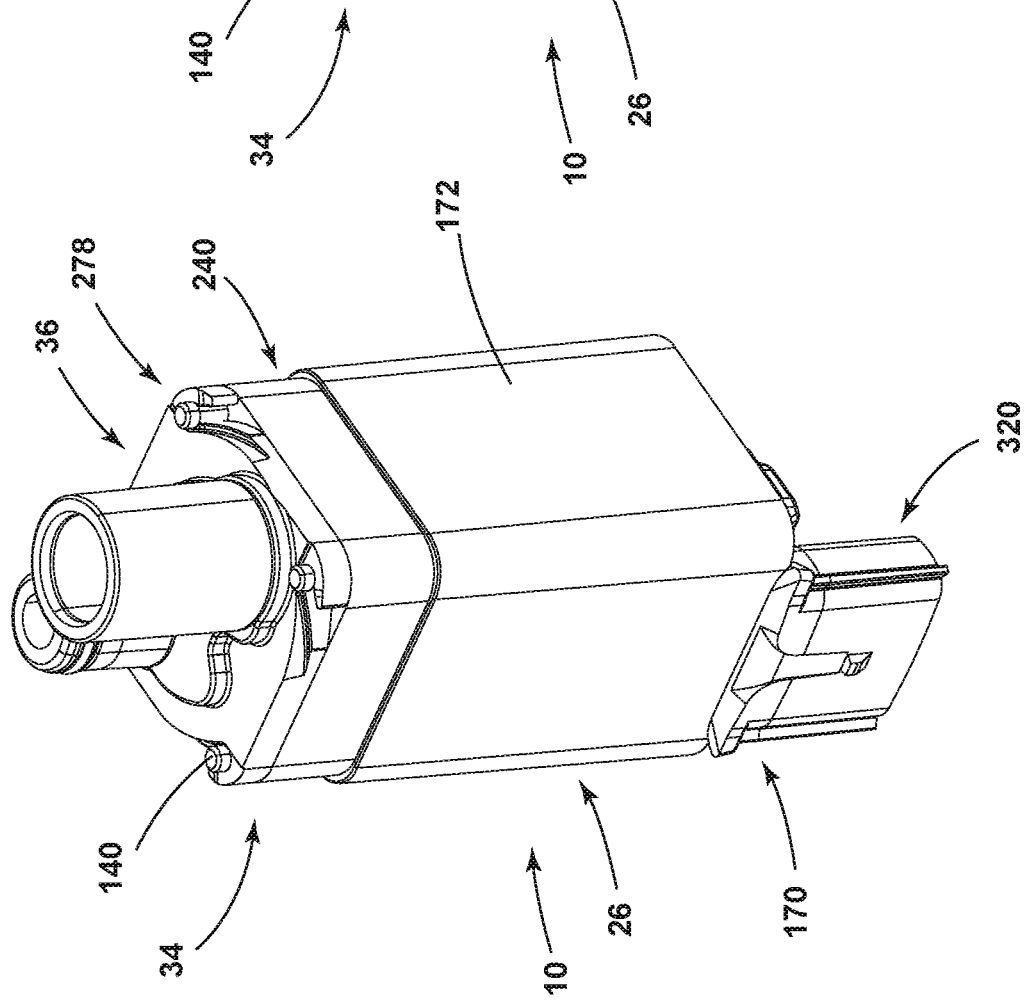
FIG. 45
FIG. 44

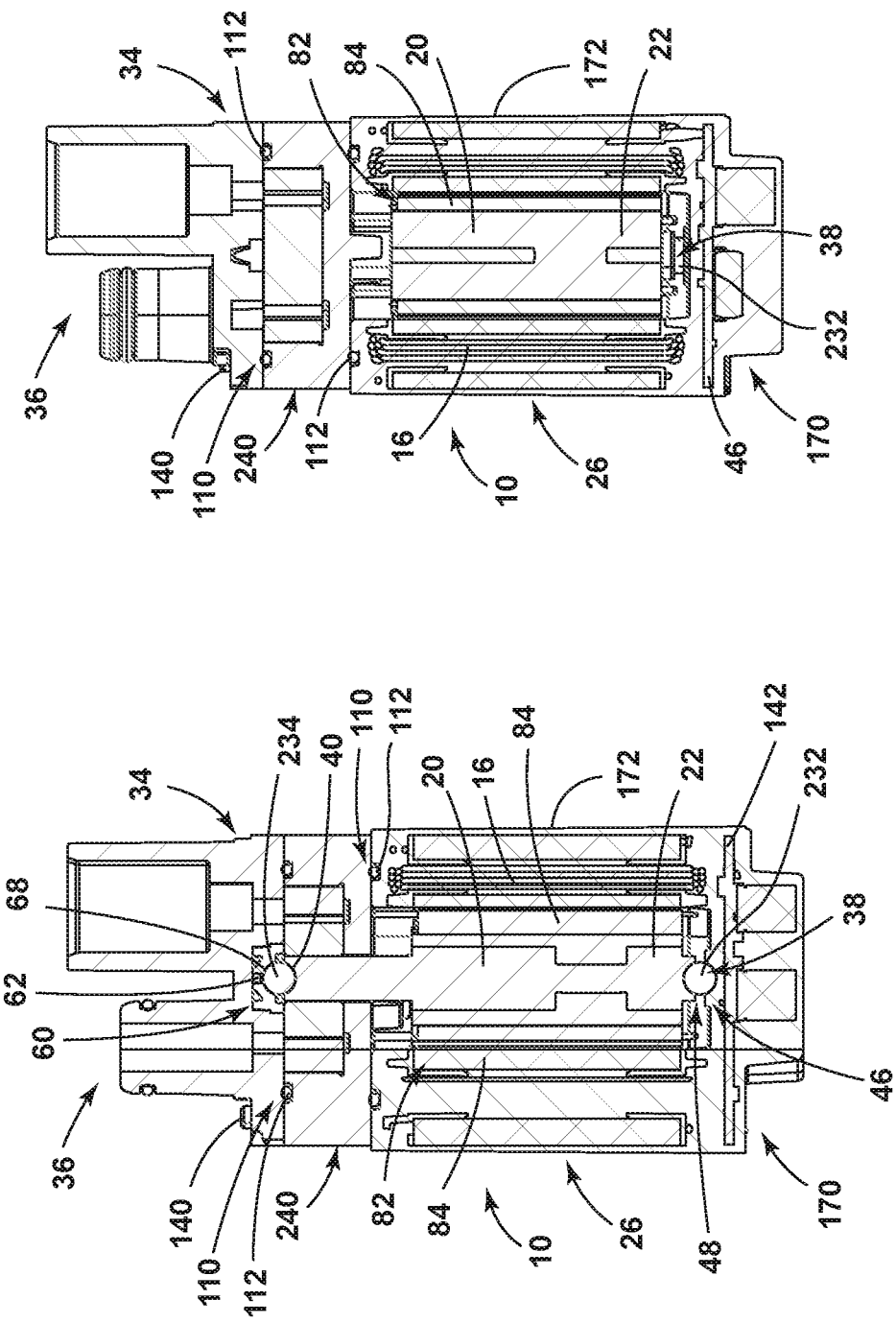

MODULAR FLUID PUMP FOR USE IN DIVERSE APPLICATIONS

FIELD OF THE INVENTION

The present invention generally relates to oil pumps and water pumps, and more specifically, a water or oil pump that has a modular configuration that can be used within various applications covering a broad range of possible power outputs and that can be generally customized to an ideal performance point for specific applications while maximizing common use of components and manufacturing equipment.

BACKGROUND OF THE INVENTION

Water and oil pumps are used within various industries to lubricate, cool or pressurize hydraulic ports. Such pumps can be made to fit a particular application such that the various components are fundamentally custom designed for each particular design. These pumps are generally driven by an electric motor. Many automotive applications in hybrids and electric cars require high efficiency operation to minimize power draw from the battery and extend operational range of the vehicle while cooling, lubricating or pressurizing hydraulic ports. These pumps typically must fit into restricted spaces and are difficult to package with the electrical connection. Generally, the suction port and pressure ports in the applications are unique to each pump/motor combination and drive customization between the motor elements and the pump elements. This invention provides for a scalable electric pump design that includes a pumping element, a motor element, and an electrical circuit controller element that can convert electrical energy inputs into hydraulic energy outputs for lubrication, cooling or providing hydraulic pressure. It has flexibility in the connector position and in the hydraulic output by the orientation of the motor portion and pump portion during assembly.

SUMMARY OF THE INVENTION

According to one aspect of the present invention, a modular fluid pump includes a stator having a plurality of stator teeth and windings that are positioned on the stator teeth. A rotor has a central shaft and substantially hemispheric ends and a plurality of magnets that define an electromagnetic communication with the windings. A housing surrounds the stator and includes a fixed end cap that receives one of the hemispheric ends of the central shaft and defines a rotational axis of the rotor. A securing end cap that receives the other hemispheric end of the central shaft. The central shaft and the fixed and securing end caps define the rotational axis of the rotor. Engagement of the hemispheric end with the central shaft and the fixed and securing end caps maintains the rotor and the central shaft aligned with the rotational axis and balanced within the stator.

According to another aspect of the present invention, a method of forming a modular fluid pump includes forming an overmolded stator having a plurality of retainer dowels extending from an end of the overmolded stator. The method also includes forming a rotor having a metallic central shaft and a plurality of magnet pockets, positioning rotor magnets in the magnet pockets, magnetically attaching a first bearing ball to a concave end of the central shaft, positioning the bearing ball and the central shaft into engagement with a concave seat of a fixed end cap defined within the housing, securing a pump body to the overmolded stator and securing a gerotor to the central shaft. The gerotor at least partially positions the central shaft and the rotor along the rotational axis. A second bearing ball is placed on another concave end of the central shaft. A securing end cap is rotationally secured onto the dowels to secure the pump body and gerotor to the overmolded stator. The securing end cap and the fixed end cap secure the first and second bearing balls and the central shaft within the rotational axis.

According to another aspect of the present invention, a modular fluid pump includes a stator having a plurality of stator teeth and windings that are positioned on the stator teeth. A rotor having a central shaft with concave ends that receive bearing balls. The rotor includes a plurality of magnets that define an electromagnetic communication with the windings. A housing surrounding the stator and including a first fixed end cap that receives one of the bearing balls of the central shaft and defines a rotational axis of the rotor. A securing end cap receives the other bearing ball of the central shaft. The central shaft and the first fixed and securing end caps define the rotational axis of the rotor. Engagement of the bearing balls of the central shaft and the first fixed and securing end caps maintains the rotor and the central shaft aligned with the rotational axis and balanced within the stator. The securing end cap and the housing selectively define a plurality of locked positions that secure the securing end cap to the housing.

According to another aspect of the present invention, a modular fluid pump includes a rotor having a central shaft with hemispheric ends and a plurality of magnets. A housing is overmolded onto a stator. The housing has a first end cap that includes a printed circuit board. The first end cap receives one of the hemispheric ends of the central shaft. A pump body has a gerotor that is coupled to the rotor. Operation of the rotor operates the gerotor to move a fluid from an inlet to an outlet. A plurality of retainer dowels extends through the housing and the pump body. A securing end cap includes an integral twist-lock mechanism that cooperatively engages the plurality of retainer dowels to define a locked position of the securing end cap that is free of additional fasteners. The locked position is defined by any one of a plurality of rotational positions of the securing end cap with respect to the printed circuit board and the rotational axis of the rotor. The securing end cap receives the other hemispheric end of the central shaft. The locked position of the securing end cap is further defined by a secure engagement of the housing, the pump body and the securing end cap.

According to another aspect of the present invention, a modular fluid pump includes a stator having a plurality of stator teeth and windings that are positioned on the stator teeth. A rotor has a central shaft with concave ends that receive bearing balls. The rotor includes a plurality of magnets that define an electromagnetic communication with the windings. A housing surrounds the stator and includes a first end cap that receives one of the bearing balls of the central shaft and defines a rotational axis of the rotor. A securing end cap receives the other bearing ball of the central shaft. The central shaft and the fixed and securing end caps define the rotational axis of the rotor. Engagement of the bearing balls of the central shaft and the fixed and securing end caps maintains the rotor and the central shaft aligned with the rotational axis and balanced within the stator. Operation of the rotor generates a flow of the fluid through the housing and between the rotor and the stator. The flow of the fluid engages the bearing balls to define a viscous fluid cushion at least between the bearing balls and the first end cap and the securing end cap, respectively.

According to another aspect of the present invention, a modular fluid pump includes a rotor having a central shaft with hemispheric ends and a plurality of magnets. A housing is overmolded onto a stator. The housing has a first end cap that includes a printed circuit board. The first end cap receives one of the hemispheric ends of the central shaft. A pump body has a gerotor that is coupled to the rotor. Operation of the rotor operates the gerotor to move a fluid from an inlet to an outlet. A plurality of retainer dowels that extends through the housing and the pump body. A securing end cap includes the inlet and the outlet and an integral twist-lock mechanism that cooperatively engages the plurality of retainer dowels to define a locked position of the securing end cap that is free of additional fasteners, wherein the locked position defines a secure engagement of the housing, the pump body and the securing end cap. The locked position is further defined by any one of a plurality of rotational orientations of the inlet and outlet of the securing end cap with respect to the printed circuit board.

According to another aspect of the present invention, a motor includes a stator having a plurality of stator teeth and a plurality of windings that are positioned on the stator teeth. A rotor has a central shaft and a plurality of magnets that define an electromagnetic communication with the windings. A housing surrounds the stator and includes a fixed end cap. A printed circuit board is attached to the fixed end cap at structural posts. Each winding of the plurality of windings defines a continuous wire that directly attaches to the printed circuit board without the use of an intermediate terminal.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIGS. 5 and 5A are side and end elevational views of the stator of FIG. 4 showing the plurality of retainer dowels coupled with the stator for securing a pump body and customizable end cap for the modular oil or water pump;

FIGS. 7 and 7A are side and end elevational views of the stator of FIG. 6 showing positioning of the electrical wires of the various windings positioned on the printed circuit board;

FIGS. 8 and 8A are cross-sectional views of the stator laminations, the rotor and the retainer dowels;

FIG. 11 is a cross-sectional view of an aspect of the modular fluid pump of FIG. 1 and showing installation of at least one sealing assembly;

FIG. 11A is a cross-sectional view of the central shaft of FIG. 11, taken along line XIA-XIA;

FIGS. 38 and 39 are top perspective views of an aspect of the modular pump showing the concave end of the central shaft and the bearing ball located on the concave end of the central shaft;

FIG. 40 is a bottom plan view of the securing end cap incorporating an aspect of the bias fitting and retaining slots for attaching to the remainder of the modular pump;

FIGS. 41 and 42 are perspective views of the bias fitting that is incorporated within the securing end cap;

FIG. 44 is a first side perspective view of an aspect of the modular fluid pump;

FIG. 45 is another side perspective view of an aspect of the modular fluid pump;

FIG. 54 is a cross-sectional view of the modular fluid pump of FIG. 52 taken along line LIV-LIV;

FIG. 55 is a cross-sectional view of the modular fluid pump of FIG. 52 taken along line LV-LV;

DETAILED DESCRIPTION OF THE PREFERRED EMBODIMENTS

Figure 1:
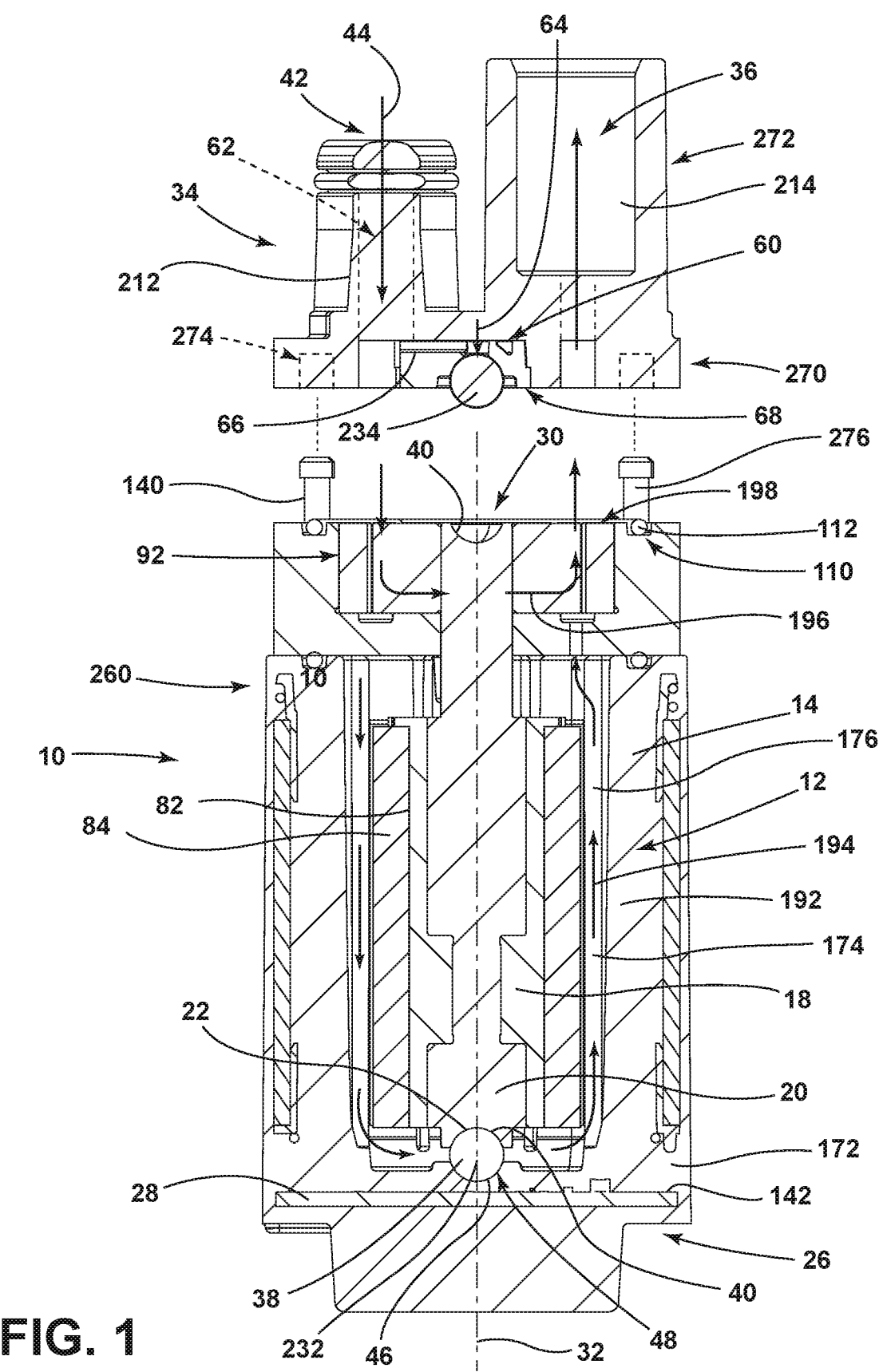
FIG. 1 is a cross-sectional view of an aspect of the fluid pump that includes the modular construction.
Figure 2A:
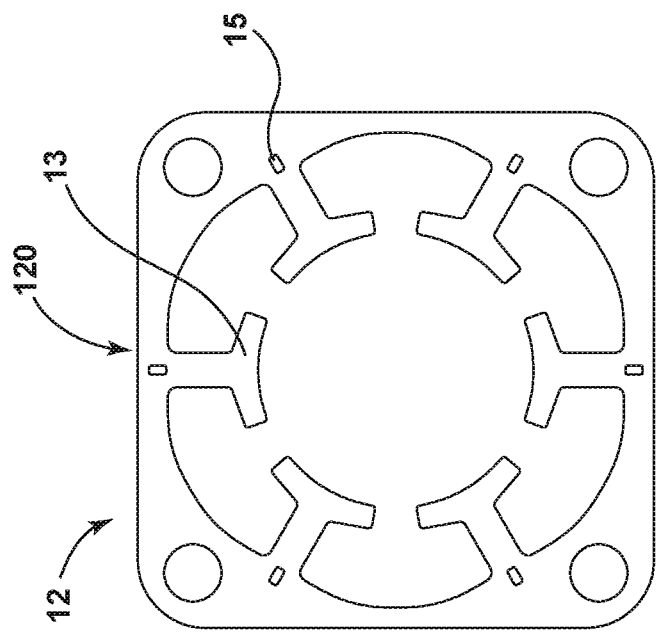
FIGS. 2 and 2A are side and end elevational views of a lamination stack for a stator that is used within the modular oil or water pump.
Figure 2:
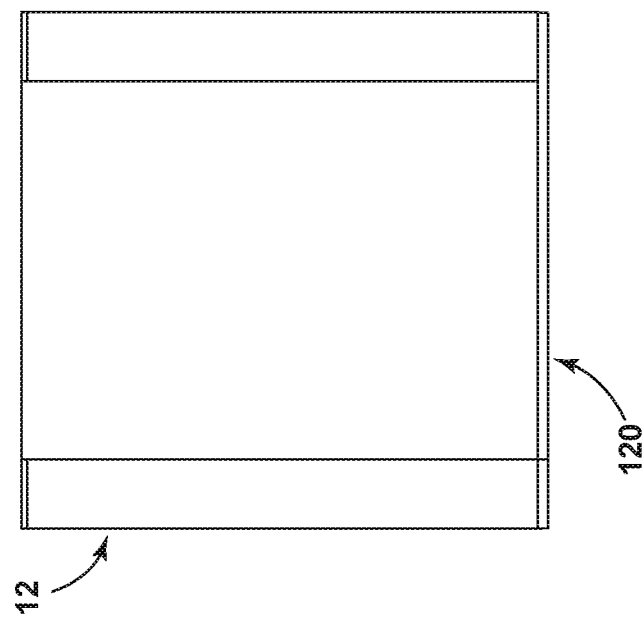
Figure 3A:
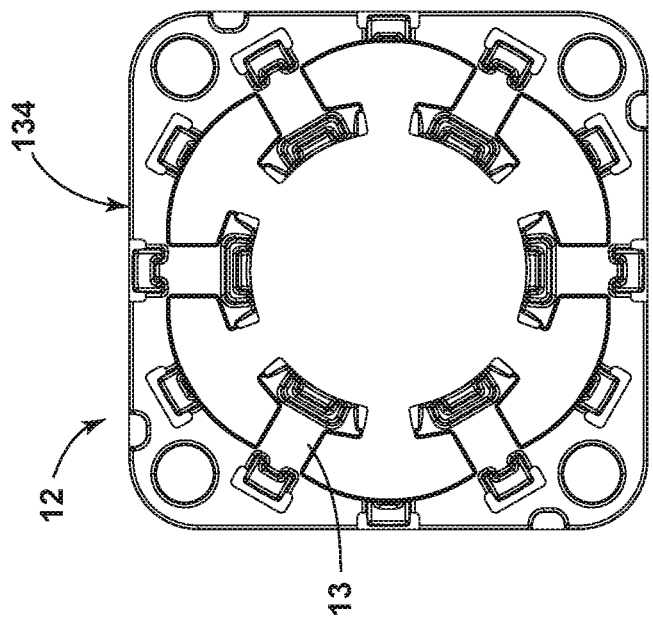
FIGS. 3 and 3A are side and end elevational views of the modular oil or water pump of FIG. 2 showing posts and wire securing features that are positioned on an end plate of the stator laminations.
Figure 3:
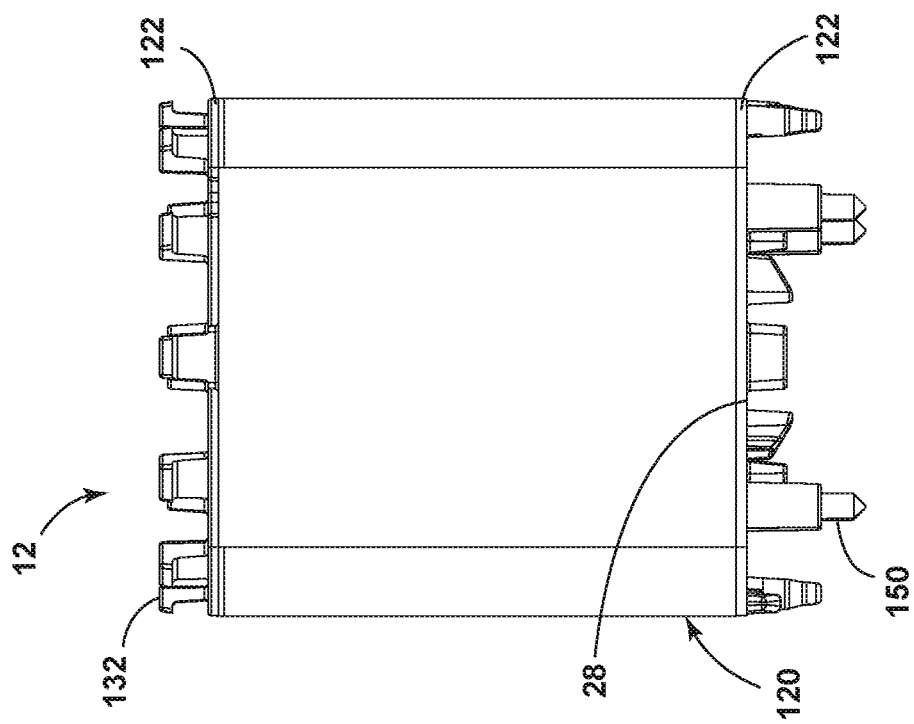
Figure 4A:
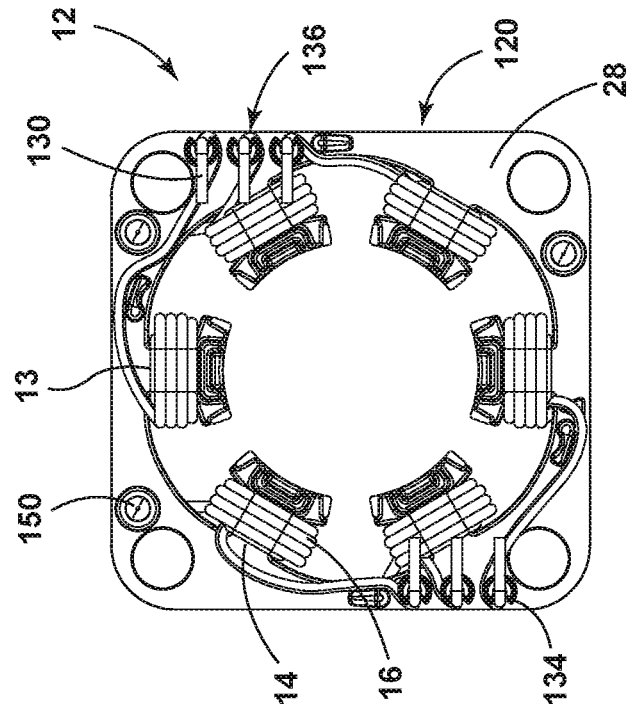
FIGS. 4 and 4A are side and end elevational views of the stator of FIG. 3 showing a plan view and elevational view of the stator of FIG. 3 with the windings disposed on the teeth of the stator.
Figure 4:
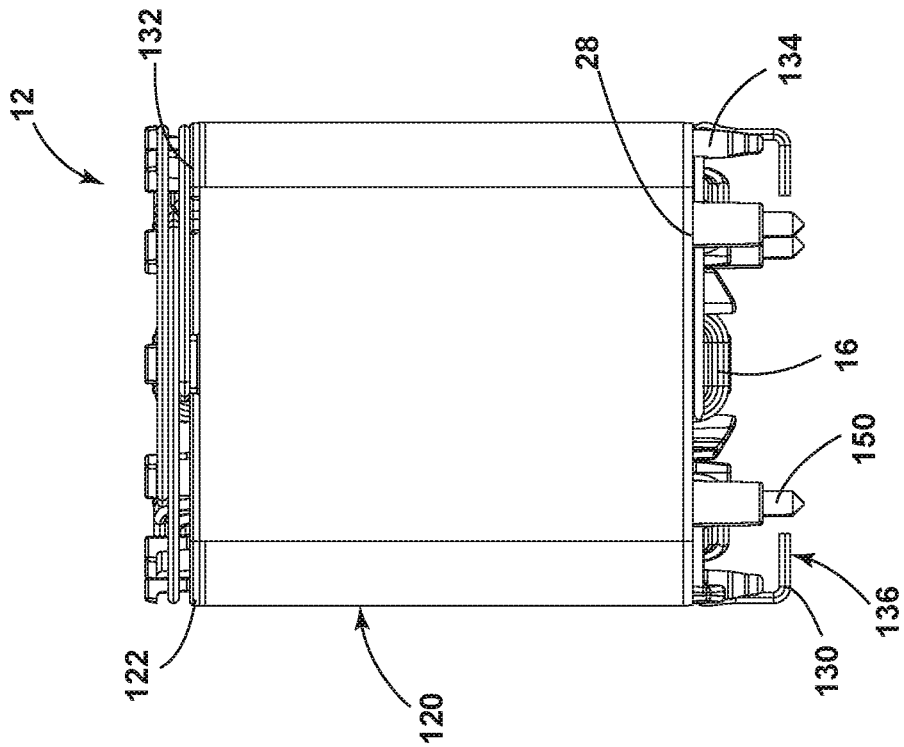
Figure 6A:
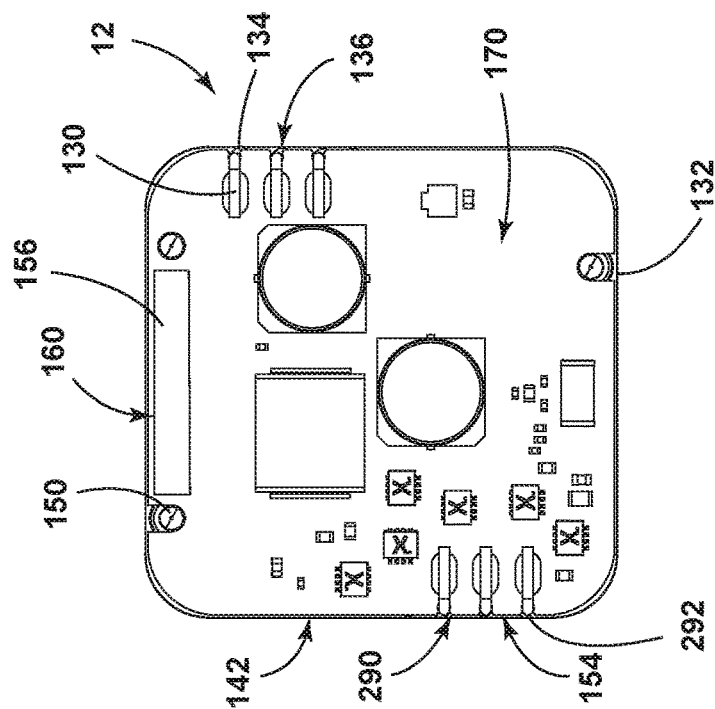
FIGS. 6 and 6A are side and end elevational views of the stator of FIG. 5 showing the printed circuit board positioned thereon.
Figure 6:
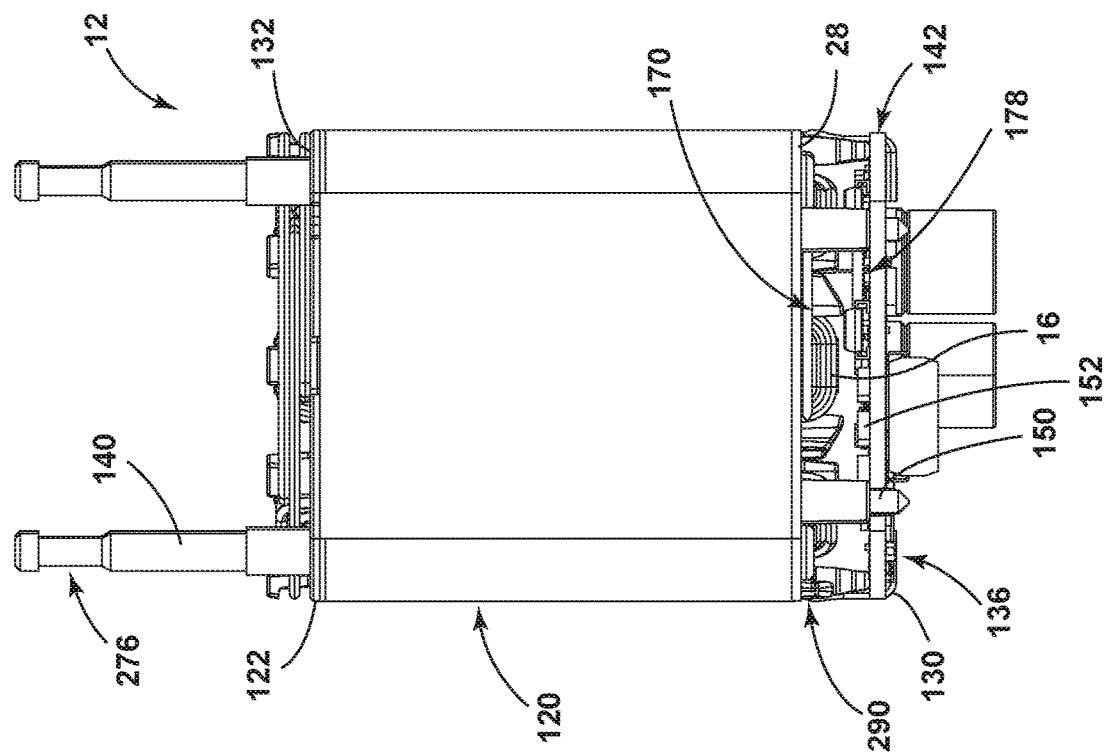
Figure 8:
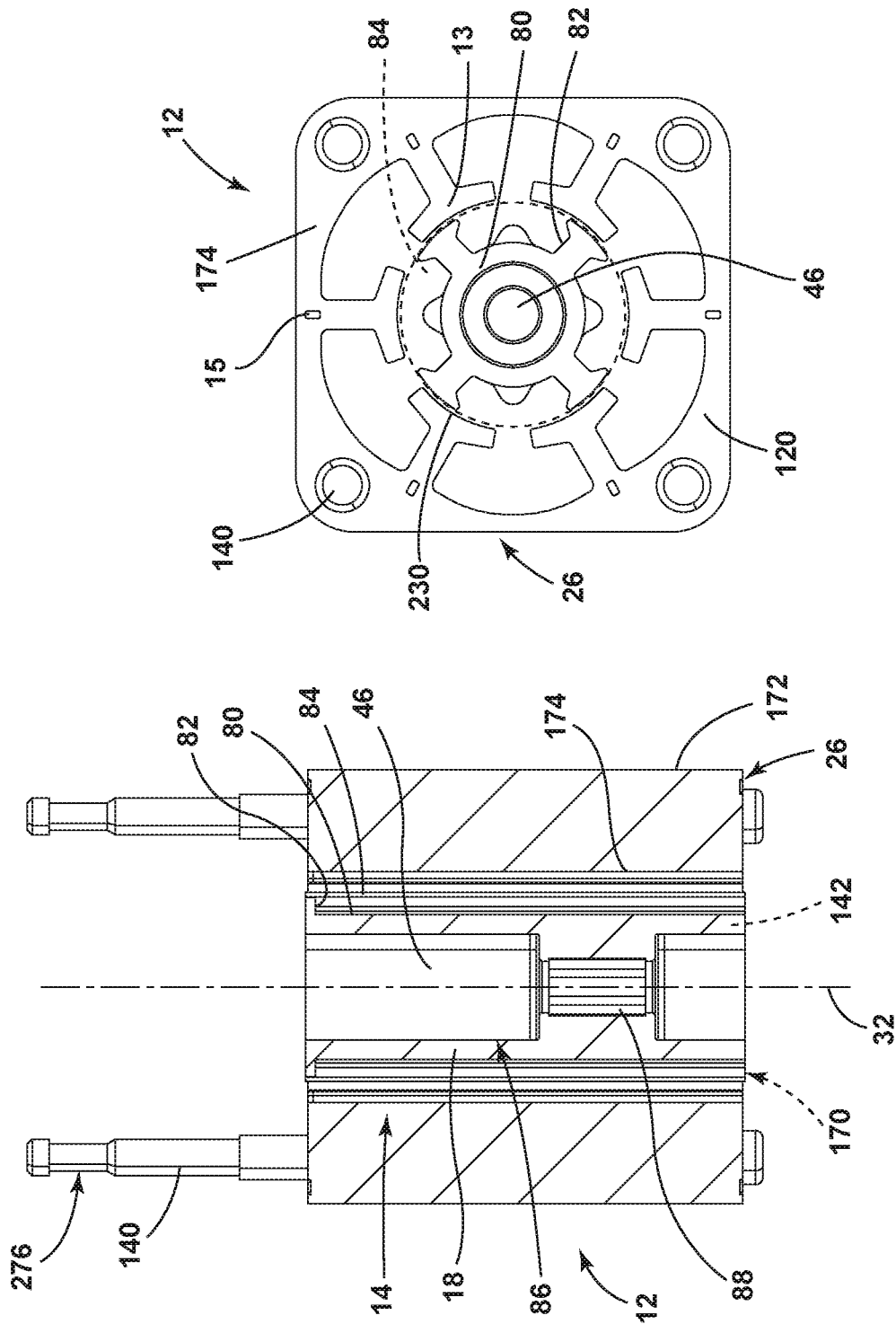
Figure 9:
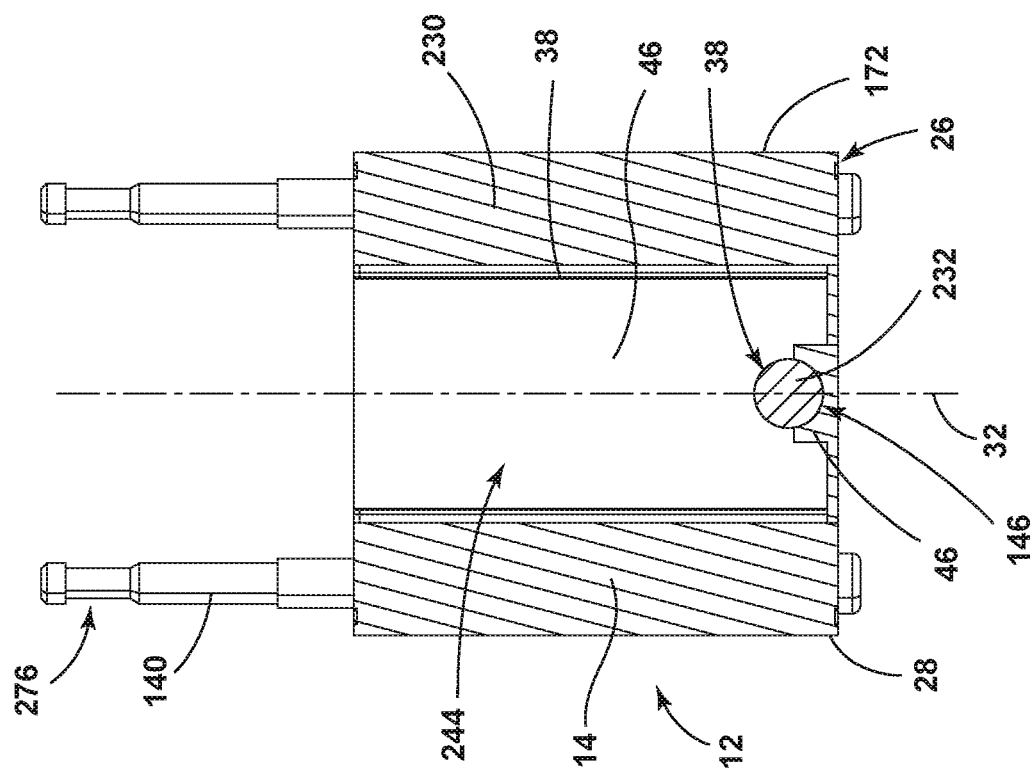
FIG. 9 is a schematic cross-sectional view of an aspect of the stator showing positioning of a bearing ball that is configured to be the bearing assembly for the rotor of the modular fluid pump.
Figure 10A:
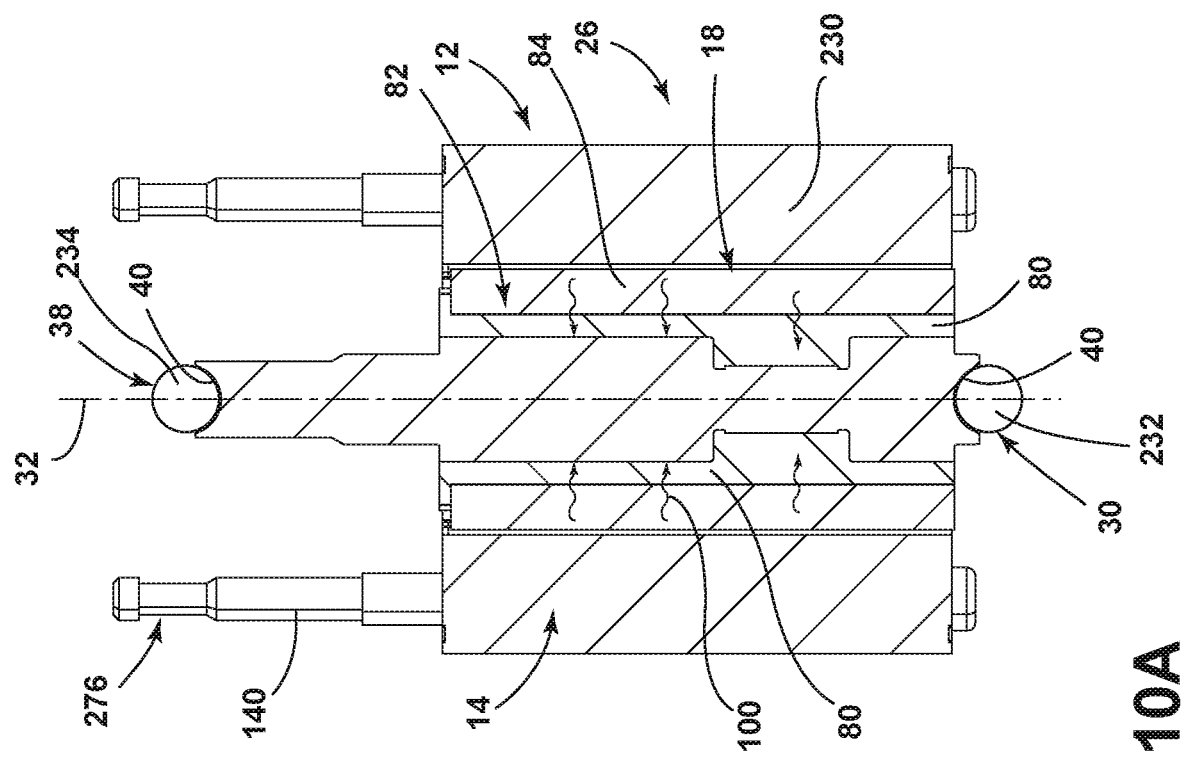
FIGS. 10 and 10A are cross-sectional views of the rotor by itself and also of the rotor positioned within an aspect of the stator, respectively, and showing the configuration of the rotor positioned between the first and second bearing balls.
Figure 10:
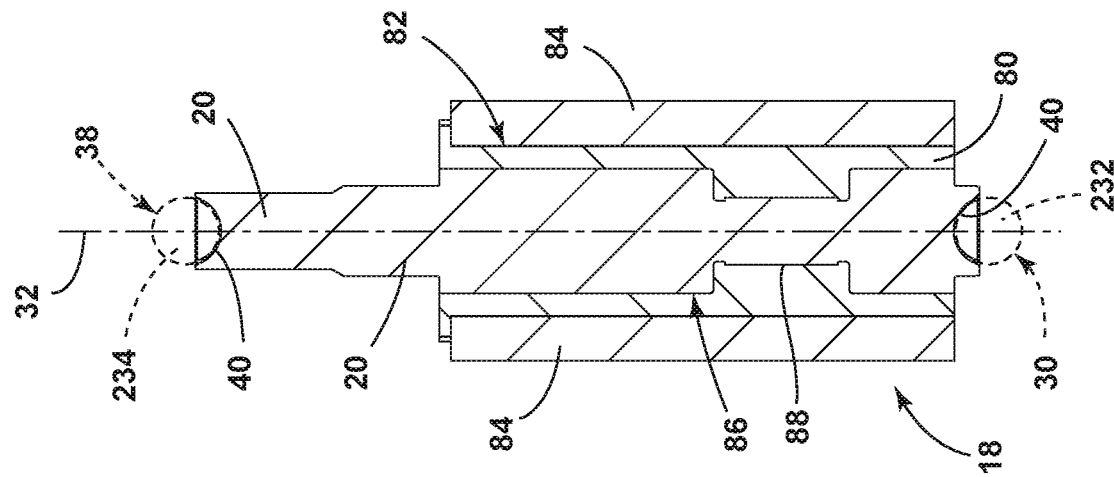
Figures 12, 12A:
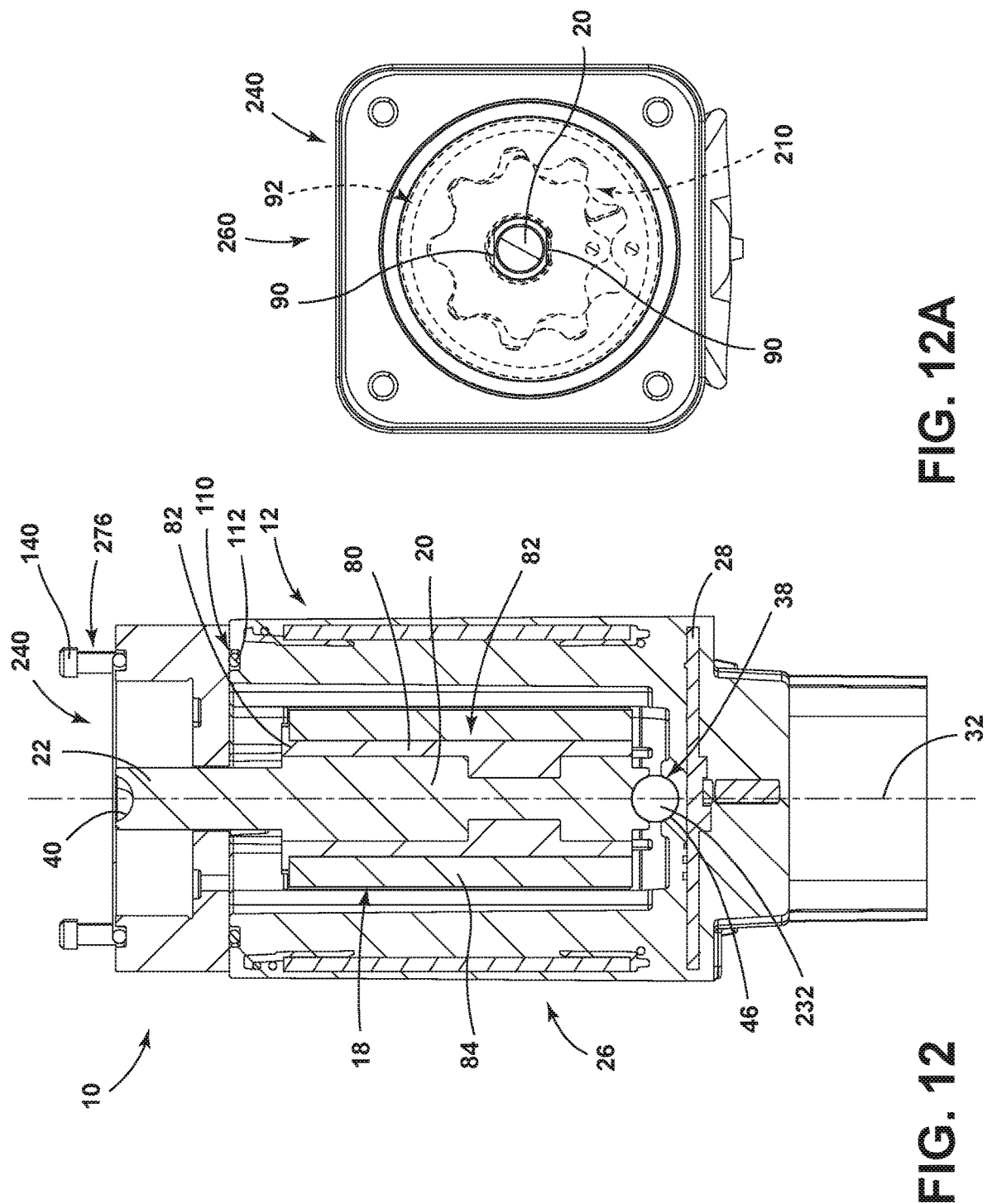
FIGS. 12 and 12A are top plan and cross-sectional views, respectively, of the modular fluid pump of FIG. 1 showing installation of the pump body that at least partially retains the rotor on the bearing ball and aligned along a rotational axis.
Figure 13:
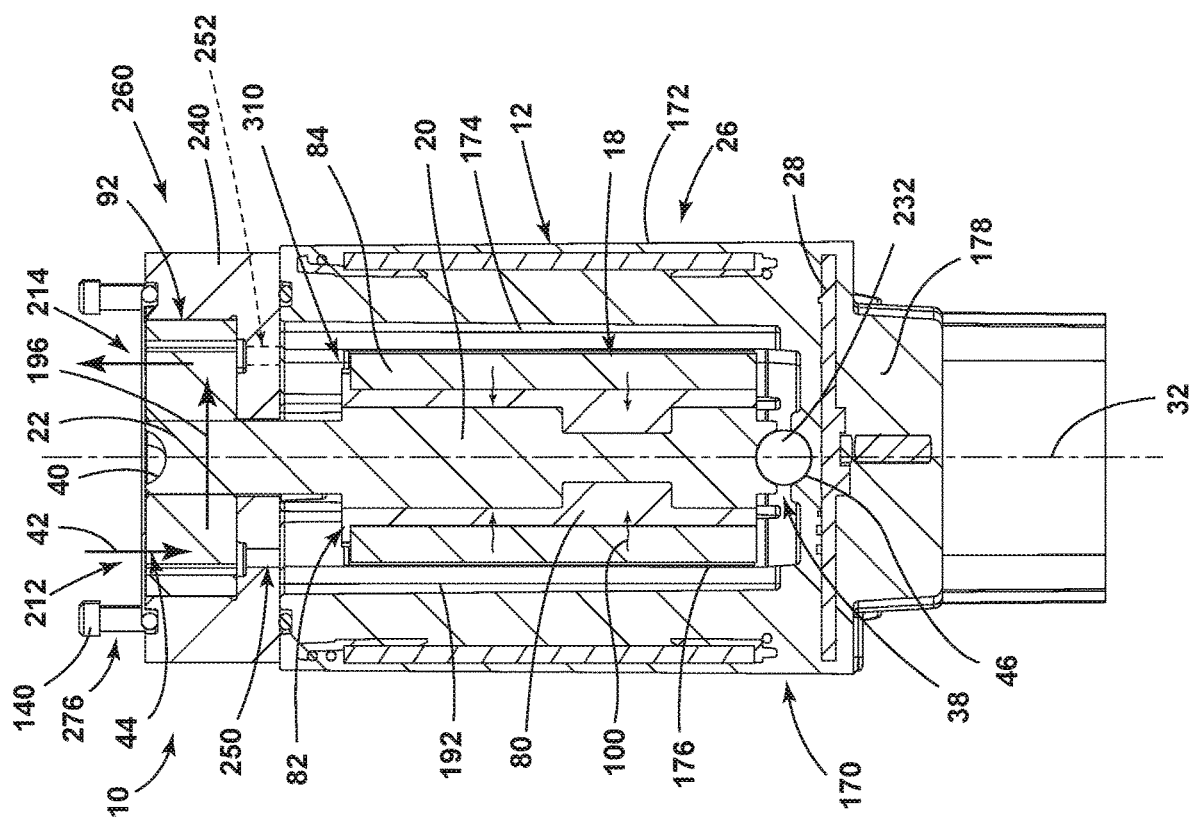
FIG. 13 is a cross-sectional view of the modular fluid pump of FIG. 12 and showing installation of a gerotor within the pump body.
Figure 14:
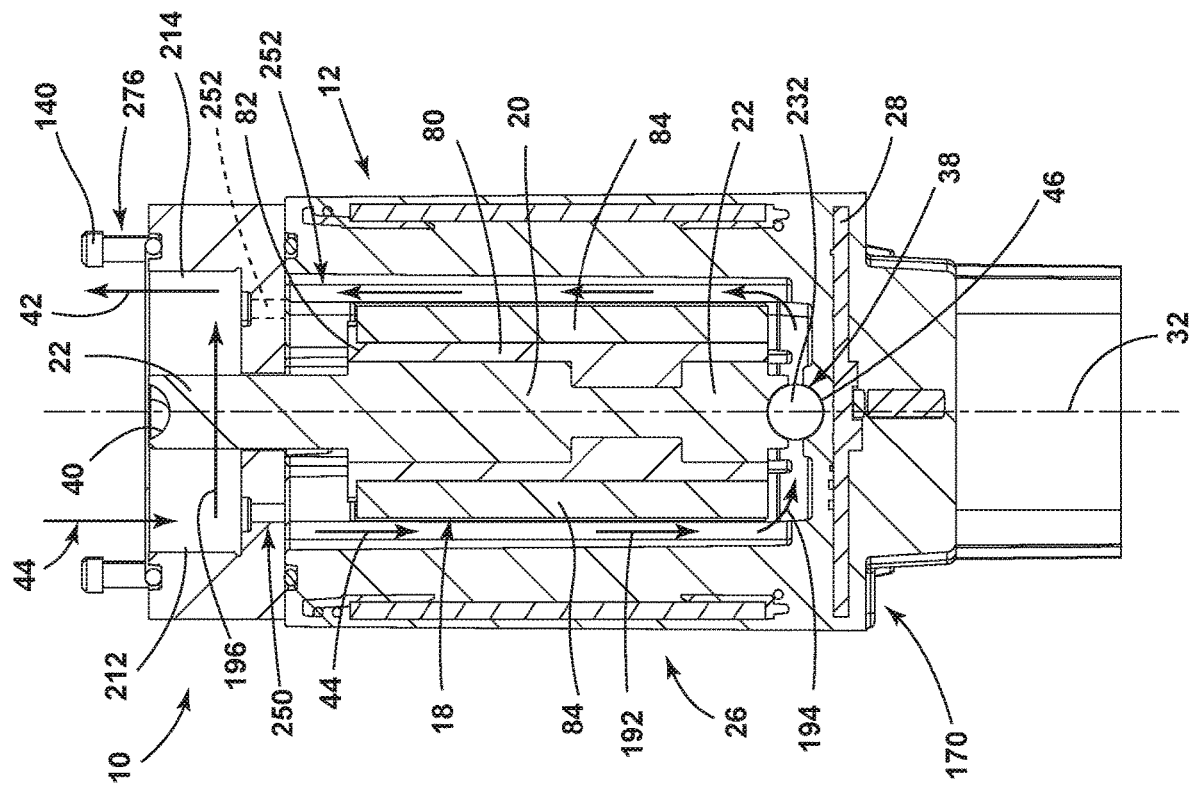
FIG. 14 is a cross-sectional view of the modular fluid pump of FIG. 13 showing installation of a separate sealing assembly.
Figure 15:
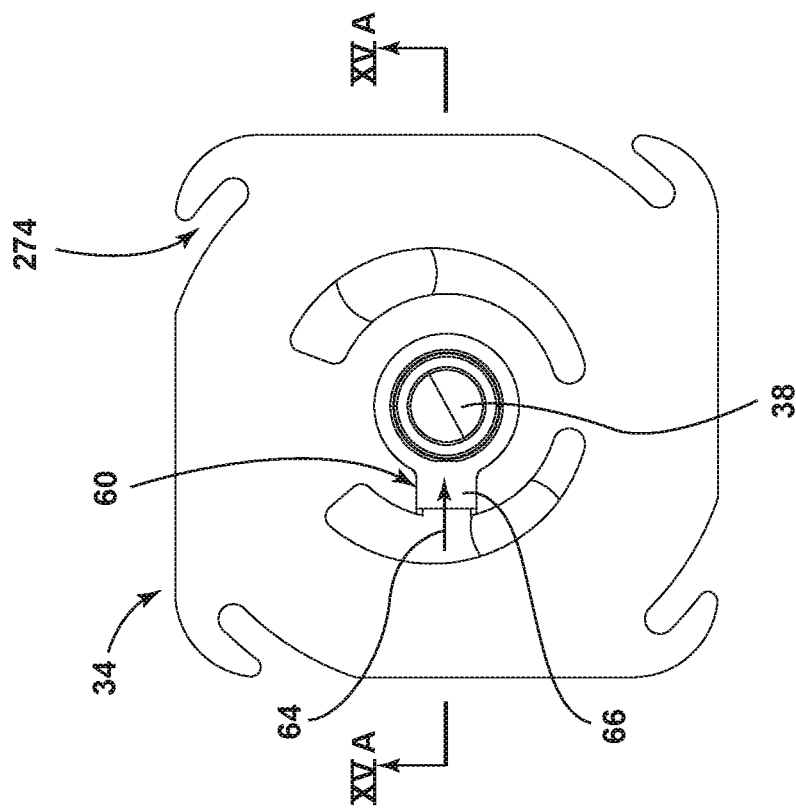
FIG. 15 is a bottom plan view of a securing end cap that is positioned on the retainer dowels and rotationally secured on the pump body, and showing an aspect of a pressure bias fitting for maintaining the rotor within the rotational axis and supported at each end by a bearing ball.
Figure 15A:
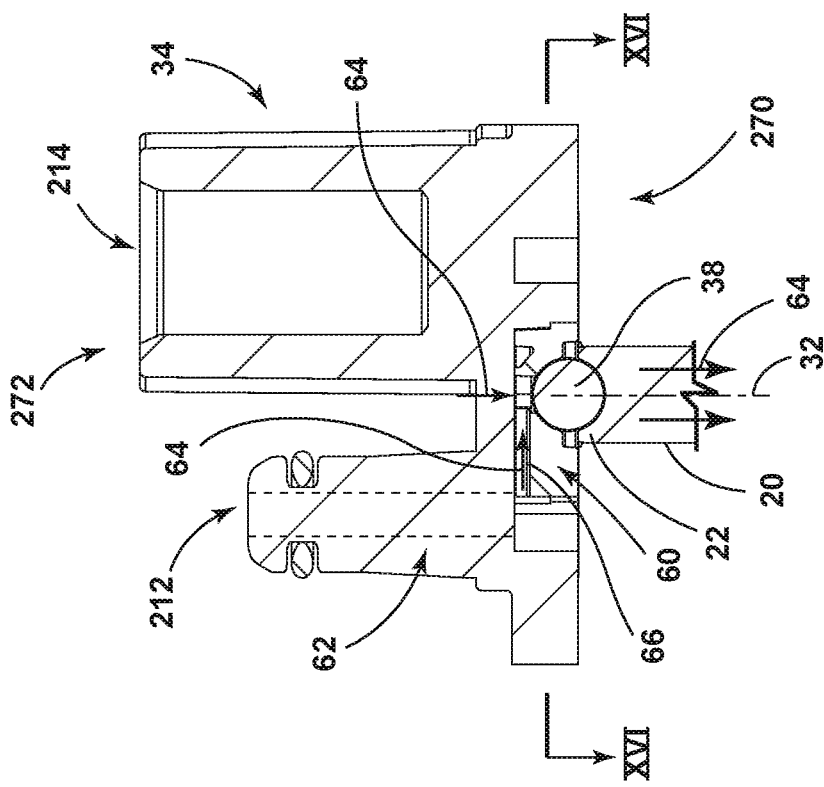
FIG. 15A is a cross-sectional view of the securing end cap of FIG. 15, taken along line XVA-XVA.
Figure 16:
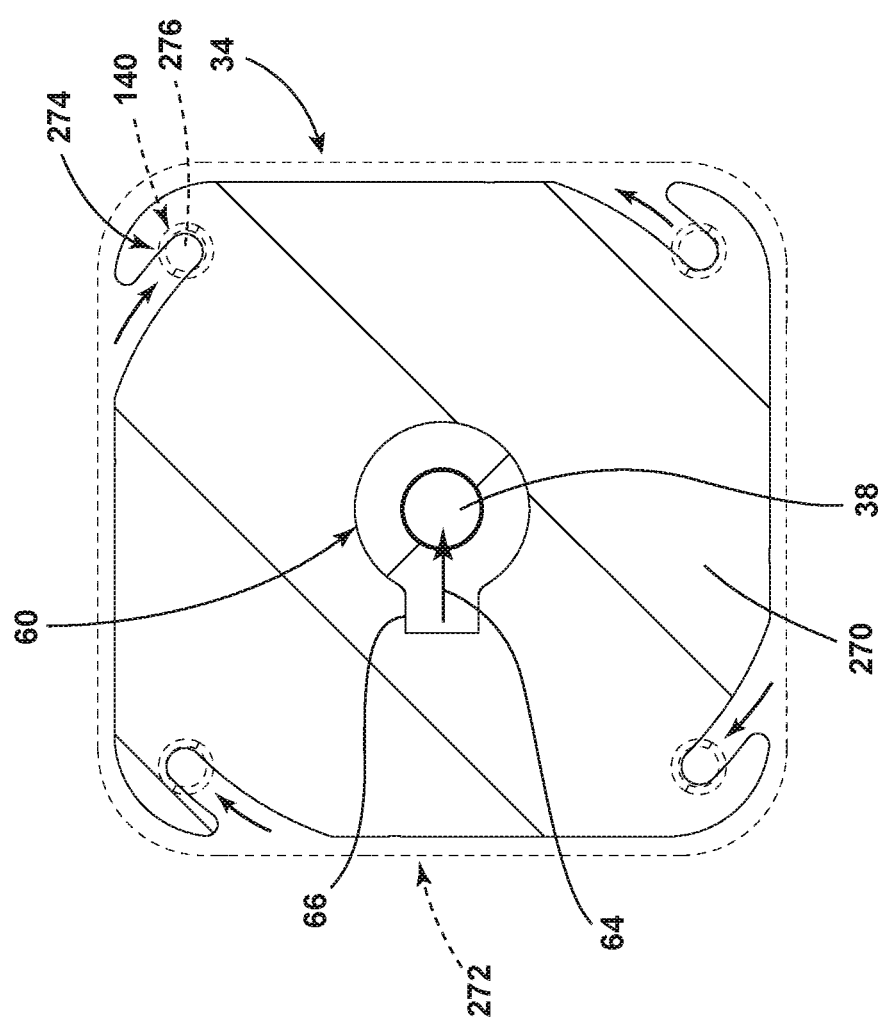
FIG. 16 is a cross-sectional view of the modular fluid pump of FIG. 13 and showing rotational application of the second end cap onto the retainer dowels in a manner that is free of separate fasteners.
Figure 17:
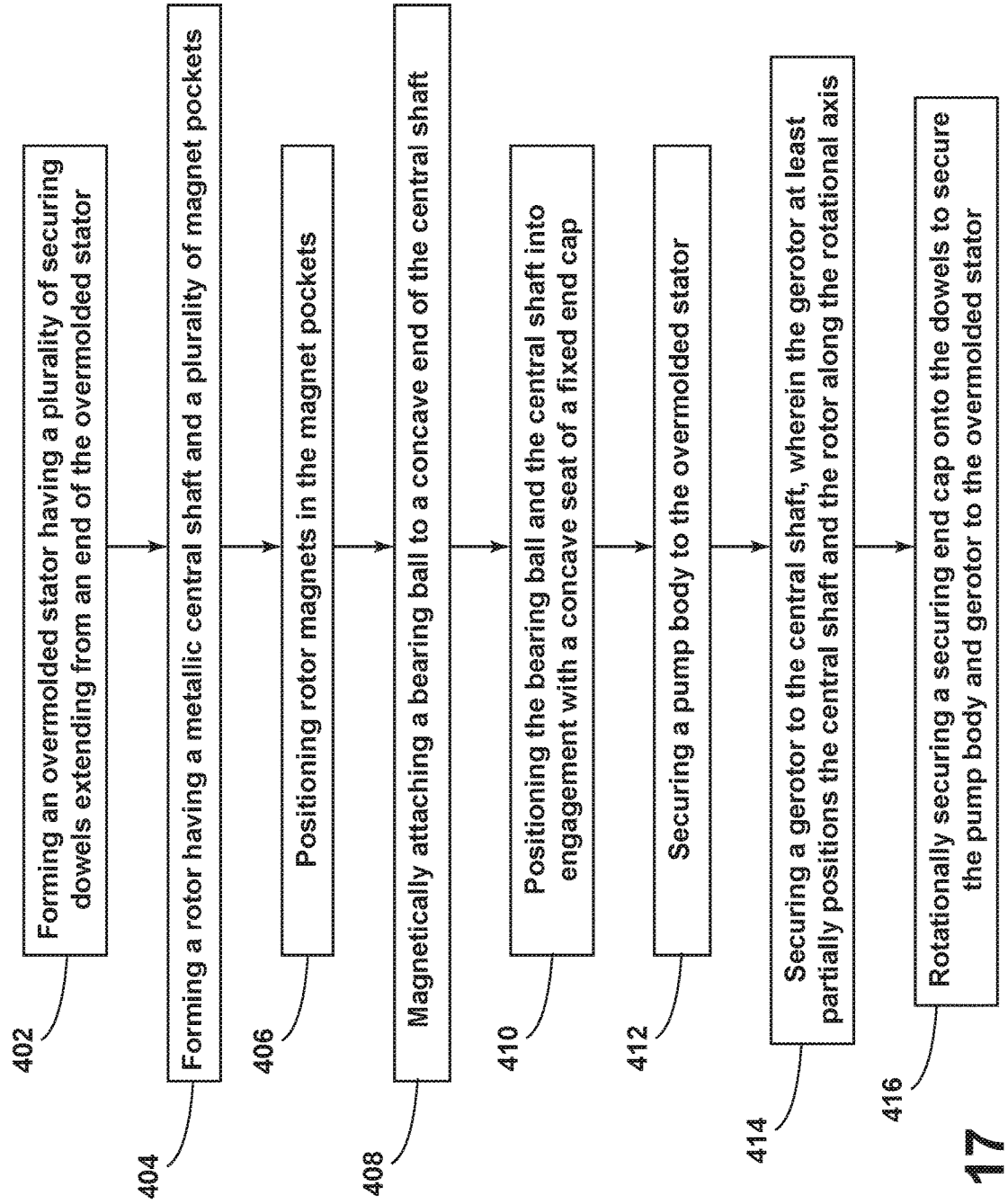
FIG. 17 is a linear flow diagram illustrating a method for forming a modular fluid pump.
Figure 19:
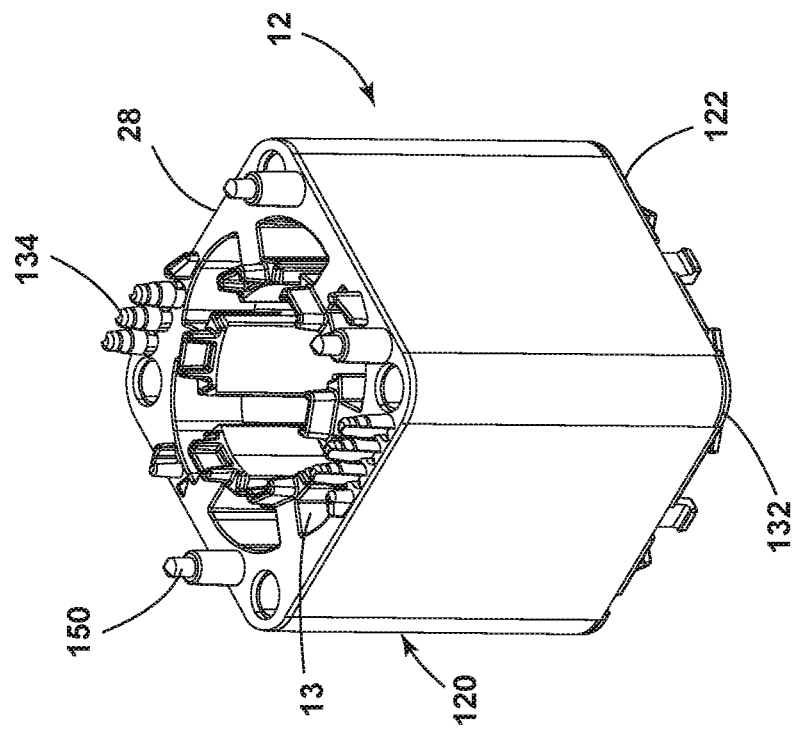
FIG. 19 is a top perspective view of the lamination stack of FIG. 18.
Figure 18:
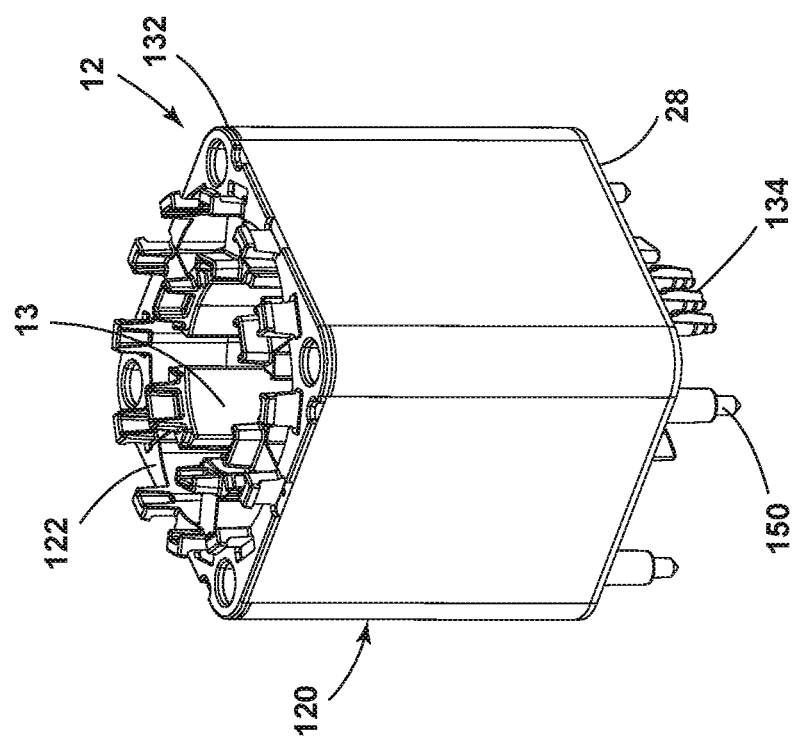
FIG. 18 is a bottom perspective view of a lamination stack for a stator that is used within the modular pump.
Figure 20:
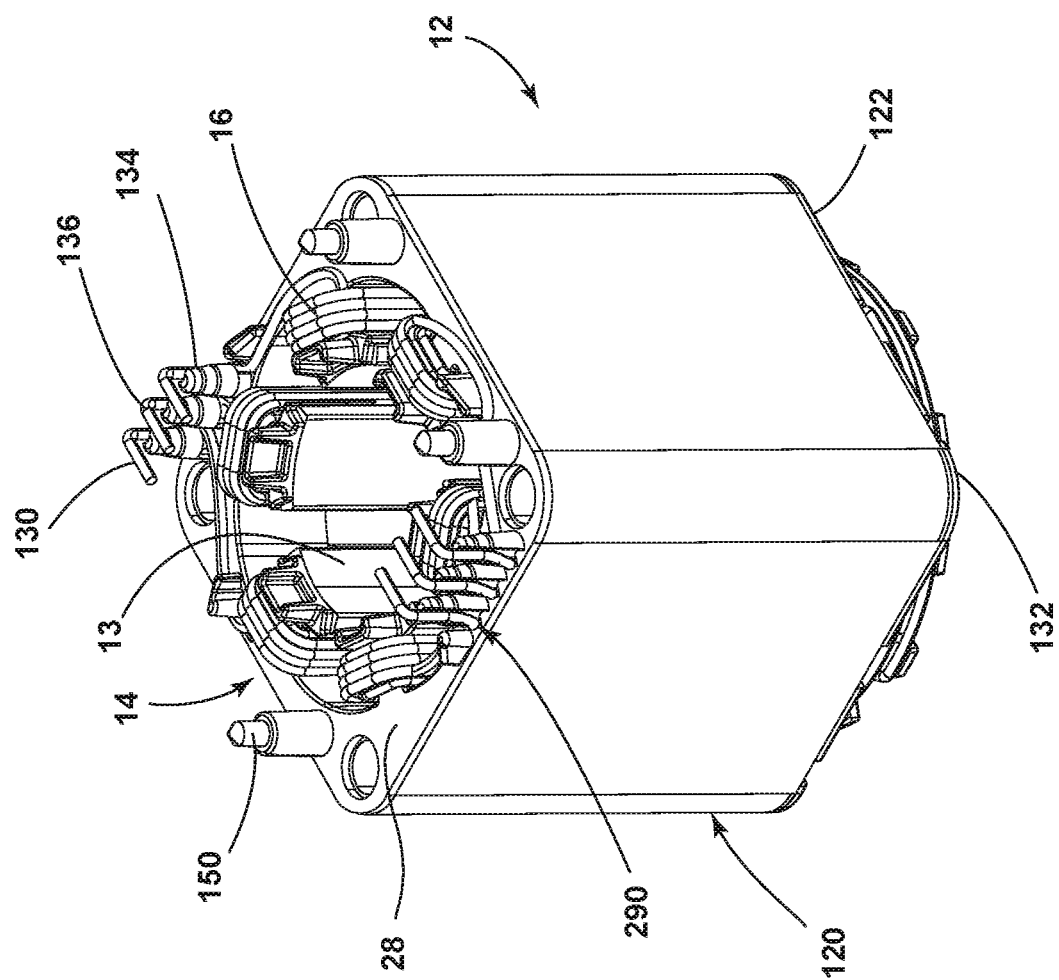
FIG. 20 is a top perspective view of the lamination stack of FIG. 19 with windings and terminal wires installed onto the lamination stack.
Figure 21:
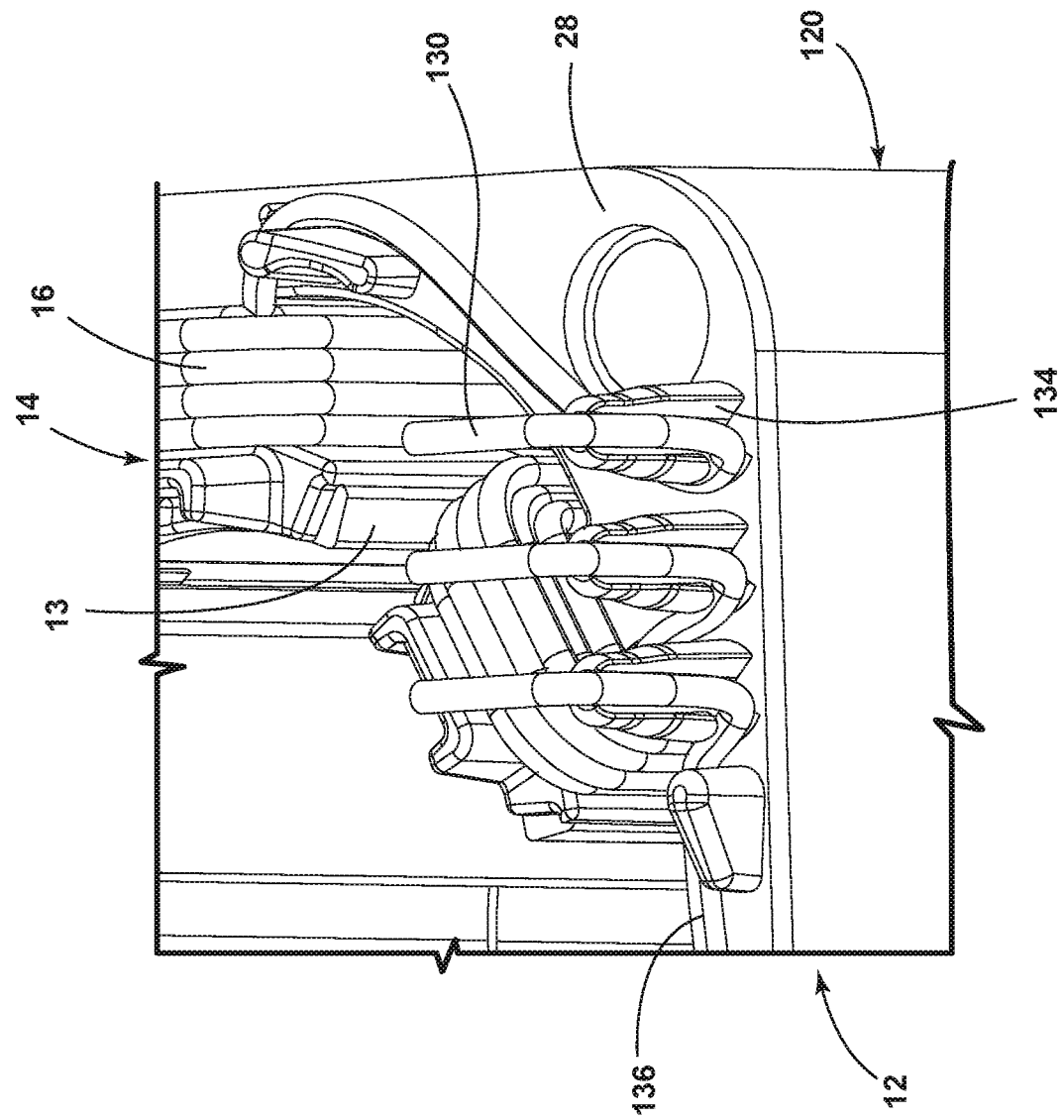
FIG. 21 is an enlarged perspective view of the lamination stack and windings of FIG. 20 and showing the terminal wires located within the securing towers.
Figure 23:
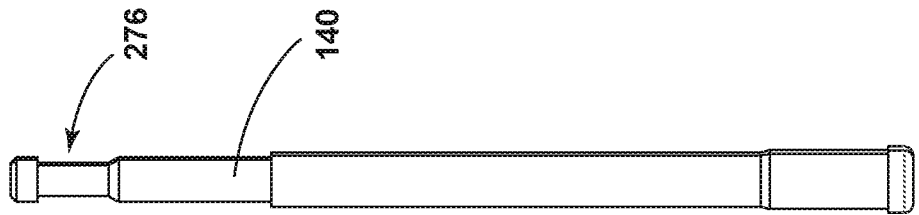
FIG. 23 is a side elevational view of an aspect of the retainer dowel.
Figure 22:
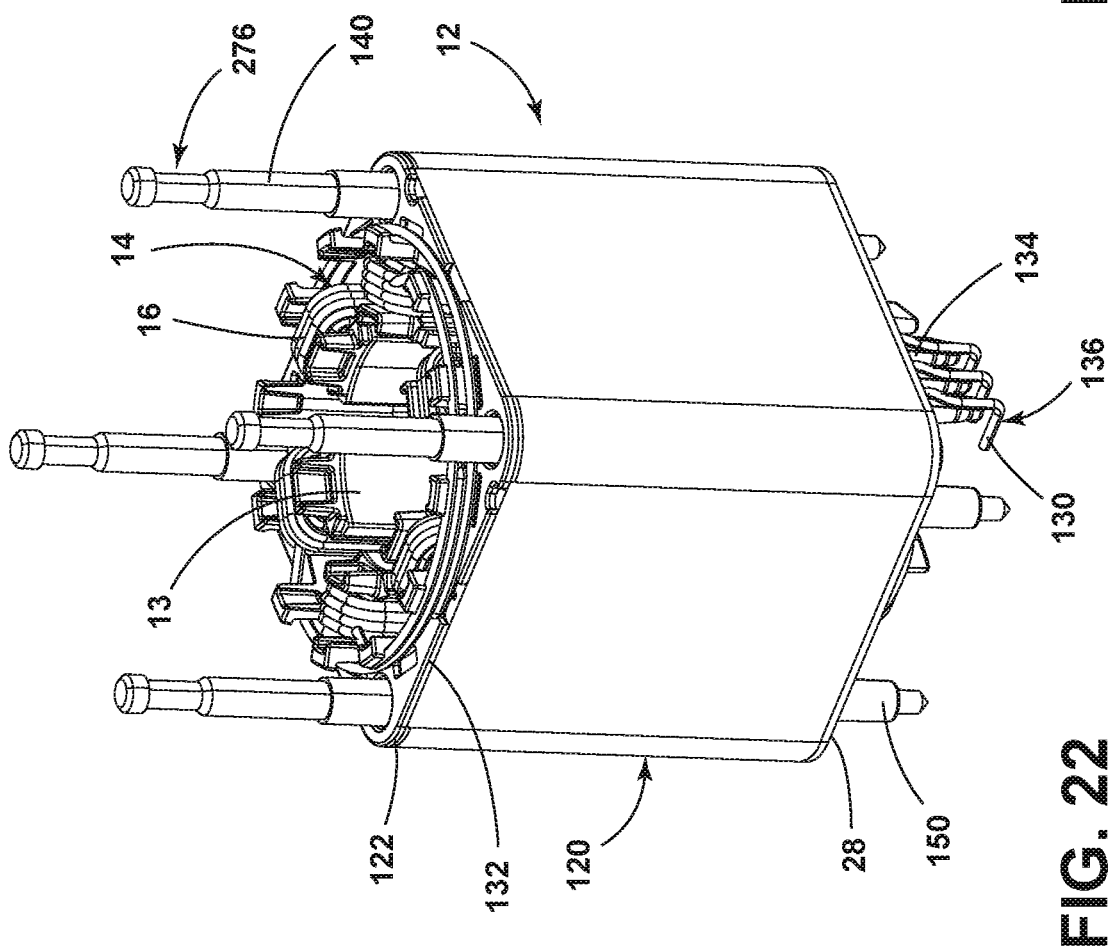
FIG. 22 is a side perspective view of the lamination stack of FIG. 21 and showing installation of the retainer dowels.
Figure 25:
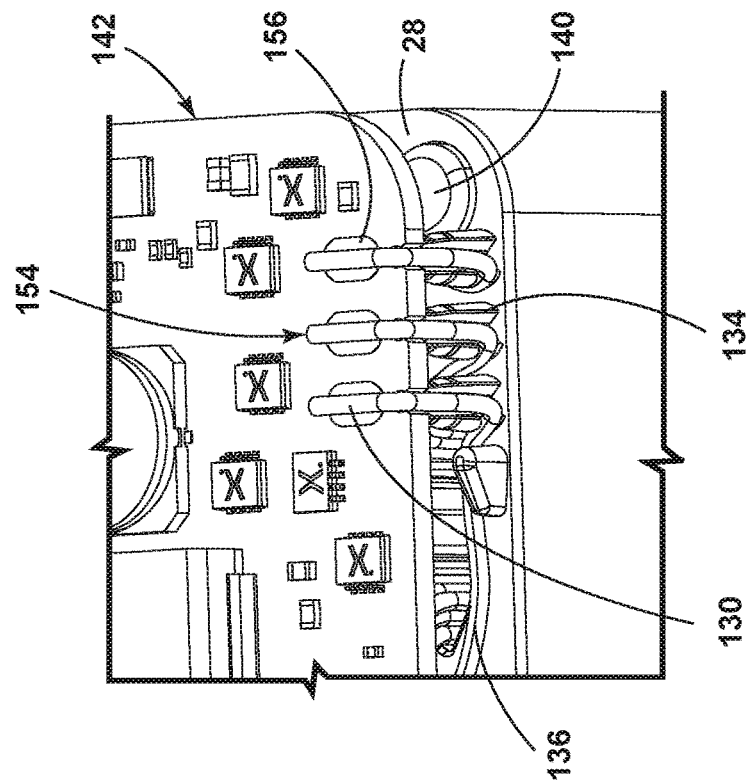
FIG. 25 is an enlarged perspective view of the printed circuit board and lamination stack of FIG. 24.
Figure 24:
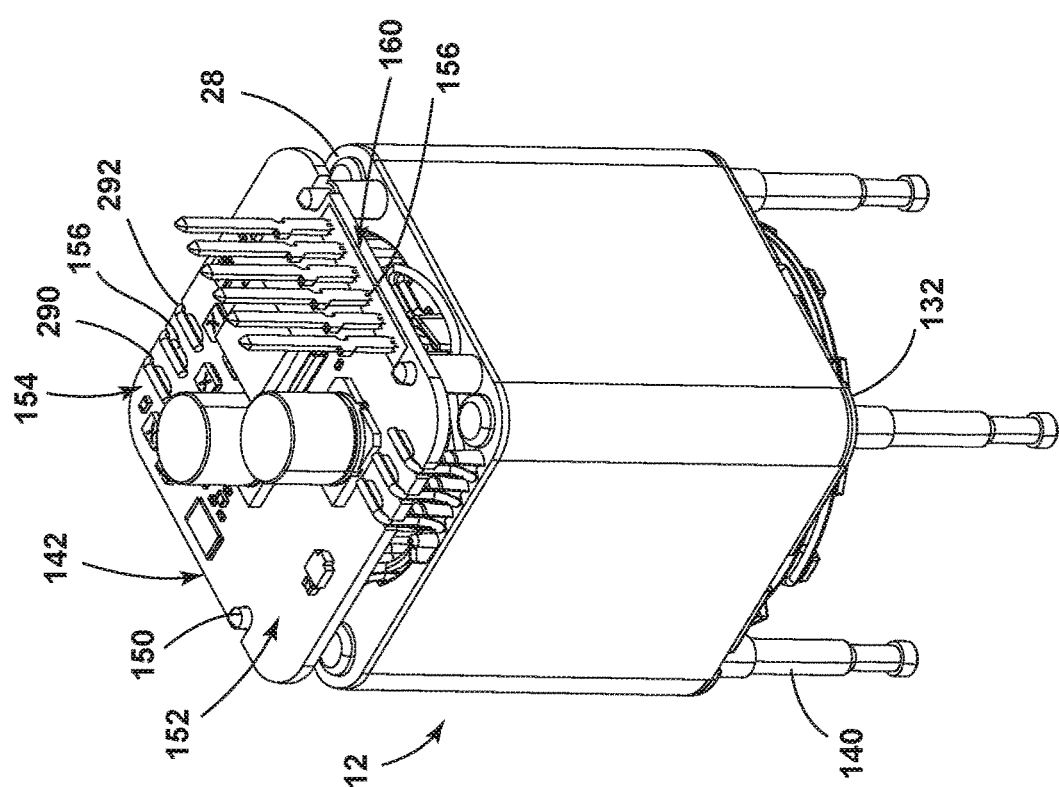
FIG. 24 is a bottom perspective view of the lamination stack shown with the printed circuit board attached and the terminal wires soldered to the printed circuit board.
Figure 26:
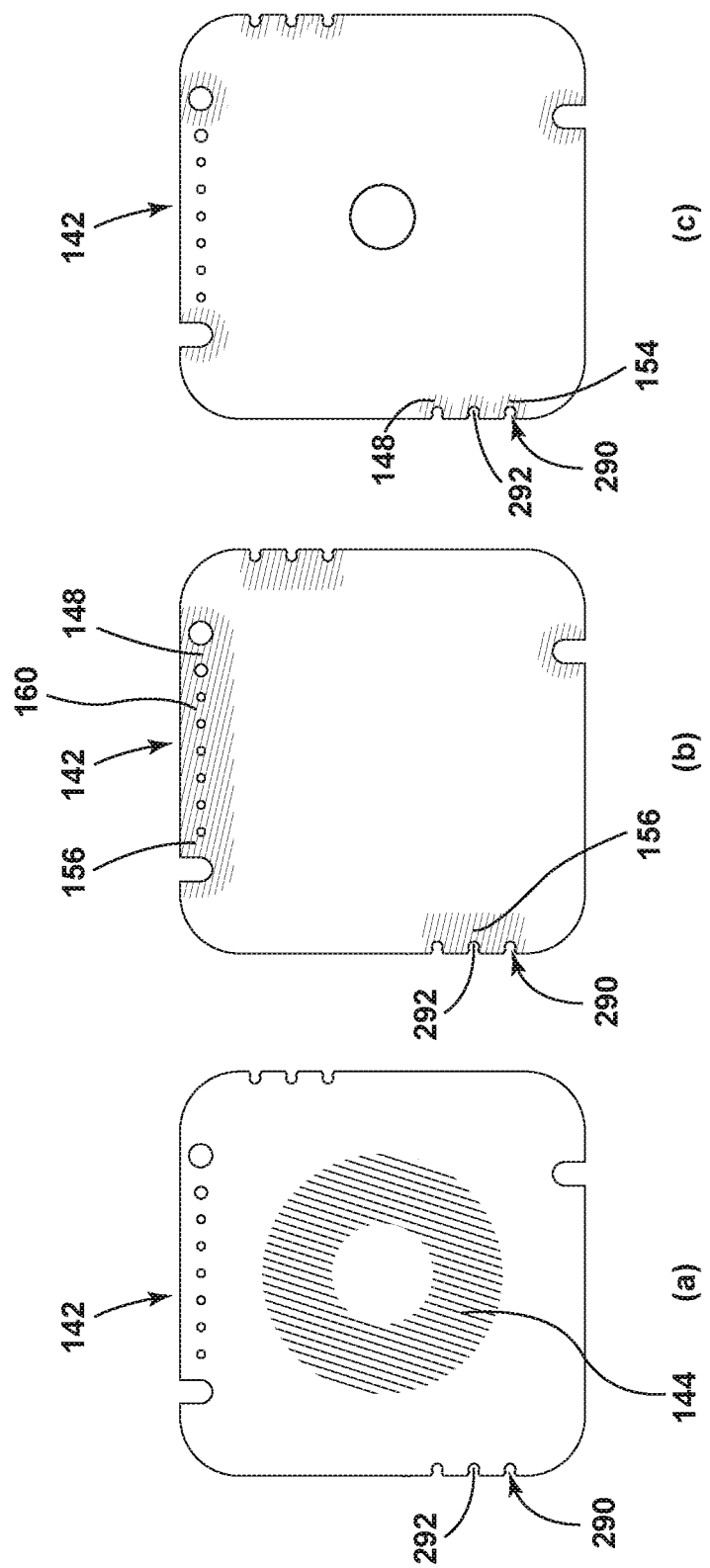
FIGS. 26A-C are schematic views of the top and bottom sides of the printed circuit board and showing various cooling zones and attachment zones within the printed circuit board.
Figures 27, 28:
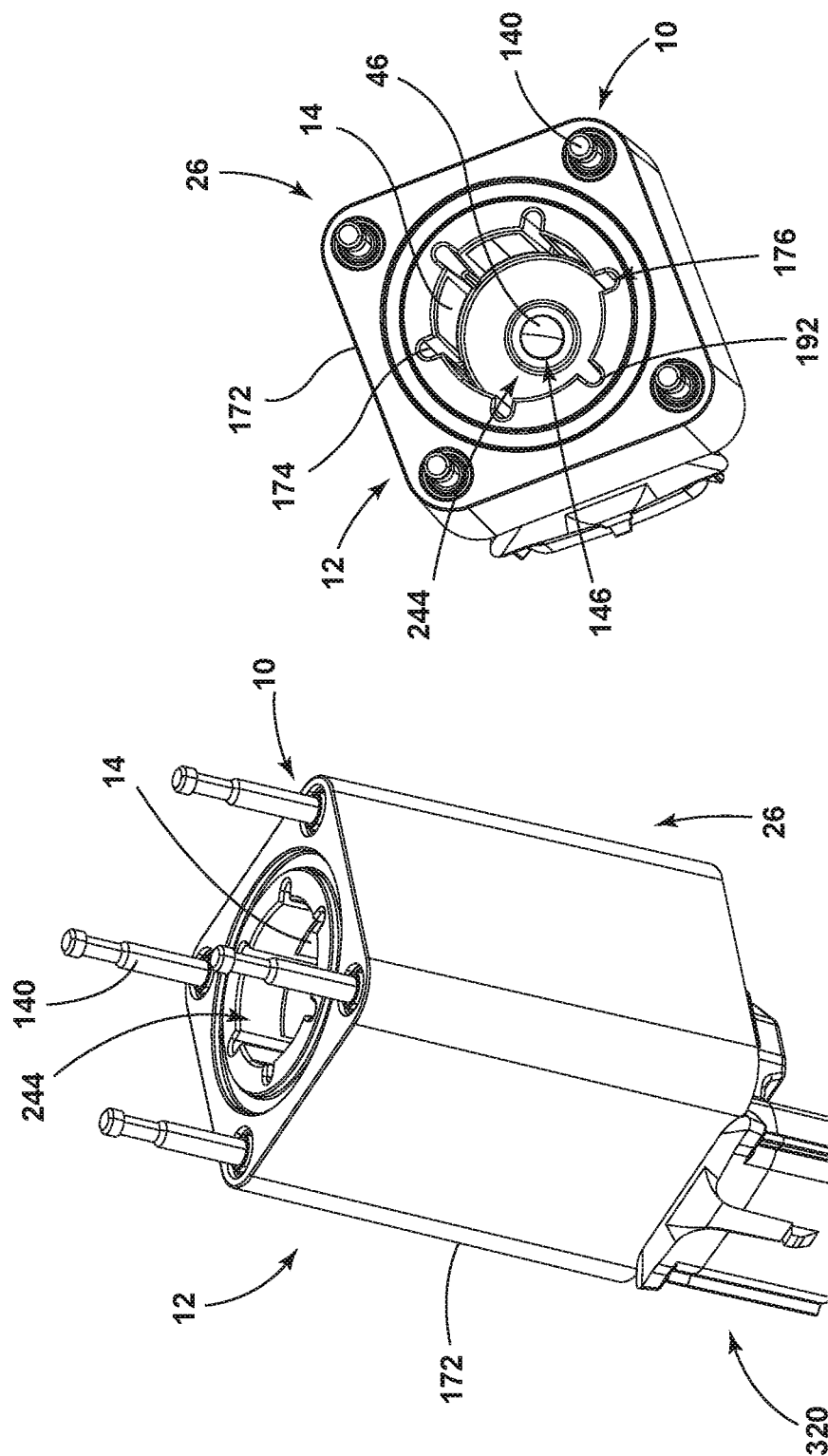
FIG. 27 is a top perspective view of the overmolded stator for the modular pump.
FIG. 28 is a top perspective view of the overmolded stator of FIG. 27.
Figure 29:
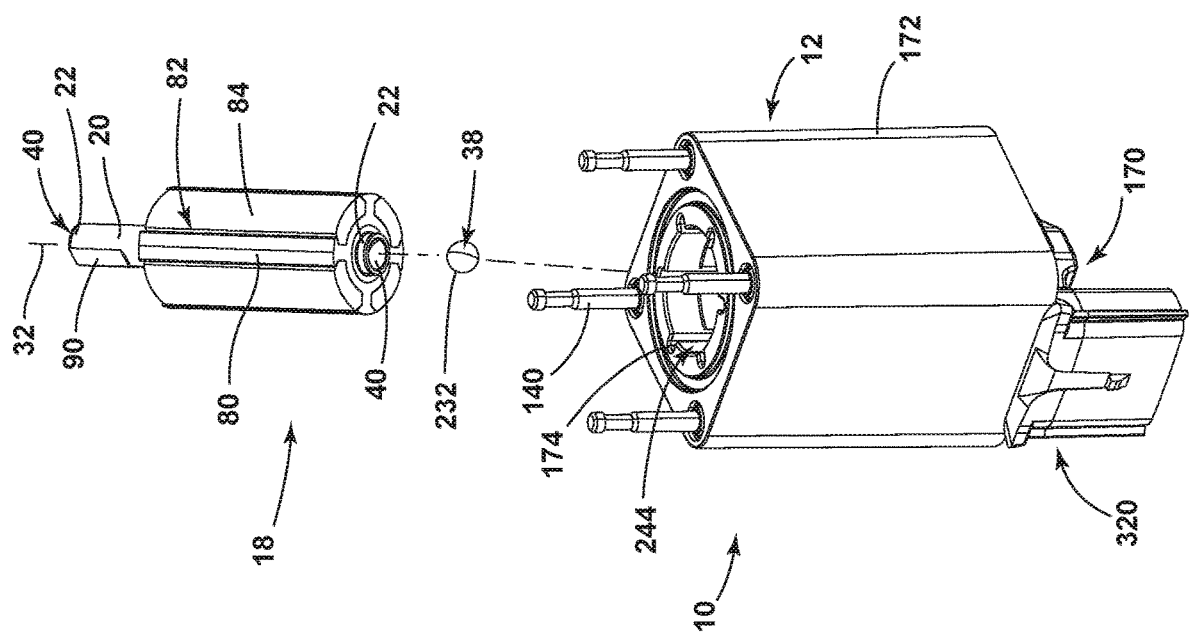
FIG. 29 is an exploded perspective view of the overmolded stator, rotor and bearing ball for the modular pump.
Figure 32:
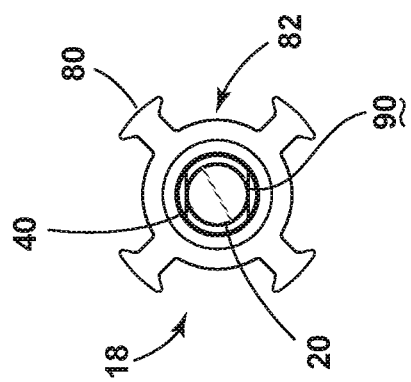
FIGS. 30-32 are top plan views of various aspects of the central shaft and rotor implementing various materials and configurations.
Figure 31:
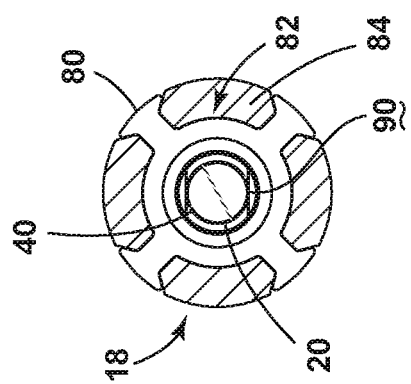
Figure 30:
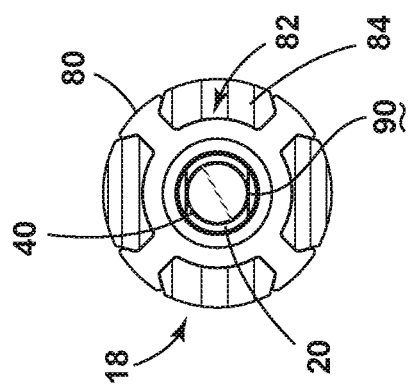
Figure 33:
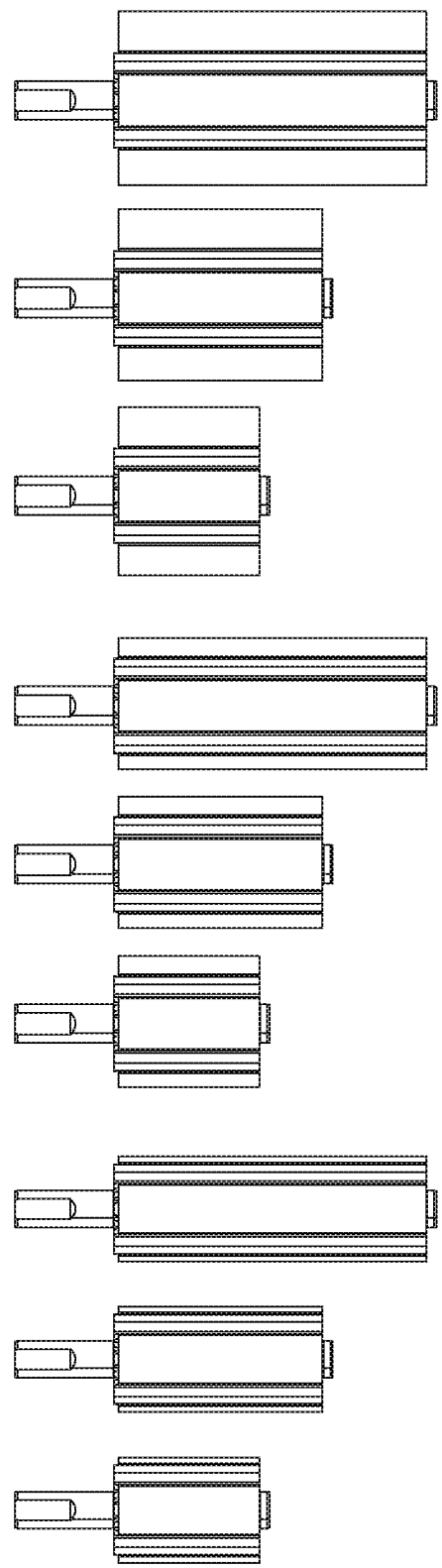
FIG. 33 is a schematic view of a series of rotor configurations that are used within scalable aspects of the modular pump.
Figure 34:
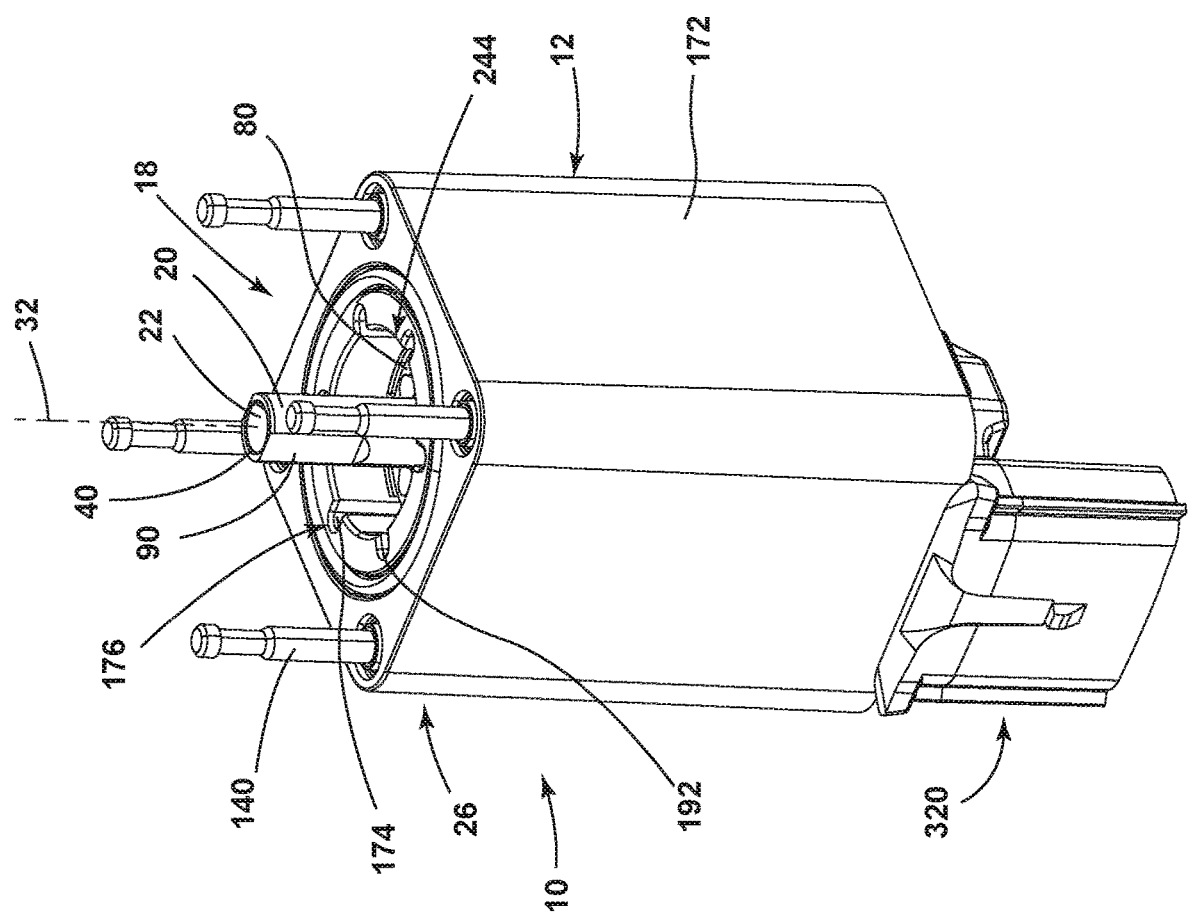
FIG. 34 is a top perspective view of the rotor installed within the overmolded stator for an aspect of the modular pump.
Figure 36:
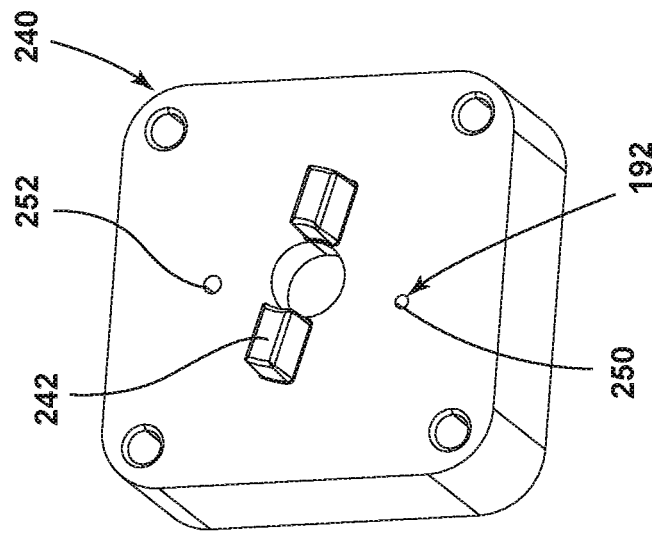
FIG. 36 is a bottom perspective view of the pump body showing separating paddles that separate the pressure side from the suction side within the rotor cavity.
Figure 35:
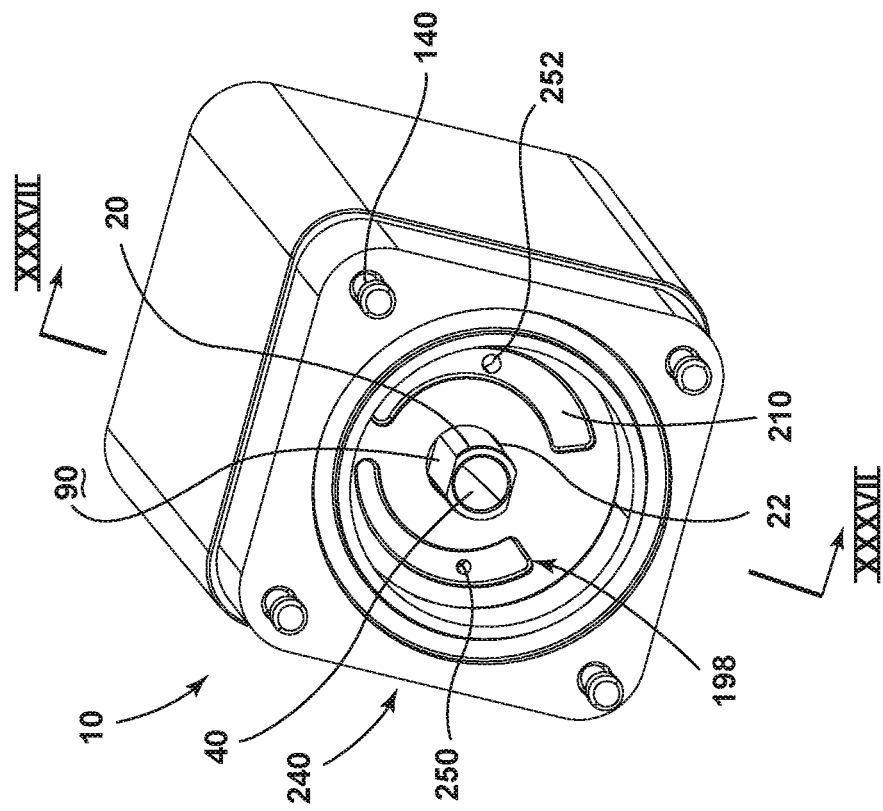
FIG. 35 is a top perspective view of an aspect of the modular pump showing connection of the pump body with the retainer dowels in the overmolded stator.
Figure 37:
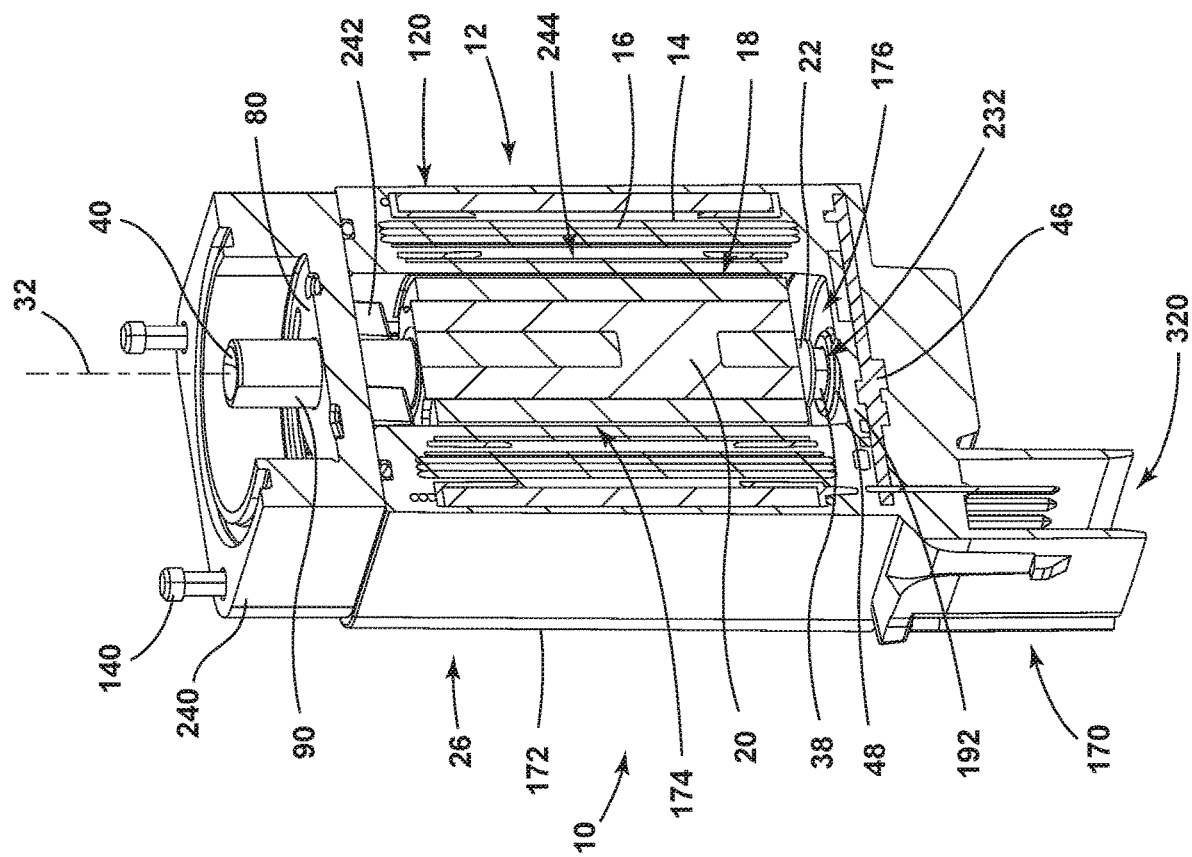
FIG. 37 is a cross-sectional perspective view of the modular pump of FIG. 35 taken along line XXXVII-XXXVII.
Figure 43:
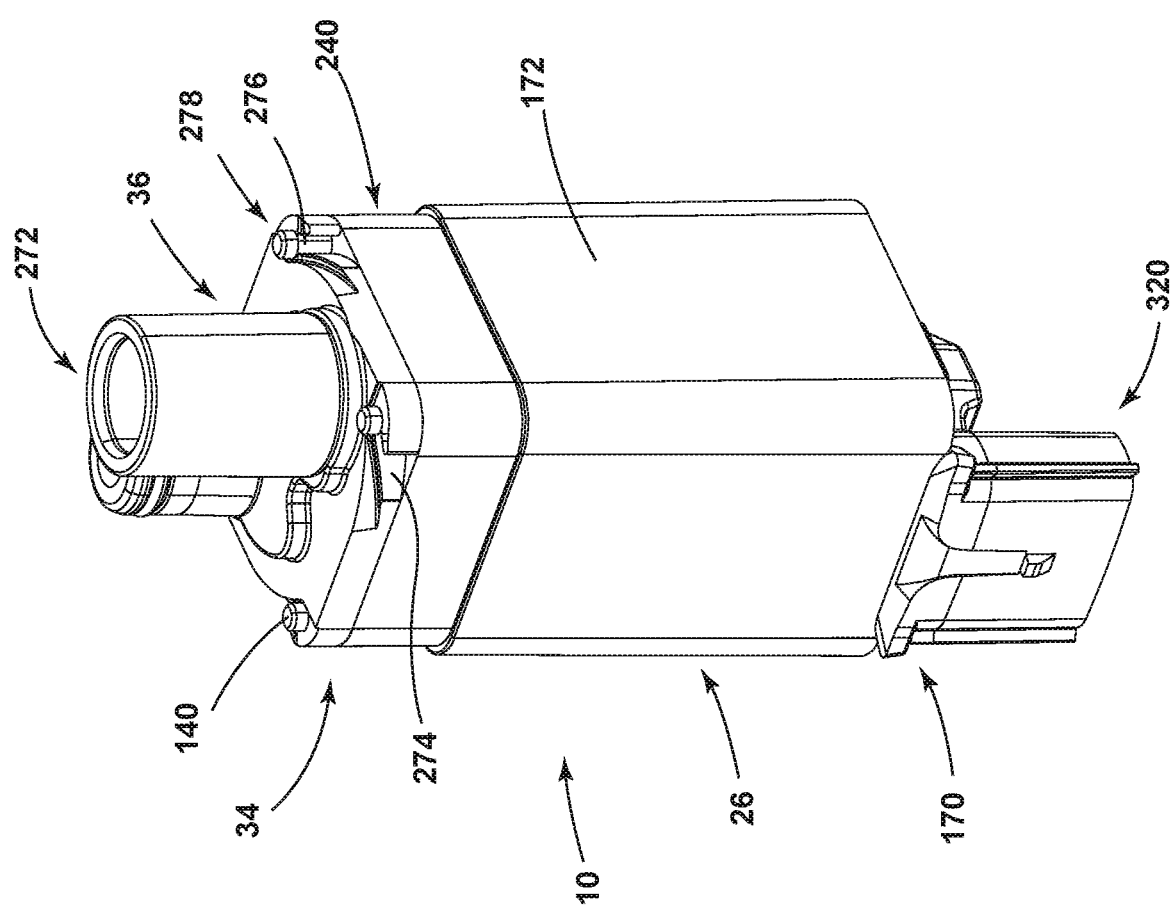
FIG. 43 is a side perspective view of an aspect of the modular oil or water pump.
Figure 47:
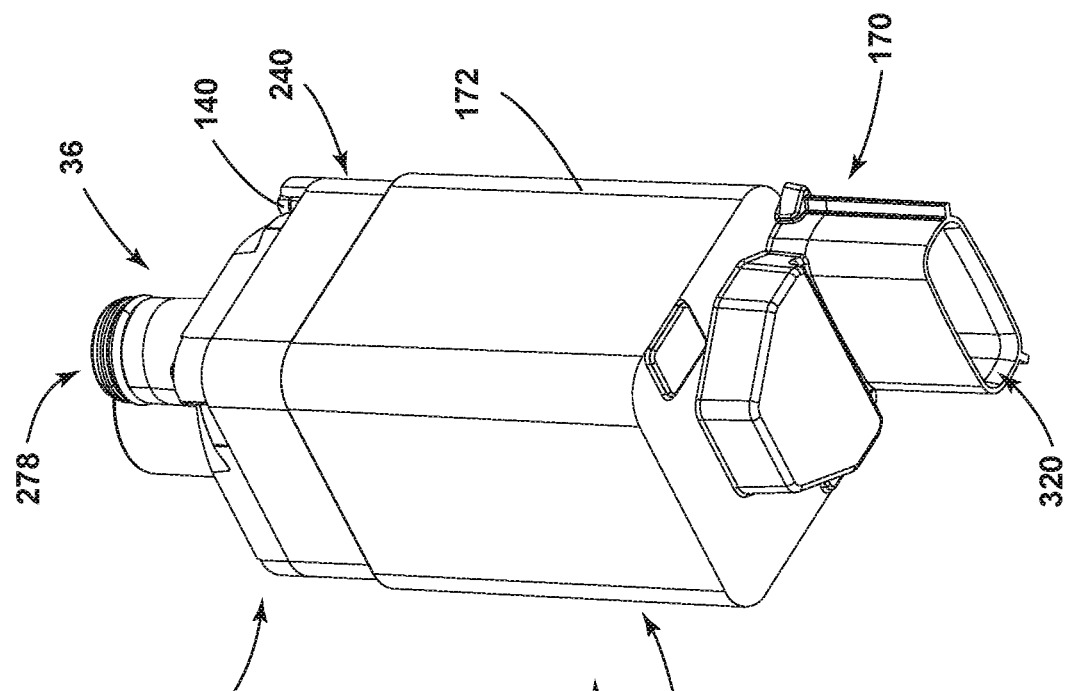
FIG. 47 is another bottom side perspective view of an aspect of the modular fluid pump.
Figure 46:
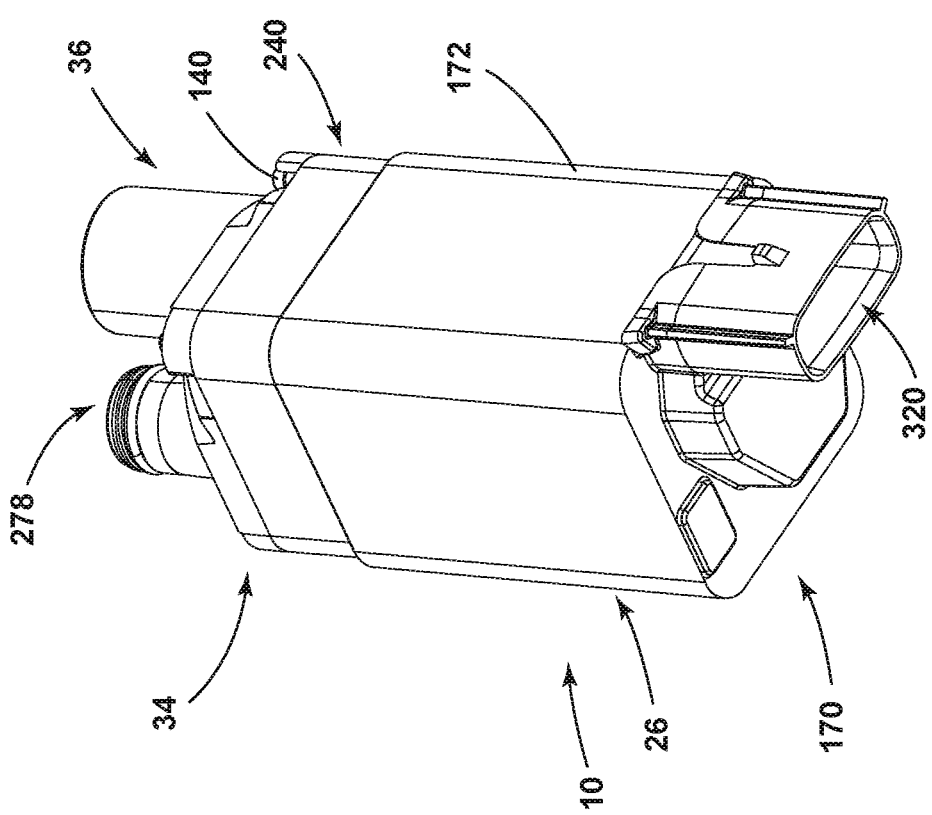
FIG. 46 is a bottom side perspective view of an aspect of the modular fluid pump.
Figure 49:
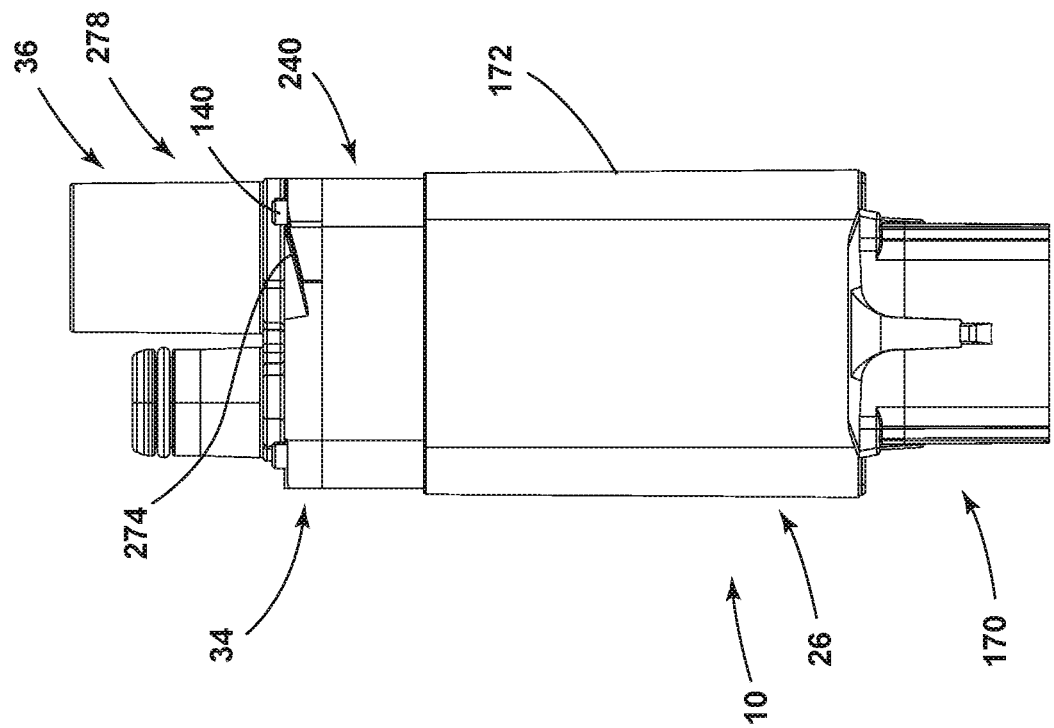
FIG. 49 is a second side elevational view of the modular fluid pump of FIG. 48.
Figure 48:
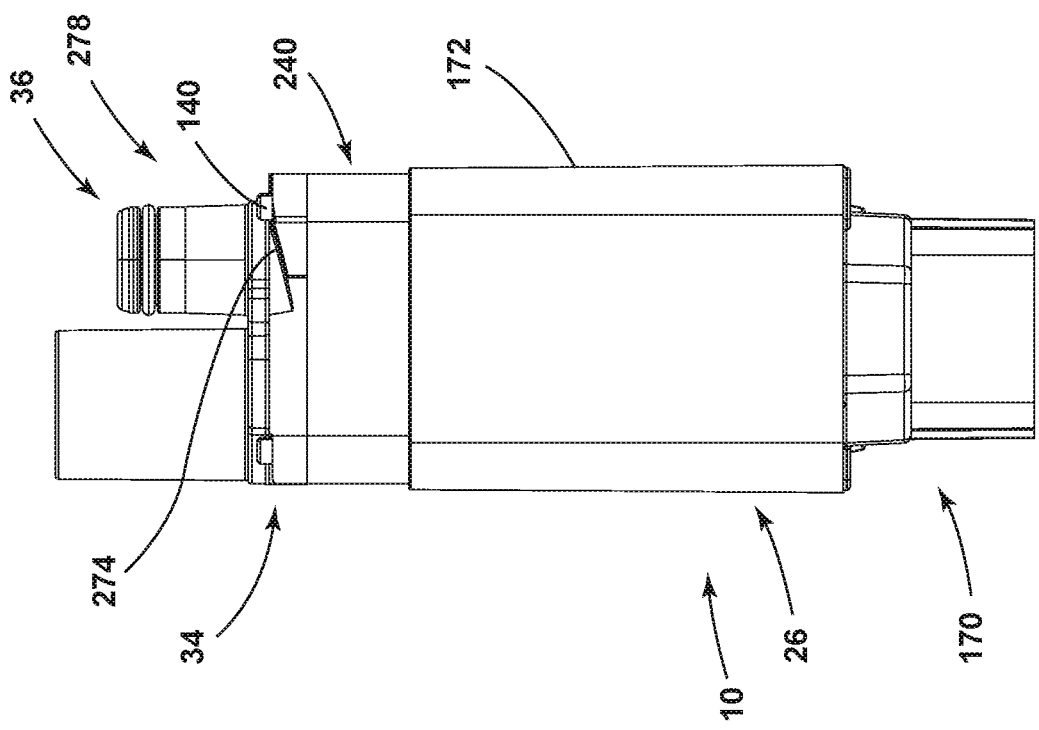
FIG. 48 is a first side elevational view of an aspect of the modular fluid pump.
Figure 51:
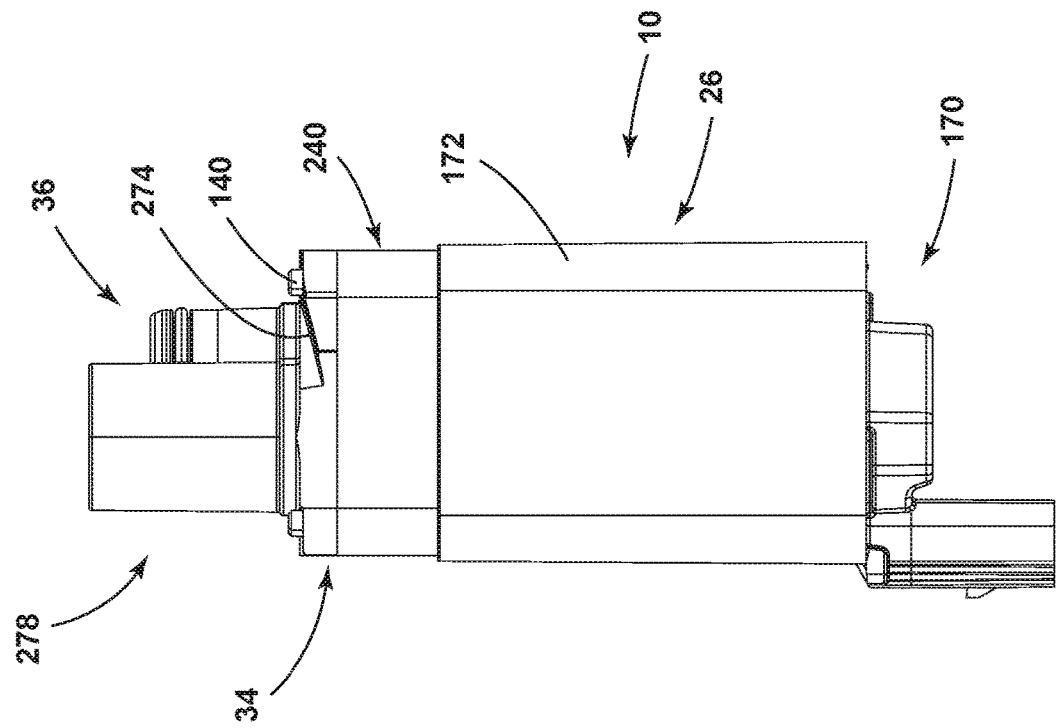
FIG. 51 is a fourth side elevational view of the modular fluid pump of FIG. 48.
Figure 50:
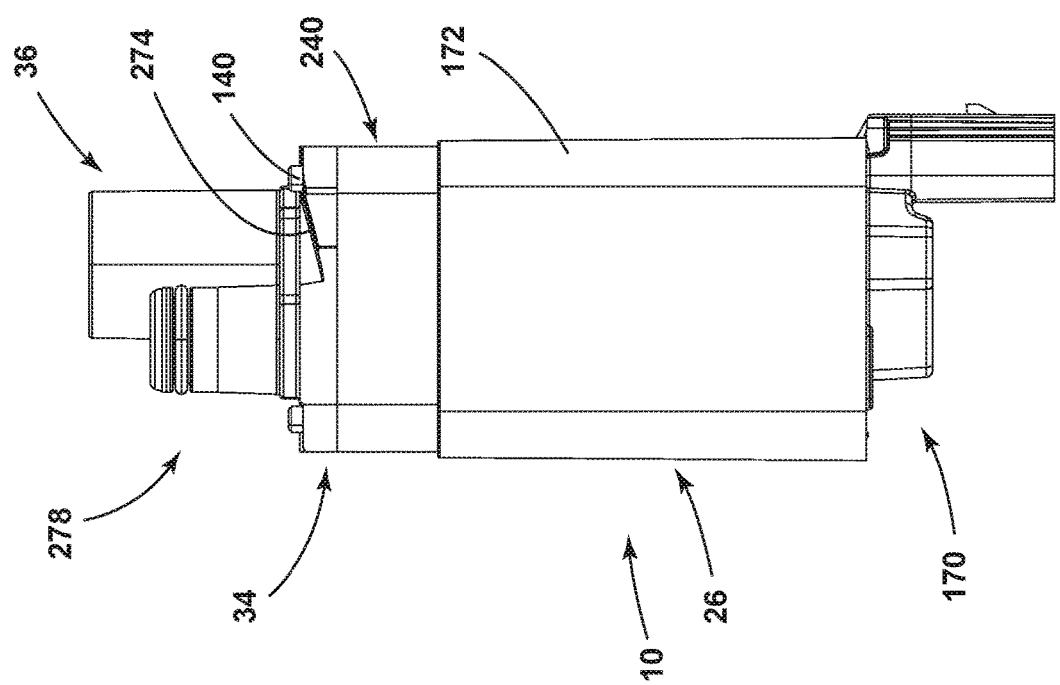
FIG. 50 is a third side elevational view of the modular fluid pump of FIG. 48.
Figures 52, 53:
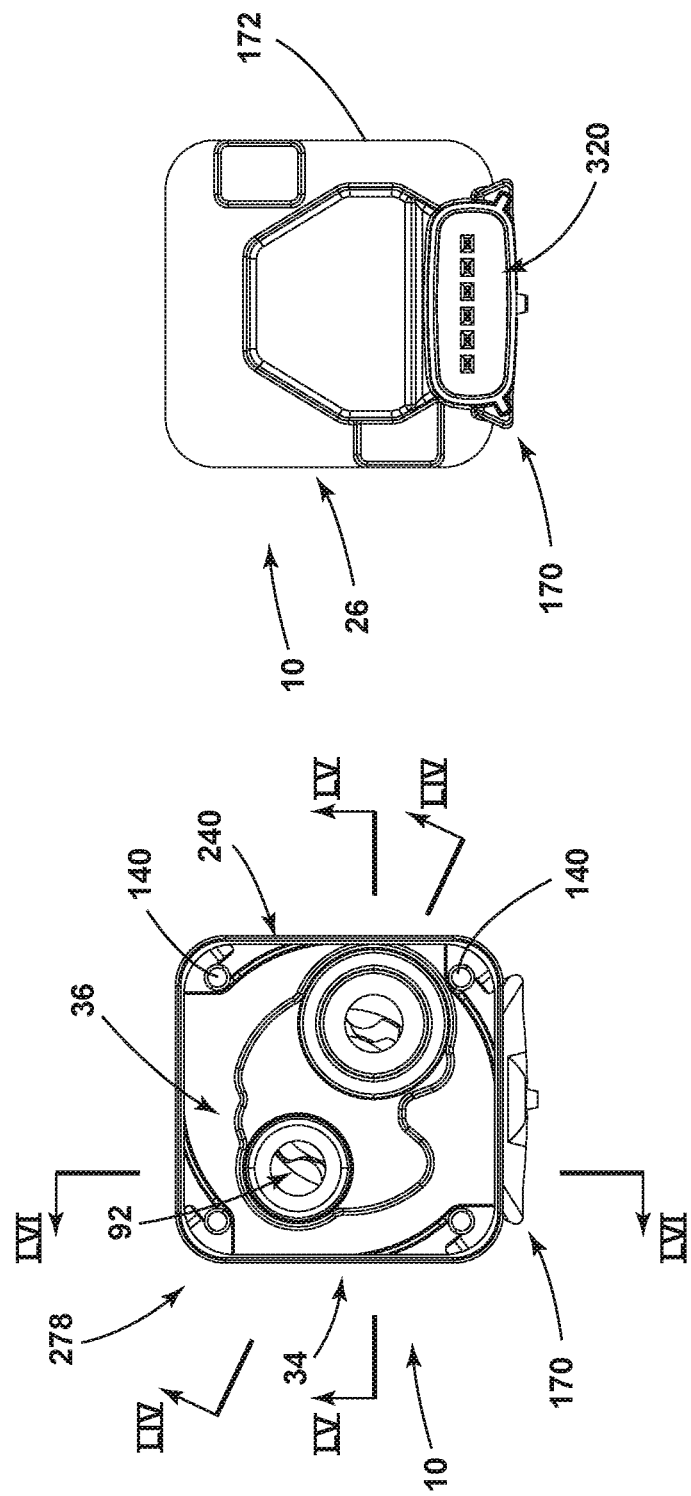
FIG. 52 is a top plan view of the modular fluid pump of FIG. 48.
FIG. 53 is a bottom plan view of the modular fluid pump of FIG. 48.
Figure 57:
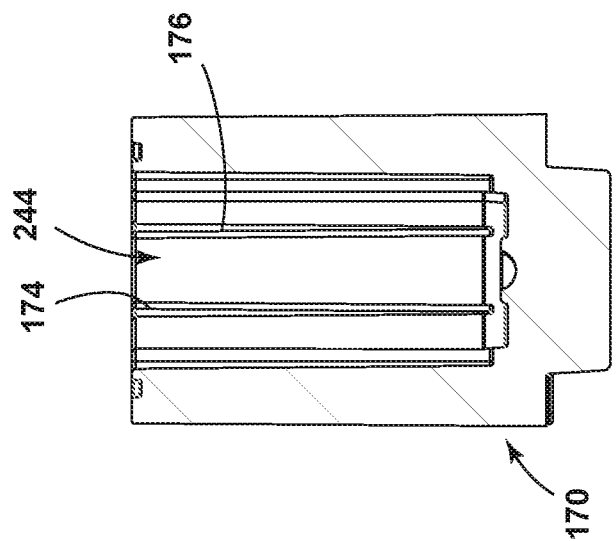
FIG. 57 is a cross-sectional view of an aspect of the modular fluid pump and exemplifying fluid channels disposed within the rotor housing for the fluid pump.
Figure 56:
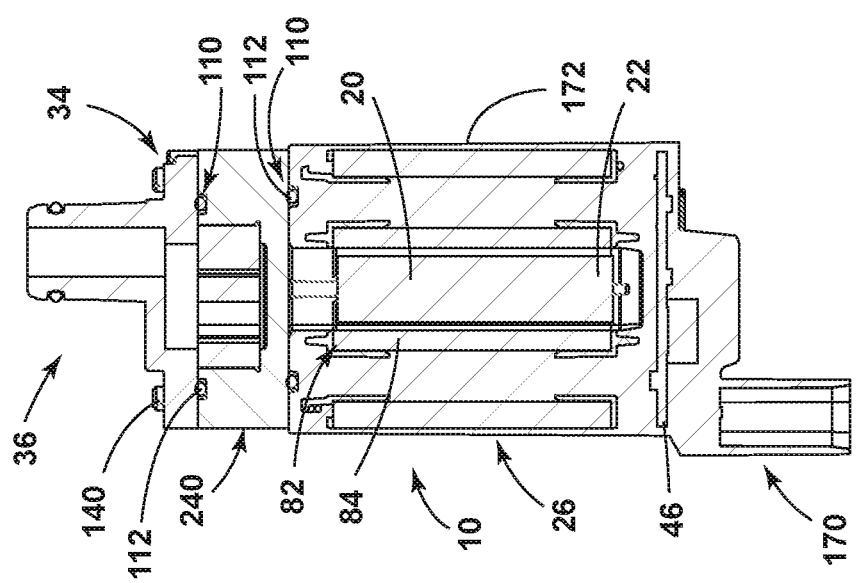
FIG. 56 is a cross-sectional view of the modular fluid pump of FIG. 52 taken along line LVI-LVI.
Figure 58:
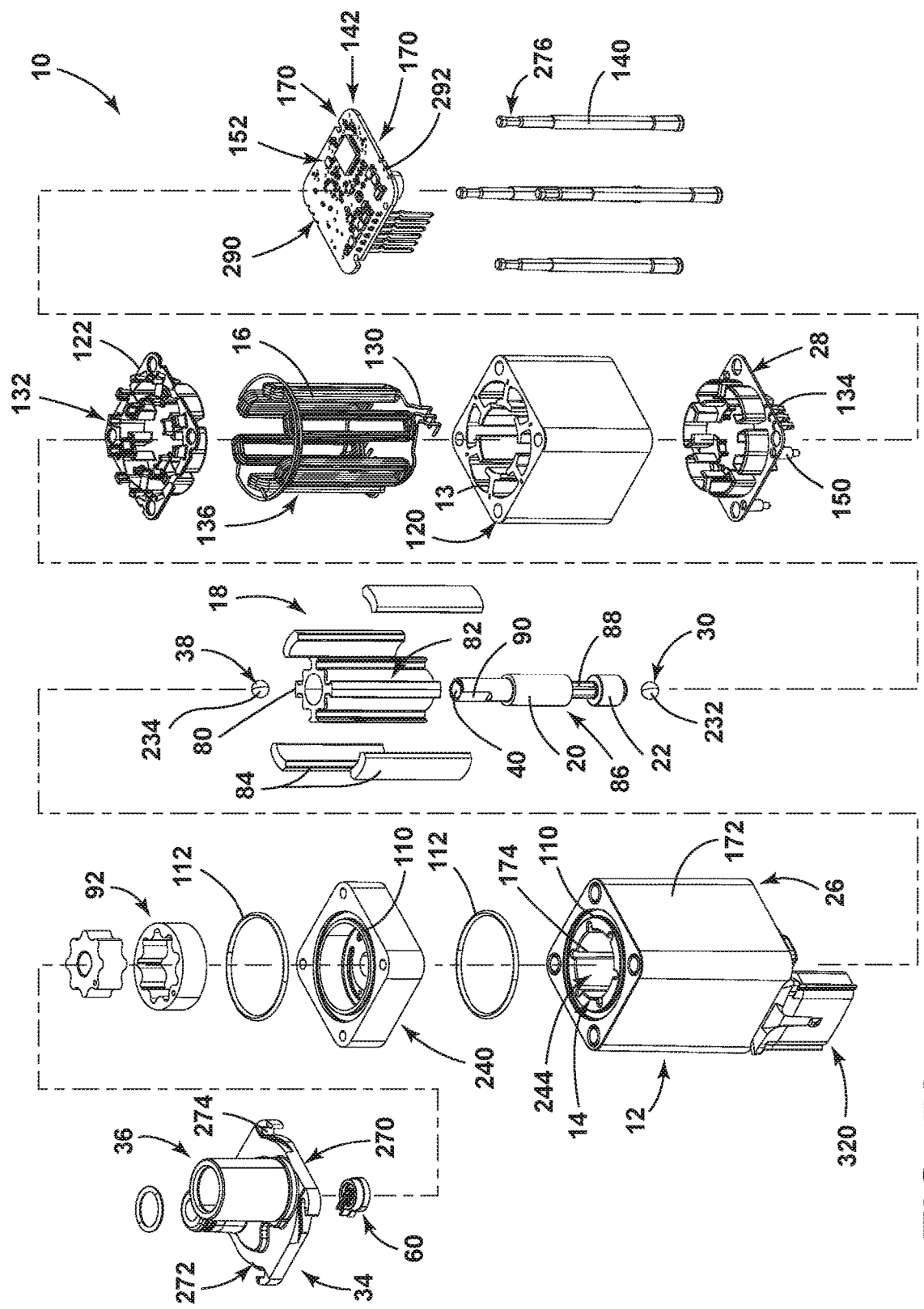
FIG. 58 is a first exploded first perspective view of the modular fluid pump of FIG. 48.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-16 and 18-59, reference numeral 10 generally refers to a modular fluid pump 10 that can be used within various fluid assemblies for moving materials of varying viscosity, such as oil, water and other similar materials, from a reservoir to another location. The modular fluid pump 10 can be made to include various standard features that are included within each modular fluid pump 10, along with various custom-made or optional features that can be added to the modular fluid pump 10 depending upon the particular application or design tolerances.

Referring again to FIGS. 1-16 and 18-59, the modular fluid pump 10, or other similar motor for non-fluid applications, can include a stator 12 having a plurality of teeth 13 and windings 16 that are positioned on the teeth 13 of the stator 12 to form poles 14 of the stator 12. A rotor 18 includes a central shaft 20 and a substantially hemispheric end 30 is positioned at each shaft end 22 of the central shaft 20. A plurality of rotor magnets 84 are included that define electromagnetic communication with the windings 16, when the windings 16 are energized by an electric current. A housing 26 surrounds the stator 12 and includes a first fixed end cap 28 that receives at least one of the hemispheric ends 30 of the central shaft 20 and defines a rotational axis 32 of the rotor 18. A second securing end cap 34 is adapted to receive a portion of the central shaft 20 for the rotor 18 and maintain the central shaft 20 along the rotational axis 32. The central shaft 20 and the fixed and securing end caps 28, 34 serve to cooperatively define the rotational axis 32 of the rotor 18. Engagement of one of the hemispheric ends 30 of the central shaft 20 with the fixed end cap 28 serves to maintain the rotor 18 and the central shaft 20 aligned with the rotational axis 32 and balanced within the poles 14 of the stator 12. A separate securing end cap 34 can be positioned to engage the opposing hemispheric end 30 of the central shaft 20. The securing end cap 34 engages the opposing hemispheric end 30 to secure the central shaft 20, between the two hemispheric ends 30, and along the rotational axis 32 of the modular fluid pump 10.

It is contemplated that the securing end cap 34 can include, in certain aspects, various custom features 36 that can be modified for a particular application. In this manner, a securing end cap 34 can be added to the modular fluid pump 10 for converting a modular fluid pump 10 to be useful in a wide range of applications and design conditions.

Referring again to FIGS. 1-16 and 18-59, the hemispheric ends 30 of the central shaft 20 are defined by separate first and second bearing balls 38 that are positioned at the concave ends 40 of the central shaft 20. In this manner, the concave ends 40 of the central shaft 20 form a close engagement with a surface of each bearing ball 38. This close engagement allows for a substantially smooth operation between the bearing ball 38 and each of the fixed and securing end caps 28, 34. Additionally, as discussed more fully below, movement of the flow 42 of fluid 44 through the modular fluid pump 10 can also direct certain amounts of the flow 42 of fluid 44 to be deposited between the engagement of the bearing ball 38 and the concave ends 40 and also between the bearing ball 38 and the concave seats 46 that are formed within the fixed end cap 28 and the securing end cap 34 for the modular fluid pump 10. In this manner, the fluid 44 can form a viscous cushion 48 or barrier between the direct engagement of the bearing ball 38 and the other components of the modular fluid pump 10. By using this viscous cushion 48 of the fluid 44 between the bearing ball 38 and the other components, wear between the rotor 18, the bearing balls 38 and the other components of the modular fluid pump 10 can be diminished or substantially eliminated.

In an exemplary aspect of the device, the bearing balls 38 can include a 52100 chrome moly steel bearing ball with a tight tolerance grade and a mirror surface finish. It should be understood that the bearing balls 38 can include other various sizes depending on the design of the modular fluid pump 10.

Referring again to FIGS. 1-16 and 18-59, the concave seats 46 of the overmolded stator 12 can be integrally formed of the overmold compound 172. The concave ends 40 of the central shaft 20 are typically round or spherically concave in form and are integrally formed from or otherwise defined within the powdered metal material of the central shaft 20. As discussed above, the concave seats 46 and the concave ends 40 that hold the bearing ball 38 are hemispheric and are adapted to maintain a consistent film of the fluid 44 to maintain the viscous, lubricating cushion 48 around the bearing ball 38 to reduce wear on the components.

According to various aspects of the device, as exemplified in FIGS. 24-28, the stator 12 and a printed circuit board (PCB) 142 are overmolded with the overmold compound 172 that may include a low pressure and temperature molding thermoset compound material. It is contemplated that the shape of the overmold at the PCB 142 can include a standard geometric shape that is sufficient to cover any one of a variety of configurations of the electrical components of the PCB 142. Using a standard geometric shape, such as a cuboid, conical or cylindrical prism, a single tool can be utilized for overmolding a wide range of configurations of the PCB 142. Within the interior of the modular fluid pump 10, this molding process is typically used to set up the various integral function features for the modular fluid pump 10. The formation of these features can include, but are not limited to, setting up a cooling zone 144 within the PCB 142 for cooling various electrical components 152; protecting the electrical components 152 from damage and/or contamination; forming an integral bearing pocket 146 for receiving the bearing ball 38; creating grooves 174 that enable active flow 42 of fluid 44 in the form of the secondary flow 194 of fluid 44 through the secondary flow path 192; positioning on board temperature sensors 178, or receptacles for receiving the sensors 178, for detecting the temperature of fluid 44 moving through the secondary flow path 192; and creating a datum plane that enables a fastenerless design. This design that is free of fasteners describes the engagement between retainer dowels 140 and the securing end cap 34, which will be described more fully below. Additionally, the overmold of the printed circuit board 142 can define various keep out zones 148 within which various components are attached to the printed circuit board 142.

Referring again to FIGS. 1, 11-16, 40-42 and 54-59, the concave seats 46 that are defined within the fixed end cap 28 and, in some embodiments, the securing end cap 34 can be in the form of hemispheric sockets that are adapted to receive a portion of the bearing ball 38 at each respective shaft end 22 of the central shaft 20 for the rotor 18. Using this configuration, certain amounts of lash or play within the rotor 18 being positioned between the opposing hemispheric sockets may be present within the modular fluid pump 10 having the securing end cap 34. To counteract this generally axial lash between the opposing concave seats 46, the securing end cap 34 can include a pressure bias fitting 60 that at least partially surrounds the bearing ball 38 positioned near the securing end cap 34. According to various aspects of the device, the pressure bias fitting 60 is placed in communication with the flow path 62 for the fluid 44 that extends between the stator 12 and the rotor 18 and through portions of the modular fluid pump 10.

Referring again to FIGS. 1, 11-16, 40-42 and 54-59, during operation of the modular fluid pump 10 (rotation of the rotor 18 within the stator 12), a flow 42 of fluid 44 is generated through the flow path 62. This flow 42 of fluid 44 through the flow path 62 generates an axially-oriented pressure 64 within the pressure bias fitting 60. The faster that the rotor 18 rotates, the faster the flow 42 of fluid 44 will flow through the fluid path 62. In turn, an increase in the rate of flow 42 for the fluid 44 can result in an increase in the pressure 64 exerted within the pressure bias fitting 60 and against the bearing ball 38. The pressure bias fitting 60 includes a pressure channel 66 that directs this pressure 64 in an axial direction and typically along the rotational axis 32 and toward the bearing ball 38. In various aspects of the device, the bearing ball 38 can be at least partially located within the pressure channel 66 of the pressure bias fitting 60. This axial pressure 64 compresses the bearing ball 38 near the securing end cap 34 into the central shaft 20 and along the rotational axis 32. This axial pressure 64, in turn, presses the central shaft 20 against the lower bearing ball 232 and into the fixed end cap 28. Using the pressure 64 generated by the flow 42 of fluid 44 through the flow path 62, the axial pressure 64 can axially secure the rotor 18 within the stator 12 and prevent lash, wobble, or other unwanted displacement of the rotor 18 away from or eccentric to the rotational axis 32.

As exemplified at least in FIGS. 35-59, the pressure bias fitting 60 incorporates a bearing pocket 146 for receiving the upper bearing ball 234. The bias fitting 60 can be made of powdered metal to provide for superior and repeatable pocket geometry for receiving the upper bearing ball 234. The powdered metal also provides for a porous surface finish to promote retention of fluid 44 that moves through the flow path 62, in the form of viscous cushion 48, for lubricating the bearing ball 38, the bearing pocket 146 and the remainder of the bearing system, which typically includes the bearing balls 38, the central shaft 20, the fixed end cap 28 and the pressure bias fitting 60 of the securing end cap 34.

Referring again to FIGS. 35-59, the pressure channel 66 for the bias fitting 60 is in the form of a small trough that extends radially from a central fitting 68 of the bias fitting 60. Typically, the central fitting 68 is positioned at an opposite side of the bearing pocket 146. Through this configuration, when assembled to the manifold, the central pressure fitting 60 provides a biasing pressure 64 as well as a small amount of leakage of fluid 44 to the top of the bearing pocket 146. The pressure 64 at this interface is proportional to the pressure 64 produced by the gerotor 92 during use. As the forces within the modular fluid pump 10 are higher near the gerotor 92, the axial loading of the central shaft 20 of the rotor 18 on the lower and upper bearing balls 232, 234 is proportionally higher to assure that the central shaft 20 of the rotor 18 stays centered within the bearing pockets 146 that are defined within the overmolded stator 12 and the securing end cap 34. This configuration also ensures that there is a flow 42 of fluid 44 in contact with the bearing system. When forces within the modular fluid pump 10 are low, particularly at start-up of the modular fluid pump 10, there is little to no axial load placed along the central shaft 20, thereby providing for ease of startup. This is particularly the case in applications of the modular fluid pump 10 that are sensorless.

According to various aspects of the device, the main physical interface between the rotor 18 and the housing 26 for the modular fluid pump 10 is between the bearing balls 38 that are positioned at the concave ends 40 of the central shaft 20 for the rotor 18. As discussed above, using the fluid 44 in the modular fluid pump 10, these concave ends 40, as well as the hemispheric sockets of the concave seats 46, can form a substantially continuous fluid viscous cushion 48 surrounding the lower and upper bearing balls 232, 234. This viscous cushion 48 can minimize friction and wear within the engagement between the lower and upper bearing balls 232, 234 and the central shaft 20 and hemispheric socket of the concave seat 46. This fluid viscous cushion 48 prevents physical rubbing or direct physical contact between the central shaft 20 and the lower and upper bearing balls 232, 234 and also between each bearing ball 38 and the respective concave seats 46.

Referring again to FIGS. 1 and 8-16 and 27-43, in forming the modular fluid pump 10, the components for each modular fluid pump 10 are generally similar but can vary according to size and scale. As exemplified in FIG. 33, it is contemplated that the modular fluid pump 10 can be made according to different sizes and scales such that the modular fluid pump 10 can, as a non-limiting example, include small, medium and large versions, where each of these three versions can be made in three different heights such that nine options may be available. It is also contemplated that additional versions of the modular fluid pump 10 can also be provided that include additional heights and scales of the base components of the modular fluid pump 10.

Additionally, and as will be described more fully below, the modular fluid pump 10 can be configured to be positionable in a wide range of orientations and axes within a particular design configuration. Accordingly, the modular fluid pump 10 does not include a front or back, but can be positioned in various rotational orientations within a particular design. Additionally, the routing of various wiring can be used in conjunction with jumper connections and other configurations that can provide for a plurality of operational orientations of the modular fluid pump 10 in a range of axial configurations.

Referring again to FIGS. 1, 8-16, 29-43 and 54-59, the rotor 18 for the modular fluid pump 10 can include the central shaft 20 that extends through a rotor body 80 that can be overmolded out of plastic. The rotor body 80 can include a series of magnet channels or magnet pockets 82 that are positioned parallel with the rotational axis 32 of the rotor 18 for receiving rotor magnets 84 that provide for electromagnetic communication between the rotor 18 and the windings 16 of the stator 12. These magnet pockets 82 within the rotor body 80 can be configured to receive various types of magnets 84.

As exemplified in FIGS. 8-14 and 54-59, the central shaft 20 can include a plurality of securing geometries 86 that interact with and serve to hold the rotor body 80 in place with respect to the central shaft 20. These securing geometries 86 can include a variable cross-sectional thickness that varies axially along the central shaft 20. The securing geometries 86 can also include flutes or ridges 88, that are defined within a portion of the central shaft 20. Because the rotor body 80 is typically molded around the central shaft 20, the rotor body 80 directly engages and is retained within the securing geometries 86. This engagement axially and rotationally fixes the rotor body 80 with respect to the central shaft 20.

As illustrated in the exemplary aspects of FIGS. 1-16 and 18-59, these rotor magnets 84 that are placed in the magnet pockets 82 of the rotor 18 can include at least one of sintered neodymium, bonded neodymium, bonded ferrite and other similar magnets 84 that can be used within the rotor 18 for the modular fluid pump 10. In addition to different types of magnets 84, the configuration of the magnets 84 can also be varied. A single piece magnet 84 as well as a magnet 84 made of a series of laminations can be used within the rotor 18. This variability within the use of magnets 84 and type of magnets 84 for the rotor 18 can provide for varying strengths of magnetic force generated by the rotor 18. The differing magnets 84 can also be used to provide a customizable electromagnetic communication and customizable rotational torque that can be produced by the rotor 18 when the various windings 16 are energized.

Referring again to FIGS. 11-16, 30-37 and 58-59, the central shaft 20 of the rotor 18 can include a double-D configuration that includes opposing planar surfaces 90 that extend along at least a portion of the central shaft 20. The use of this "double-D" configuration, shown in cross-section in FIG. 11A, provides a consistent and efficient locking connection between the central shaft 20 and the gerotor 92 for the modular fluid pump 10. The double-D configuration also allows the central shaft 20 to be positioned within a molding tool in at least two configurations such that a single orientation is not necessary. The double-D configuration also provides a torque-lock of the magnet 84 in relation to the central shaft 20. Moreover, use of the double-D configuration is important in this configuration where the central shaft 20 is supported at each concave end 40 by a bearing ball 38. The double-D configuration is naturally symmetrical and is able to be centered along the rotational axis 32 of the rotor 18. Therefore, counterbalancing is typically not utilized in the design of the modular fluid pump 10.

Referring again to FIGS. 1, 8-16, 30-37 and 54-59, the central shaft 20 is typically made of a metallic material, such as powdered metal. In certain instances, the central shaft 20 can receive magnetic flux 100 from the magnets 84 of the rotor 18. In such a configuration, installation of at least the lower bearing ball 232 can be performed by a magnetic connection between the lower bearing ball 232 and the central shaft 20 that may be magnetically energized through the magnetic flux 100 received from the magnets 84. In this configuration, the lower bearing ball 232 can be magnetically coupled with the concave end 40 of the rotor 18 and the concave end 40 of the rotor 18 can be disposed within the stator 12, with the lower bearing ball 232 magnetically coupled thereto. In this manner, the central shaft 20 of the rotor 18 can serve as the installation tool for locating the lower bearing ball 232 within the concave seat 46 located at the base of the stator 12 and within the fixed end cap 28 of the housing 26.

Referring now to FIGS. 1-8, and 18-22, construction of the modular fluid pump 10 can include forming the stator 12 by aligning a lamination stack 120 that forms the interior structure of the stator 12 including the teeth 13 for the stator poles 14. In certain embodiments, the individual laminations that make up the stator 12 include stitch upsets 15 that serve as aligning features to maintain the stack of laminations 120 in an aligned configuration. Through these stitch upsets 15, separate fasteners are not necessary for holding the stack of laminations 120 together during formation of the stator 12. The top lamination, rather than having a stitch upset 15, can include an aperture that receives the vertically adjacent stitch upset 15. This configuration ensures that the top surface of the stack of laminations 120 is level with no protruding features that may misalign the end plates 122 or other portion of the assembly.

Typically, the stator 12 will be a three-phase stator 12 where three separate windings 16 are wound around the teeth 13 to form the various stator poles 14. It should be understood that while six stator poles 14 are shown within the exemplary illustrations, other configurations of stator poles 14 can be utilized as well as different phase configurations for the motor.

When the laminations 120 of stator 12 are complete, end plates 122 are placed at each end of the lamination stack 120 for securing the lamination stack 120 together. Typically, the end plates 122 are slip fit or press fit onto the opposing ends of the lamination stack 120. Through this configuration, the stack of laminations 120 and the end plates 122 are not tightly secured together and may be separable by hand. It should be understood that rivets, bolts, welds, and other attachment mechanisms can be used to secure the lamination stack 120 together.

When the lamination stack 120 is complete and the end plates 122 are in place, the windings 16 can be placed around the teeth 13 of the stator 12. Placing the winding 16 over the teeth 13 of the stack of laminations 120 as well as the end plates 122 serves to secure the assembly together as a unitary stator 12. The stator 12 is configured to be a three-phase winding, where three separate wires 136 are wound around the teeth 13 of the stator 12 to form the poles 14 in a predetermined configuration. After winding is complete, the terminal ends 130 of the wires 136 are secured within one of the end plates 122. A top end plate 132 includes various securing towers 134 that can receive the terminal ends 130 of the wire 136 for the windings 16. These securing towers 134 can receive the various terminal ends 130 of the wire 136 and hold them in a particular position during formation of the modular fluid pump 10. These wires 136 can be in the form of various U-, V- and W-wires 136 as well as ground wires 162 that are directed from the stator 12 and the windings 16 for the stator 12. As will be discussed more fully herein, the rotational orientation of the lamination stack 120 in relation to the fixed and securing end caps 28, 34 is not critical and can be switched in 90-degree increments as needed for the particular design.

As exemplified in FIGS. 5-6A, and 22, after the windings 16 are installed and the terminal ends 130 of the wires 136 are secured within the securing towers 134, a plurality of retainer dowels 140 can be positioned through the lamination stack 120 of the stator 12 and the end plates 122. As will be described more fully below, these retainer dowels 140 are used to hold the securing end cap 34 in place and secure the entire assembly of the modular fluid pump 10, including the securing end cap 34 that may include custom features 36 for use in a particular design. While a rectilinear geometry for the stator 12 and the modular fluid pump 10 is illustrated, other polygonal geometries may also be implemented for generating the orientation-free design of the modular fluid pump 10.

Referring now to FIGS. 7, 8A and 18-26, after the retainer dowels 140 are secured, the PCB 142 can be installed on various locating features or structural posts 150 that position the PCB 142 in a spaced arrangement apart from the terminal ends 130 and securing towers 134 of the top end plate 132. The PCB 142 can include various electrical components 152 that can include, but are not limited to, various microprocessors, field-effect transistor (FET) drivers, drive transistors, temperature sensors 178, wiring terminals and other similar features. As will be described more fully below, a portion of the fluid flow path 62 through the modular fluid pump 10 can pass near or in direct engagement with these electrical components 152 for providing cooling to these components during operation of the modular fluid pump 10.

Referring again to FIGS. 7, 8A and 18-26, when the PCB 142 is located, the terminal ends 130 of the wires 136 for the windings 16 can be wrapped around the PCB 142 to wire terminals 154 that are located on the top surface of the PCB 142. In this manner, a single and continuous wire 136 can form these windings 16 and the terminal end 130. Accordingly, the terminal ends 130 can be soldered directly to the PCB 142 at the wire terminals 154 such that no intermediary terminals are necessary between the windings 16 and the PCB 142. This configuration of the wiring between the windings 16 and the PCB 142 can save a great deal of time, expense and resources.

According to various aspects of the device, the terminal ends 130 of the wires 136 directed from the various windings 16 can be positioned on specific solder pads 156 within the PCB 142. It is contemplated that a ground portion 160 of the PCB 142 is a solder pad 156 dedicated for attaching the various ground wires 162 that may be in contact with the stator 12. By separating locations of solder pads 156 for the ground wires 162 from the wire terminals 154 in the form of solder pads 156, for the terminal ends 130 of the windings 16, additional effort in separating the wires 136 for the windings 16 from the ground wires 162 is minimized and substantially eliminated. Because these separate wires 136 are positioned on, typically, opposing sides of the PCB 142, separate soldering operations within separated solder pads 156 can ensure that no short circuit occurs between the terminal ends 130 of the windings 16 and the ground wires 162. The various solder pads 156 of the PCB 142 can be pre-tinned during manufacture of the PCB 142 or sometime in advance of the soldering operations that connect the wires 136 to the solder pads 156. The pre-tinning of the solder pads can be accomplished by adding a soldering paste to the tinning pads 156. This soldering paste can be disposed on the PCB 142 by spreading, brushing, dropping or by other similar disposition process. In various aspects of the device, the soldering paste can be printed onto the PCB 142 using a print head that disposes a specific amount of the soldering paste onto specific and pre-defined areas of the PCB 142.

Referring again to FIGS. 4-7A and 20-26, the placement of the wires 136 for the windings 16 and attaching these wires 136 to the solder pads 156 can be used for various aspects of the modular fluid pump 10. Additionally, this process of placing and securing the wires 136 within the stator 12 can be utilized for a wide variety of motors. Such motors can be used for fans, impellers, pumps, drive mechanisms, stepper motors, combinations thereof and other similar types of motors. By way of example and not limitation, the use of the strain relief 292 and the grooves 292 for minimizing the strain placed on the wires 136 can be utilized within a wide range of motor applications. Similarly, utilizing a single continuous wire 136 for the winding 136 and the terminal end 130, without using an intermediate terminal, as well as the placement of these integral terminals ends 130 on specific pre-tinned areas of the PCB 142 can also be used in a wide variety of motor related applications. Moreover, the various features of the modular fluid pump 10 described herein are applicable to a wide range of motor applications.

Referring now to FIGS. 9-10A and 22-28, after the terminal ends 130 of the windings 16 and ground wires 162 have been soldered onto appropriate portions of the PCB 142, the structure of the stator 12 is then overmolded with the overmold compound 172 to insulate the various components of the stator 12. During this overmolding operation, contacts for the ground wires 162 and terminal wires 136 are allowed to protrude through the overmold for connection with electrical power and data wiring in the final installation of the modular fluid pump 10. The overmold is performed so that the stator 12 and the controller assembly 170 typically included within (the PCB 142) will contain various grooves 174 within the overmold compound 172 through the inner diameter 230 of the rotor 18 between the poles 14 of the stator 12. These grooves 174 can also be located at ends of the stator teeth 13. These grooves 174 within the overmold compound 172 of the stator 12 provide for fluid channels 176 that will provide the flow 42 between the stator 12 and rotor 18 to cool the various components and electrical components of the PCB 142. This flow 42 of fluid 44 through the grooves 174 in the area between or near the poles 14 of the stator 12 also provides a flow 42 of fluid 44 past a thermistor or other type of temperature sensor 178 of the PCB 142 that is in thermal communication with the secondary flow path 194 that can be used to monitor the temperature of the fluid 44 moved through the modular fluid pump 10, as well as the temperature of the various components of the modular fluid pump 10. In addition, these grooves 174 can allow for the movement of the fluid 44 to one or both of the lower and upper bearing balls 232, 234 for providing the viscous fluid cushion 48 described above.

As exemplified in FIGS. 1, 13-16, 27-29 and 43-59, during operation of the rotor 18 within the stator 12, a primary flow 196 of fluid 44 is moved through the modular fluid pump 10 that provides the primary movement of the viscous fluid 44 through the modular fluid pump 10. The grooves 174 that are formed by the overmold compound 172, typically in the form of a type of resin or other polymer material, provide for a secondary flow path 192 that diverts a portion of the fluid flow 42 toward the PCB 142, the temperature sensor 178 and one or both of the bearing balls 38 of the modular fluid pump 10. It is contemplated that the secondary flow 194 of fluid 44 through the secondary flow path 192 is substantially smaller than the primary flow 196 of fluid 44 so that operation of the modular fluid pump 10 is not overly diminished by moving the secondary flow 194 of fluid 44 through the secondary flow path 192. The use of the secondary flow path 192 provides for more efficient and consistent operation of the modular fluid pump 10. Additionally, the secondary flow path 192 is small enough that is does not adversely diminish the performance of the modular fluid pump 10.

The flow 42 of the fluid 44 through the primary and secondary flow paths 198, 192 is performed by operation of the gerotor 92. The gerotor 92 is directly connected with the central shaft 20 so that when the modular fluid pump 10 is activated, an electrical current is moved through at least a portion of the windings 16 in the stator 12. This activation of the winding, generates an electromagnetic force (EMF) that rotates the rotor 18 with respect to the poles 14 of the stator 12. Because the gerotor 92 is connected with the rotor 18, the operation of the rotor 18, in turn, operates the gerotor 92. The various flow pockets 210 generated through operation of the gerotor 92 provides for the movement of fluid 44 through the inlet 212, through the primary flow path 198 as well as the secondary flow path 192, and in through an outlet 214 of the modular fluid pump 10.

Referring now to FIGS. 11-15A and 29-39, after the stator 12 is overmolded, the rotor 18 can be positioned within the inner diameter 230 of the stator 12. As discussed above, the lower bearing ball 232 can be positioned within the concave seat 46 of the fixed end cap 28 by placing the first or lower bearing ball 232 on the shaft end 22 of the central shaft 20, as well as the second or upper bearing ball 234. Magnetic flux 100 from the magnets 84 of the rotor 18 can energize the central shaft 20 to form a magnetic field that can be used as a magnet 84 for holding the lower bearing ball 232. By magnetically attaching one or both of the bearing balls 38 to the concave ends 40 of the central shaft 20, the central shaft 20 can be used as the tool for locating the lower bearing ball 232 within the concave seat 46 defined within the fixed end cap 28 of the modular fluid pump 10.

Typically, the rotor 18 for the modular fluid pump 10 will include four magnets 84 that cooperate electromagnetically with the six poles 14 of the stator 12. Where a different configuration of poles 14 for the stator 12 are included, it is typical that the configuration of the magnets 84 for the rotor 18 will also change. Typically, the number of magnets 84 for the rotor 18 is different than the number of poles 14 for the stator 12, such that when the windings 16 of the stator 12 are energized, the produced EMF will generate a rotation of the rotor 18 within the stator 12.

It is contemplated that various sealing assemblies 110 can be included within the overmolded stator 12 and the pump body 240 that holds the gerotor 92. The various sealing assemblies 110 can retain O-rings 112 therein. The pump body 240 can be attached to the overmolded stator 12 and placed over the retainer dowels 140. Within the pump body 240, the gerotor 92 at least partially positions and aligns the position of the central shaft 20 to set the rotational position to rotate the magnets 84 about the central shaft 20. As discussed above, the pump body 240 and the gerotor 92 can be positioned in various rotational positions with respect to the overmolded stator 12. It is contemplated that the positioning of the pump body 240 can determine which of the plurality of grooves 174 or fluid channels 176 defined between (or along) the poles 14 of the stator 12 will serve as the secondary flow path 192 for the secondary flow 194 of fluid 44.

By way of example, and not limitation, the pump body 240 can include an in-port 250 and an out-port 252 that define a secondary flow path 192. The in-port 250 can align with a corresponding set of grooves 174 in each rotational position with respect to the rectangular body of the modular fluid pump 10. Accordingly, regardless of the positioning of the pump body 240 and the gerotor 92, the pump body 240 and gerotor 92 will typically be in alignment with a corresponding set of grooves 174 that are defined proximate the poles 14 of the stator 12. The orientation of the pump body 240 and the gerotor 92 can be changed depending upon the exact configuration of the device incorporating the modular fluid pump 10.

In various aspects, it is also contemplated that the exact orientation of the pump body 240 may not be an essential consideration such that the orientation of the pump body 240 is less critical in forming the modular fluid pump 10, so long as the gerotor 92 is aligned with the rotational axis 32 of the rotor 18. As will be described more fully below, the pump body 240 and the securing end cap 34 are configured to be aligned with the stator 12 and the PCB 142 in a plurality of rotational positions. These rotational positions are typically 90-degree increments that correspond to the placement of the retainer dowels 140. Other degree increments can be utilized where the geometry of the modular fluid pump 10 has other polygonal shapes.

As exemplified in FIGS. 34-42 and 54-59, the gerotor 92 and pump body 240 form a cavity for the gerotor 92 that at least partially defines the primary flow path 198. The pump body 240 also includes flow ports that extend through the pump body 240 to channel a pressured flow 42 of fluid 44 from a pressure side of the gerotor 92 and down the grooves 174 that form the secondary flow path 192, and wherein the flow ports also allow for a return of pressured flow 42 of fluid 44 through the secondary flow path 192 and to a suction side of the gerotor 92. Additionally, the pump body 240 includes a wall of material that divides the pressure side of the gerotor 92 from the suction side of the gerotor 92, wherein the wall of material serves to bias a flow 42 of the fluid 44 into the grooves 174 that form the secondary flow path 192 to define the secondary flow 194 of fluid 44. This wall of material can include one or more, and typically two, paddles 242 that are typically stationary and are positioned near the central shaft 20 of the rotor 18. These paddles 242, which extend downward from the pump body 240, separate the pressure side from the suction side in the rotor cavity 244. This serves to direct the secondary flow 194 of fluid 44 down the molded grooves 174 that define the secondary flow path 192. This secondary flow 194 of fluid 44 serves to lubricate the bearing ball 38 and also cool various components of the PCB 142. In addition to the secondary flow 194 of the fluid 44, it is contemplated that an internal grease can also be utilized for providing lubrication to the internal components of the modular fluid pump 10.

Referring again to FIGS. 14-16, 35-39 and 54-59, after the pump body 240 and the gerotor 92 are placed on the overmolded stator 12, the base form 260 of the modular fluid pump 10 is substantially complete. This assembly may not be secured onto the retainer dowels 140. According to various aspects of the device, the securing end cap 34 of the modular fluid pump 10 can be rotationally secured onto the retainer dowels 140 to secure the components together to form the modular fluid pump 10. The retainer dowels 140 can include multiple lengths that correspond to varying lengths of the stator 12. The varying lengths of the retainer dowels 140 also accommodate varying dimensions of the pump body 240 and the securing end cap 34.

Referring to FIGS. 14-16 and 40-59, the securing end cap 34 of the modular fluid pump 10 can include a standard side 270 that engages the pump body 240 and the gerotor 92. This standard side 270 may be of a configuration that is substantially similar among the various designs of the modular fluid pump 10. Opposite the standard side 270 is the custom side 272 where various components of a particular design will be implemented within the securing end cap 34. On the standard side 270, one or more retaining slots 274 can be defined within the material of the securing end cap 34. These retaining slots 274 can include an eye-slot that can receive a slotted end 276 of each retainer dowel 140. When the slotted end 276 of each retainer dowel 140 enters the eye of the retaining slot 274, rotation of the securing end cap 34 moves the slotted end 276 of each dowel through the retaining slot 274 and secures each slotted end 276 of the retainer dowel 140 within a corresponding retaining slot 274.

It is also contemplated that the retaining slots 274 included within the securing end cap 34 can be sloped such that rotation of the securing end cap 34 also biases the securing end cap 34 against each retainer dowel 140 and biases the securing end cap 34 against the pump body 240 compress the O-rings 112 within the sealing assemblies 110 and to form a substantially fluid-tight fit that defines any one of a plurality of locked positions 278 of the securing end cap 34. Various detents can be included within the retaining slots 274 of the securing end cap 34 to substantially secure the slotted end 276 of each retainer dowel 140 within the cooperating slots of the securing end cap 34. In this manner, formation of the modular fluid pump 10 can be accomplished without the need of fasteners such as bolts, screws, welds, and other attaching mechanisms and methods that may be used in conventional fluid pumps for securing components together.

Because the modular fluid pump 10 is secured together through the twist-lock rotational engagement of the securing end cap 34 with the retainer dowels 140, the number of holes that need to be drilled within the modular fluid pump 10 are substantially diminished and opportunities for leaks within the modular fluid pump 10 are also diminished. Through this configuration, the anchoring of the modular fluid pump 10 can be accomplished primarily through three components in the stack of the modular fluid pump 10, in the form of the overmolded stator 12, the pump body 240 (which combine to form the base form 260) and the manifold that is typically in the form of a securing end cap 34 of the modular fluid pump 10. Through the configuration of the biasing or retaining slots 274 in the securing end cap 34, the twist-lock mechanism or configuration of the securing end cap 34 provides a biasing fit between the securing end cap 34 and the pump body 240 to hold the various components of the modular fluid pump 10 together. Because the pump body 240 and the securing end cap 34 include machined features, these components can hold and account for the required tolerances within the modular fluid pump 10.

Referring again to FIGS. 4-8A and 20-26, and as discussed above, the wires 136 that extend from the windings 16 into PCB 142 include no intermediate terminals. The securing towers 134 included within the top end plate 132 provide a strain relief 290 on the winding wire 136 and also provide a structural channel to direct the wire 136 from the windings 16 to the strain relief 290 on the edge of the PCB 142. This strain relief 290 can include strain relief notches 292 that are positioned at an outer edge of the PCB 142. Structural support is also provided to the PCB 142 for folding and holding the wire 136 to the PCB 142 while soldering to pre-tinned solder pads 156. This structure for the PCB 142 is provided by the heat stake posts 150 that extend upward from the top end plate 132 positioned at one of the ends of the lamination stack 120 that form the stator 12. These posts 150 are incorporated within the top end plate 132 for providing support to the PCB 142. When various operations are performed on the PCB 142, such as soldering, folding wires 136, and other similar operations, the heat stake posts 150 provide structure underneath the PCB 142 to support and prevent damage to the PCB 142 during manufacture. Additionally, the space between the top end plate 132 and the PCB 142 that is defined by the heat stake posts 150 can also provide for at least a portion of the secondary flow path 192 through which the secondary flow 194 of fluid 44 can move to provide cooling to the components of the PCB 142.

According to various aspects of the device, as exemplified in FIGS. 11-14, it is contemplated that at least one flux collector pocket 310 can be disposed within the stator 12 after the windings 16 are positioned on the poles 14 of the stator 12, but before the overmold compound 172 covers the stator 12. These flux collector pockets 310 can serve to channel a magnetic field from the rotor 18 and direct this magnetic field to a Hall Effect sensor on the PCB 142. The Hall Effect sensor can be used for optional sensor communication for assessing the rotational position of the rotor 18 with respect to the stator 12. In certain conditions, the flux collector pockets 310 can be installed in each design of the modular fluid pump 10. It should be understood that the flux collector may not be required in each implementation of the modular fluid pump 10. In configurations where sensorless commutation of the rotor 18 is desired, no flux collector pocket 310 may be included within the stator 12.

Referring again to FIGS. 1-16 and 18-59, the various configurations of the modular fluid pump 10 can include various standard components that most, if not all, implementations of the modular fluid pump 10 will typically include. Such components can include, but may not be limited to, the rotor 18, central shaft 20 and rotor body 80 with the magnet pockets 82. As discussed above, the exact configuration and material of the magnets 84 for the rotor 18 may be changed depending upon the exact use and implementation of the modular fluid pump 10. The stator 12, poles 14, and windings 16 will typically be included as standard parts of each design of the modular fluid pump 10. Additionally, the wires 136 for the windings 16 and ground wires 162 will also typically be included within each design of the modular fluid pump 10 as well as the connections with the PCB 142. The overmold compound 172 surrounding the stator 12, the retainer dowels 140 and the PCB 142 will also typically be standard components within each aspect of the modular fluid pump 10. Within the modular fluid pump 10, various custom features 36 can also be included. These custom features 36 can also include, as discussed above, the material for the magnets 84 disposed within the magnet pockets 82 of the rotor 18, the rotational position of the gerotor 92 and pump body 240 with respect to the stator 12, the use of jumper connectors with the PCB 142 for orienting the position of the modular fluid pump 10 within a particular application, the exact configuration of the securing end cap 34 or manifold. As discussed above, the securing end cap 34 can include the custom side 272 having various design specific features that are useful for attaching or otherwise incorporating the modular fluid pump 10 within a particular application, setting or design.

As exemplified in FIGS. 35-59, the gerotor 92 is installed within the pump body 240. In various aspects of the device, the gerotor 92 for the modular fluid pump 10 can include a plurality of displacement configurations that can vary by thickness and/or diameter, according to corresponding changes to the configuration of the pump body 240. Accordingly, the modular fluid pump 10 can be designed having various pump bodies 240 that come in different widths that match corresponding widths of the stator 12 as an extrusion blank. Typically, three different configurations of pump body 240 will be provided to match the corresponding widths of the stator 12. The variable configuration of the pump body 240 and the stator 12 enables flexibility in either the thickness of the pump body 240 or the gerotor pocket diameter with a simple change to the machine program to accommodate three configurations of gerotors 92. After the gerotor 92 is installed within the pump body 240, the upper bearing ball 234 is positioned at the concave seat 46 at the end of the central shaft 20 of the rotor 18.

Through the use of the modular fluid pump 10, it is contemplated that a single modular fluid pump 10 or family of modular fluid pumps 10 can be manufactured. These modular fluid pumps 10 can be, after manufacture, customized for incorporation within a particular specific application or design. The customizable features included within the modular fluid pump 10 allow for changes in orientation, certain materials, axial configuration and other aspects that allow the modular fluid pump 10 to be incorporated within a wide range of applications or designs.

Figure 59:
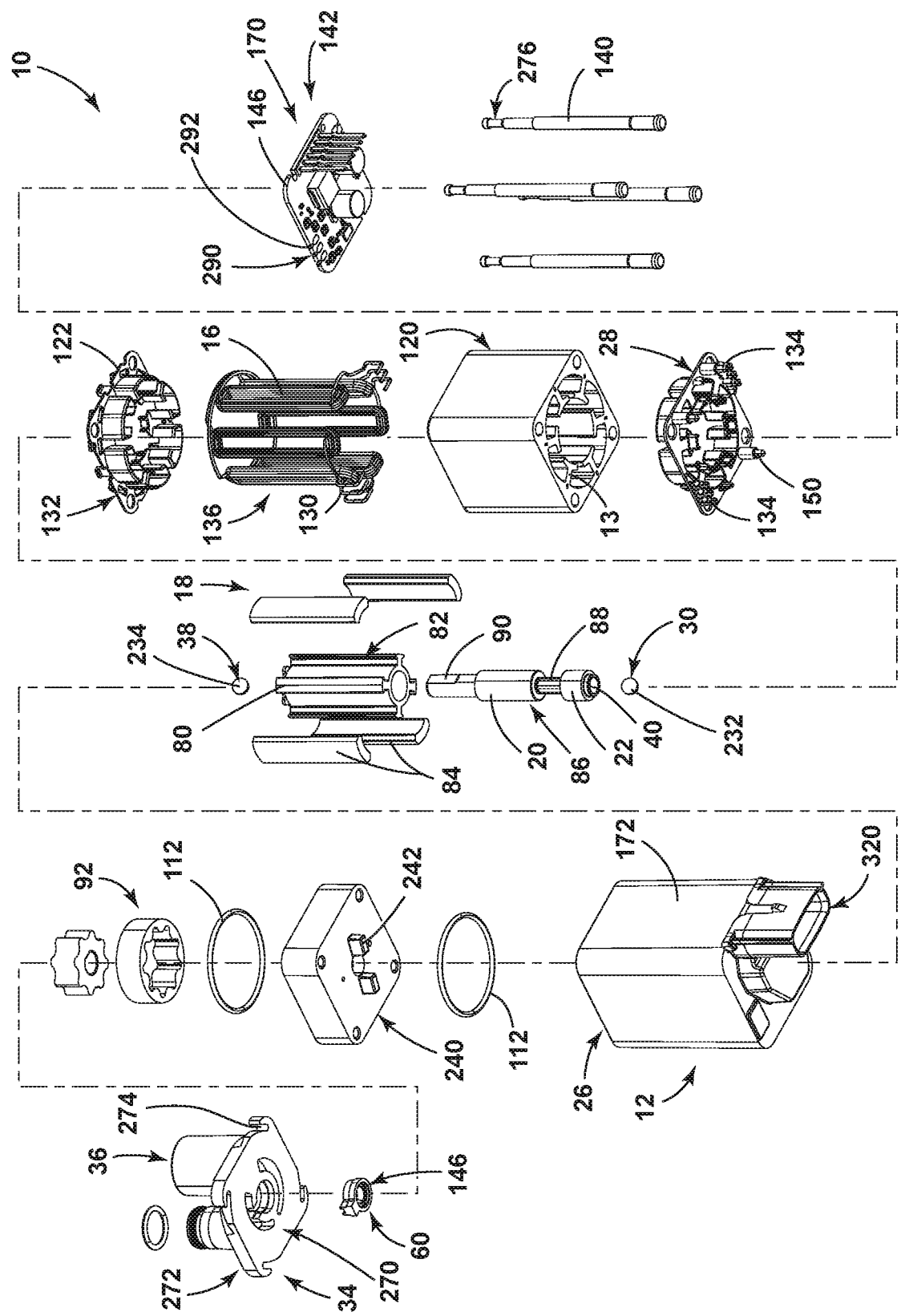
FIG. 59 is another exploded perspective view of the modular fluid pump of FIG. 48.

Referring now to FIGS. 1-59, having described various aspects of the modular fluid pump 10, a method 400 is disclosed for manufacturing a modular fluid pump 10. According to the method 400, an overmolded stator 12 is formed having a plurality of retainer dowels 140 that extend from an end of an overmolded stator 12 (step 402). A rotor 18 is also formed, where the rotor 18 includes a metallic central shaft 20 and a plurality of magnet pockets 82 or recesses (step 404). The magnets 84 can then be disposed within each magnet pocket 82 defined within the rotor 18 (step 406). A bearing ball 38 can be magnetically attached to a concave end 40 of the central shaft 20 (step 408). As discussed above, positioning of the magnets 84 within the rotor 18 can generate a magnetic flux 100 that provides the central shaft 20 with magnetic properties that may be sufficient to hold the bearing ball 38 in place during installation of the rotor 18. According to the method 400, the bearing ball 38, typically the lower bearing ball 232, and the central shaft 20 are then positioned into engagement with a concave seat 46 of the fixed end cap 28 (step 410). As discussed above, because the central shaft 20 is magnetically energized through the magnetic flux 100 provided by the rotor magnets 84, the central shaft 20 can act as a tool for retaining and positioning the lower bearing ball 232 within the concave seat 46 of the fixed end cap 28. The pump housing 26 can then be secured to the overmolded stator 12 and the retainer dowels 140 (step 412). A gerotor 92 is then secured to the central shaft 20 within the pump body 240 (step 414). The gerotor 92 at least partially positions the central shaft 20 and the rotor 18 along rotational axis 32. The securing end cap 34 is then rotationally secured onto the slotted ends 276 of the retainer dowels 140 (step 416). In this manner, the securing end cap 34 provides a twist-lock configuration that secures the securing end cap 34 to the retainer dowels 140 without the use of additional fasteners. This fastener-less configuration of the modular fluid pump 10 prevents the unnecessary use of fastener holes and other apertures that may be included within conventional fluid pumps.

As exemplified in FIGS. 1-59, the manifold in the form of the securing end cap 34 is seated within the retainer dowels 140 and is rotated into place to provide a compression load onto the remainder of the modular fluid pump 10, in particular, the various O-rings 112. As discussed herein, the overmolded stator 12 can be assembled in, typically, 90 degree increments to locate the electrical/data connector 320 on any side of the pump 40 without affecting motor or hydraulic functions of the modular fluid pump 10. Through this modular configuration of the modular fluid pump 10, the various configurations of the pump 10 can provide a wide range of advantages. These advantages can include, but are not limited to, pressure ranges of up to approximately 10 bar, flow ranges of up to approximately 14 liters per minute, temperature ranges from approximately −40 degrees Celsius to approximately 150 degrees Celsius (exposure), functional ranges from approximately −40 degrees Celsius to approximately 125 degrees Celsius (duty and fluid dependent), voltage variants from 12 VDC, 24 VDC and 48 VDC, sealed to IP6K9K for internal or external applications, included provisions for electromagnetic compatibility, censored or sensorless configurations, communication capable for CAN, LIN, PWN, on/off and other communications formats, onboard temperature sensing, full diagnostic logging and recording, fault storage black box, low noise construction, flexible architectures to suit demanding packaging constraints, and customer specific manifold for flexible mounting configurations.

The various components contained within the modular fluid pump 10, and the processes used for manufacturing and operating the modular fluid pump 10, as described herein can be utilized with in any one of various fluid pump designs. In addition, these components and processes described herein are also able to be implemented within other types of motors in both fluid-related and non-fluid related designs and applications.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A modular fluid pump comprising:
    a stator having a plurality of stator teeth and windings that are positioned on the plurality of stator teeth;
    a rotor having a central shaft and substantially hemispheric ends and a plurality of magnets that define an electromagnetic communication with the windings;
    a housing surrounding the stator and including a fixed end cap that receives one of the hemispheric ends of the central shaft and defines a rotational axis of the rotor; and
    a securing end cap that receives the other hemispheric end of the central shaft, wherein the central shaft and the fixed and securing end caps define the rotational axis of the rotor, wherein engagement of the hemispheric ends with the central shaft and the fixed and securing end caps maintains the rotor and the central shaft aligned with the rotational axis and balanced within the stator, wherein the securing end cap includes a pressure bias fitting that directs an axial pressure generated during operation of the rotor through a pressure channel and onto one of the hemispheric ends and along the rotational axis, wherein the axial pressure limits lash within the central shaft of the rotor along and eccentric to the rotational axis.

2. The modular fluid pump of claim 1, wherein the hemispheric ends are defined by bearing balls that are positioned within concave ends defined within each hemispheric end of the central shaft.

3. The modular fluid pump of claim 2, further comprising:
    a pump body that is coupled between the stator and the securing end cap; and
    a gerotor positioned within the pump body, wherein operation of the rotor rotates the gerotor, and wherein operation of the gerotor is configured to move a fluid through a flow path defined within the securing end cap and the pump body.

4. The modular fluid pump of claim 1, wherein the rotor includes magnet pockets that are adapted to receive a rotor magnet of the plurality of magnets within each respective magnet pocket.

5. The modular fluid pump of claim 1, wherein the plurality of magnets can include one of sintered neodymium, bonded neodymium and bonded ferrite.

6. The modular fluid pump of claim 1, wherein the fixed end cap is attached to the stator and includes structural posts that support a position of a printed circuit board relative to the housing.

7. The modular fluid pump of claim 3, wherein the stator and the housing include a plurality of retainer dowels that extend from one side of the housing proximate the securing end cap, wherein the securing end cap couples to the plurality of retainer dowels in a twist-lock rotational engagement that is free of additional fasteners.

8. The modular fluid pump of 7, wherein the securing end cap includes a plurality of retaining slots that receive and rotationally secure the plurality of retainer dowels to compress the securing end cap, the pump body, the rotor, the bearing balls and the housing together in a secure assembly.

9. The modular fluid pump of claim 3, wherein the housing is defined by an overmold compound that completely surrounds the stator, and wherein the housing is substantially orientation free with respect to a position of the housing in relation to the securing end cap.

10. The modular fluid pump of claim 1, wherein the securing end cap and the housing can be secured in a plurality of rotational positions relative to the rotational axis of the central shaft.

11. The modular fluid pump of claim 10, wherein the plurality of rotational positions are configured to be in 90 degree increments about the rotational axis of the central shaft.

12. The modular fluid pump of claim 9, wherein the overmold compound of the housing includes a plurality of grooves that defines a secondary flow path through a portion of a rotor cavity, wherein during operation of the rotor, the gerotor is configured to move a primary flow of the fluid through a primary flow path and also move a secondary flow of the fluid through the secondary flow path.

13. The modular fluid pump of claim 12, wherein the secondary flow path directs the secondary flow of the fluid proximate a printed circuit board and in thermal communication with the printed circuit board to cool electrical components of the printed circuit board.

14. A modular fluid pump comprising:
    a stator having a plurality of stator teeth and windings that are positioned on the plurality of stator teeth;
    a rotor having a central shaft and substantially hemispheric ends and a plurality of magnets that define an electromagnetic communication with the windings;
    a housing surrounding the stator and including a fixed end cap that receives one of the hemispheric ends of the central shaft and defines a rotational axis of the rotor; and
    a securing end cap that receives the other hemispheric end of the central shaft, wherein the central shaft and the fixed and securing end caps define the rotational axis of the rotor, wherein engagement of the hemispheric ends with the central shaft and the fixed and securing end caps maintains the rotor and the central shaft aligned with the rotational axis and balanced within the stator, wherein the fixed end cap is attached to the stator and includes structural posts that support a position of a printed circuit board relative to the housing.

15. The modular fluid pump of claim 14, wherein the stator and the housing include a plurality of retainer dowels that extend from one side of the housing proximate the securing end cap, wherein the securing end cap couples to the plurality of retainer dowels in a twist-lock rotational engagement that is free of additional fasteners.

16. The modular fluid pump of claim 15, wherein the securing end cap includes a plurality of retaining slots that receive and rotationally secure the plurality of retainer dowels to compress the securing end cap, a pump body that is positioned between the stator and the securing end cap, the rotor, and the housing together in a secure assembly.

17. The modular fluid pump of claim 14, wherein the securing end cap and the housing can be secured in a plurality of rotational positions relative to the rotational axis of the central shaft.

18. The modular fluid pump of claim 17, wherein the plurality of rotational positions are configured to be in 90 degree increments about the rotational axis of the central shaft.

19. A modular fluid pump comprising:
- a stator having a plurality of stator teeth and windings that are positioned on the plurality of stator teeth;
- a rotor having a central shaft and substantially hemispheric ends and a plurality of magnets that define an electromagnetic communication with the windings;
- a housing surrounding the stator and including a fixed end cap that receives one of the hemispheric ends of the central shaft and defines a rotational axis of the rotor; and
- a securing end cap that receives the other hemispheric end of the central shaft, wherein the central shaft and the fixed and securing end caps define the rotational axis of the rotor, wherein engagement of the hemispheric ends with the central shaft and the fixed and securing end caps maintains the rotor and the central shaft aligned with the rotational axis and balanced within the stator, wherein the hemispheric ends are defined by bearing balls that are positioned within concave ends defined within each hemispheric end of the central shaft, and wherein the stator and the housing include a plurality of retainer dowels that extend from one side of the housing proximate the securing end cap, wherein the securing end cap couples to the plurality of retainer dowels in a twist-lock rotational engagement that is free of additional fasteners.

20. The modular fluid pump of 19, wherein the securing end cap includes a plurality of retaining slots that receive and rotationally secure the plurality of retainer dowels to compress the securing end cap, a pump body that is positioned between the stator and the securing end cap, the rotor, and the housing together in a secure assembly.

* * * * *